(12) United States Patent
Murakami

(10) Patent No.: US 12,476,738 B2
(45) Date of Patent: *Nov. 18, 2025

(54) TRANSMISSION DEVICE, RECEPTION DEVICE, TRANSMISSION METHOD, AND RECEPTION METHOD

(71) Applicant: Panasonic Intellectual Property Corporation of America, Torrance, CA (US)

(72) Inventor: Yutaka Murakami, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,266

(22) Filed: Apr. 15, 2024

(65) Prior Publication Data

US 2024/0275521 A1    Aug. 15, 2024

Related U.S. Application Data

(63) Continuation of application No. 17/002,051, filed on Aug. 25, 2020, now Pat. No. 11,984,982, which is a (Continued)

(30) Foreign Application Priority Data

Feb. 28, 2018  (JP) ................. 2018-035695
Mar. 8, 2018   (JP) ................. 2018-042415

(51) Int. Cl.
*H04L 1/00*     (2006.01)
*H04W 28/06*    (2009.01)
(Continued)

(52) U.S. Cl.
CPC ....... *H04L 1/0083* (2013.01); *H04W 52/0229* (2013.01); *H04W 52/0235* (2013.01); *H04W 52/028* (2013.01); *H04W 88/06* (2013.01)

(58) Field of Classification Search
CPC ............. H04W 28/06; H04W 52/0229; H04W 52/0235; H04W 52/028; H04W 88/06;
(Continued)

(56) References Cited

U.S. PATENT DOCUMENTS

2012/0275364 A1   11/2012  Anderson et al.
2014/0112226 A1   4/2014   Jafarian et al.
(Continued)

FOREIGN PATENT DOCUMENTS

JP   2016-500985   1/2016
JP   2017-539099   12/2017
(Continued)

OTHER PUBLICATIONS

International Search Report (ISR) issued on May 14, 2019 in International (PCT) Application No. PCT/JP2019/007196.
(Continued)

*Primary Examiner* — Omer S Mian
(74) *Attorney, Agent, or Firm* — Wenderoth, Lind & Ponack, L.L.P.

(57) ABSTRACT

A transmission device includes a generator that generates a frame in a predetermined frame format and a communicator that transmits the frame generated by the generator. The predetermined frame format includes a first field indicating whether information related to a wake-up process performed by a device that received a frame in the predetermined frame format is valid or not. When the first field indicates that the information is valid, the predetermined frame format further includes a second field indicating identification information identifying the device.

5 Claims, 43 Drawing Sheets

Related U.S. Application Data continuation of application No. PCT/JP2019/007196, filed on Feb. 26, 2019.

(51) Int. Cl.
*H04W 52/02* (2009.01)
*H04W 88/06* (2009.01)

(58) Field of Classification Search
CPC ... H04W 52/0219; Y02D 30/70; H04L 1/0083
See application file for complete search history.

(56) References Cited

U.S. PATENT DOCUMENTS

| | | |
|---|---|---|
| 2017/0094587 A1 | 3/2017 | Ding et al. |
| 2018/0020409 A1 | 1/2018 | Aboul-Magd et al. |
| 2018/0041959 A1 | 2/2018 | Yang et al. |
| 2018/0192373 A1 | 7/2018 | Fang et al. |
| 2019/0289459 A1* | 9/2019 | Shan ............. H04W 76/25 |
| 2019/0289549 A1 | 9/2019 | Lim et al. |
| 2020/0045635 A1 | 2/2020 | Lin et al. |
| 2021/0168713 A1* | 6/2021 | Gan ............. H04W 52/18 |

FOREIGN PATENT DOCUMENTS

| | | |
|---|---|---|
| WO | 2014/066046 | 5/2014 |
| WO | 2016/189933 | 12/2016 |

OTHER PUBLICATIONS

Extended European Search Report issued Mar. 9, 2021 in corresponding European Patent Application No. 19761714.5.
Extended European Search Report issued Oct. 27, 2023 in European Patent Application No. 23189785.1.

* cited by examiner

TRANSMISSION DEVICE, RECEPTION DEVICE, TRANSMISSION METHOD, AND RECEPTION METHOD

CROSS REFERENCE TO RELATED APPLICATIONS

This application is a continuation of U.S. application Ser. No. 17/002,051 filed on Aug. 25, 2020, which is a continuation application of PCT International Patent Application Number PCT/JP2019/007196 filed on Feb. 26, 2019, claiming the benefit of priority of Japanese Patent Application Number 2018-035695 filed on Feb. 28, 2018, and Japanese Patent Application Number 2018-042415 filed on Mar. 8, 2018. The entire disclosures of the above-identified applications, including the specifications, drawings, and claims are incorporated herein by reference in their entirety.

BACKGROUND

1. Technical Field

The present disclosure relates to a transmission device, a reception device, a transmission method, and a reception method.

2. Description of the Related Art

Patent Literature (PTL) 1 discloses a first communication device including a communication function for a first communication scheme and a communication function for a second communication scheme. The first communication device communicates with a second communication device using the first communication scheme.

In order to wake up operation of the communication function for the second communication scheme that is included in the first communication device, the second communication device transmits, using the first communication scheme, a modulated signal including control information for waking up the second communication scheme.

SUMMARY

WO2016/189933 discloses that the above configuration reduces the power consumption of the first communication device and reduces communication overhead. However, there is desire for the realization of further power consumption reduction of a device having the first communication device and a system having the first communication device, a desire to provide a device having the first communication device and a system having the first communication device with new functions that utilize the first communication scheme, and a desire to provide a device having the first communication device and a system having the first communication device with new functions that utilize a combination of a plurality of communication schemes.

In view of the above, the present disclosure provides, for example, a transmission device which can provide new functions.

A transmission device according to one aspect of the present disclosure includes a generator that generates a frame in a predetermined frame format and a communicator that transmits the frame generated by the generator. The predetermined frame format includes a first field indicating whether information related to a wake-up process performed by a device that received a frame in the predetermined frame format is valid or not, and when the first field indicates that the information is valid, further includes a second field indicating identification information identifying the device.

With this configuration, the transmission device can provide a new function, namely that the execution of a wake-up process by a device that received the frame can be appropriately controlled. For example, this configuration can contribute to a reduction in the processing load and the power consumption of the reception device.

A reception device according to one aspect of the present disclosure includes a communicator that operates in one of a first mode and a second mode and a controller that controls which of the first mode and the second mode the communicator operates in based on a reception frame received by the communicator, the reception frame being in a predetermined frame format. The predetermined frame format includes a first field indicating whether information related to a wake-up process performed by a device that received a frame in the predetermined frame format is valid or not, and when the first field indicates that the information is valid, further includes a second field indicating identification information identifying the device. The first mode is a mode in which the communicator is in standby for reception of a frame including at least the first field. The second mode is a mode in which the communicator performs normal data frame transmission and reception. The wake-up process transitions the communicator from the first mode to the second mode. The controller executes the wake-up process when, in the reception frame received while the communicator is operating in the first mode, the first field indicates that the information is valid and the second field indicates the identification information of the reception device.

With this configuration, the reception device can provide a new function, namely that the execution of a wake-up process based on the received frame can be appropriately controlled. For example, this configuration can contribute to a reduction in the processing load and the power consumption of the reception device.

For example, the reception device further includes a function unit configured to execute a function process related to a predetermined function. The controller causes the function unit to execute the function process based on a frame received while the communicator is operating in the second mode.

With this configuration, the execution of a predetermined function included in the reception device, such as, in an example in which the reception device is implemented as a television, a function for receiving a television broadcast and displaying an image, can be appropriately controlled via the received frame.

For example, the controller further causes the function unit execute the function process upon executing the wake-up process.

With this configuration, a predetermined function included in the reception device can be appropriately controlled upon the execution of the wake-up process.

For example, the first mode is a mode dedicated to placing the communicator in standby for reception of a frame including at least the first field.

With this configuration, the reception device operates with a reduced process load and reduced power consumption compared to when normal data frame transmission and reception is performed, by using a mode dedicated to placing the communicator in standby for reception of the first field. Moreover, the execution of the wake-up process can be appropriately controlled.

A transmission method according to one aspect of the present disclosure includes generating a frame in a predetermined frame format and transmitting the frame generated in the generating. The predetermined frame format includes a first field indicating whether information related to a wake-up process performed by a device that received a frame in the predetermined frame format is valid or not, and when the first field indicates that the information is valid, further includes a second field indicating identification information identifying the device.

This configuration achieves the same advantageous effects as those achieved by the transmission device.

A reception method according to one aspect of the present disclosure is executed by a reception device including a communicator that operates in one of a first mode and a second mode. The reception method includes receiving a frame by the communicator, and controlling which of the first mode and the second mode the communicator operates in based on a reception frame, the reception frame being in a predetermined frame format and being the frame received by the communicator. The predetermined frame format includes a first field indicating whether information related to a wake-up process performed by a device that received a frame in the predetermined frame format is valid or not, and when the first field indicates that the information is valid, further includes a second field indicating identification information identifying the device. The first mode is a mode in which the communicator is in standby for reception of a frame including at least the first field. The second mode is a mode in which the communicator performs normal data frame transmission and reception. The wake-up process transitions the communicator from the first mode to the second mode. The controlling executes the wake-up process when, in the reception frame received while the communicator is operating in the first mode, the first field indicates that the information is valid and the second field indicates the identification information of the reception device.

This configuration achieves the same advantageous effects as those achieved by the reception device.

General and specific aspect(s) disclosed above may be implemented using a system, a method, an integrated circuit, a computer program, or a computer-readable recording medium such as a CD-ROM, or any combination thereof.

The present disclosure is capable of facilitating or contributing to the realization of one or more of the following desires regarding the device having the first communication device and the system having the first communication device: further power consumption reduction; provision of new functions that utilize the first communication scheme, and provision of new functions that utilize a combination of a plurality of communication schemes.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, a device having functionality for communicating using a plurality of communication schemes or including a plurality of communication devices will be described.

Embodiment 1

Figure 1:
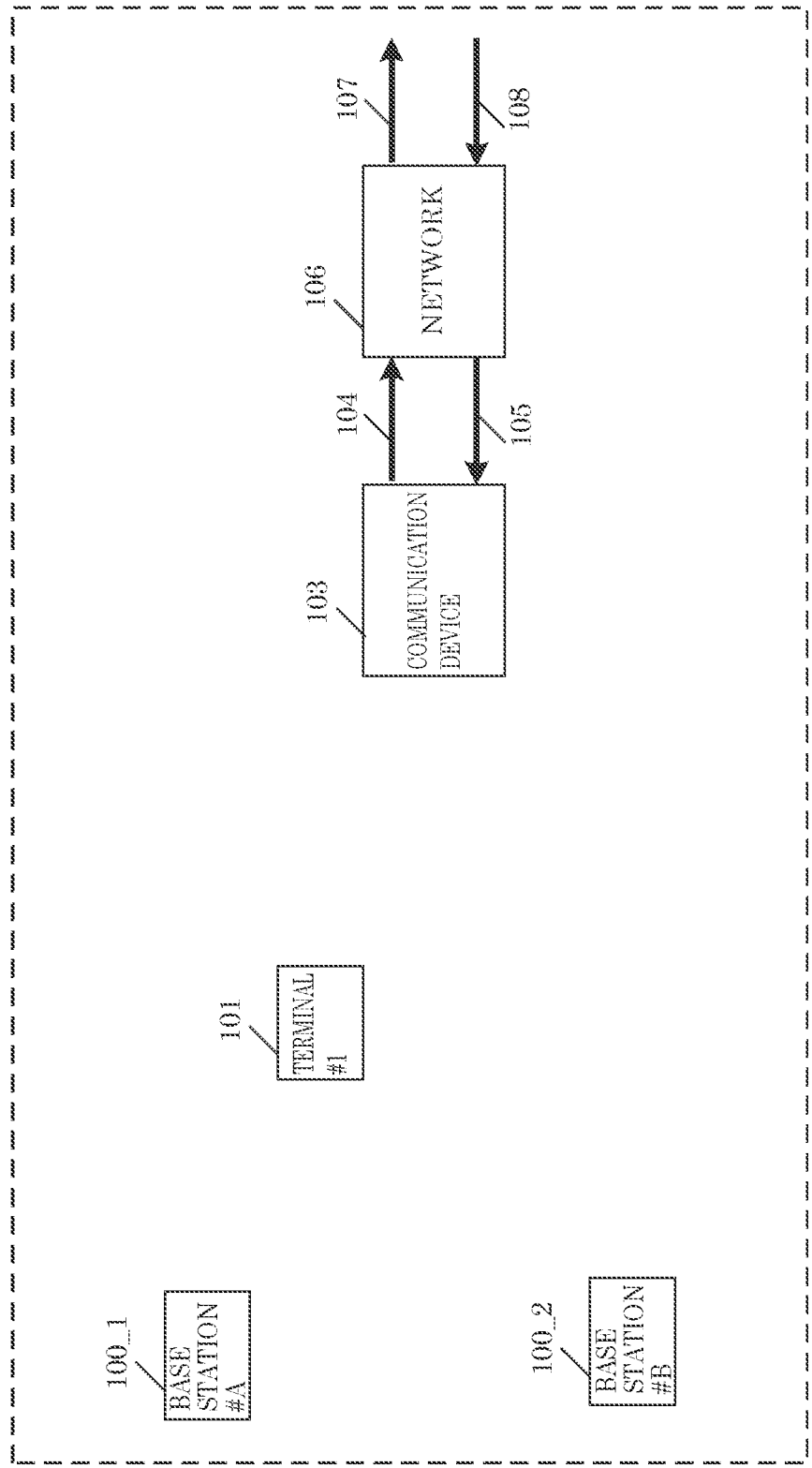
FIG. 1 illustrates one example of a configuration of a system.

FIG. 1 illustrates one example of a configuration of a communication system according to the present embodiment.

Terminal #1 labeled 101 communicates with communication device 103 using a first communication scheme. For example, terminal #1 labeled 101 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #1 labeled 101. Terminal #1 labeled 101 receives the modulated signal, performs processing such as demodulation and error correction decoding, and obtains the data.

Terminal #1 labeled 101 communicates with base station #A labeled 100_1 using a second communication scheme. For example, terminal #1 labeled 101 generates a modulated signal conforming to the second communication scheme that includes data, and transmits the modulated signal to base station #A labeled 100_1. Base station #A labeled 100_1 receives the modulated signal, performs processing such as demodulation and error correction decoding, and obtains the data.

Base station #A labeled 100_1 generates a modulated signal conforming to the second communication scheme that includes data, and transmits the modulated signal to terminal #1 labeled 101. Terminal #1 labeled 101 receives the modulated signal, performs processing such as demodulation and error correction decoding, and obtains the data.

Terminal #1 labeled 101 communicates with base station #B labeled 100_2 using a third communication scheme. For example, terminal #1 labeled 101 generates a modulated signal conforming to the third communication scheme that includes data, and transmits the modulated signal to base station #B labeled 100_2. Base station #B labeled 100_2 receives the modulated signal, performs processing such as demodulation and error correction decoding, and obtains the data.

For example, communication device 103 forwards, for example, data obtained from another device to, for example, a server via, for example, network 106. The flow of data is indicated by the arrows labeled 108 and 105, and the data flows in the listed order.

Communication device 103 transmits data obtained from another device to a device such as a server via network 106. The flow of data is indicated by the arrows labeled 104 and 107, and the data flows in the listed order.

Figure 2:
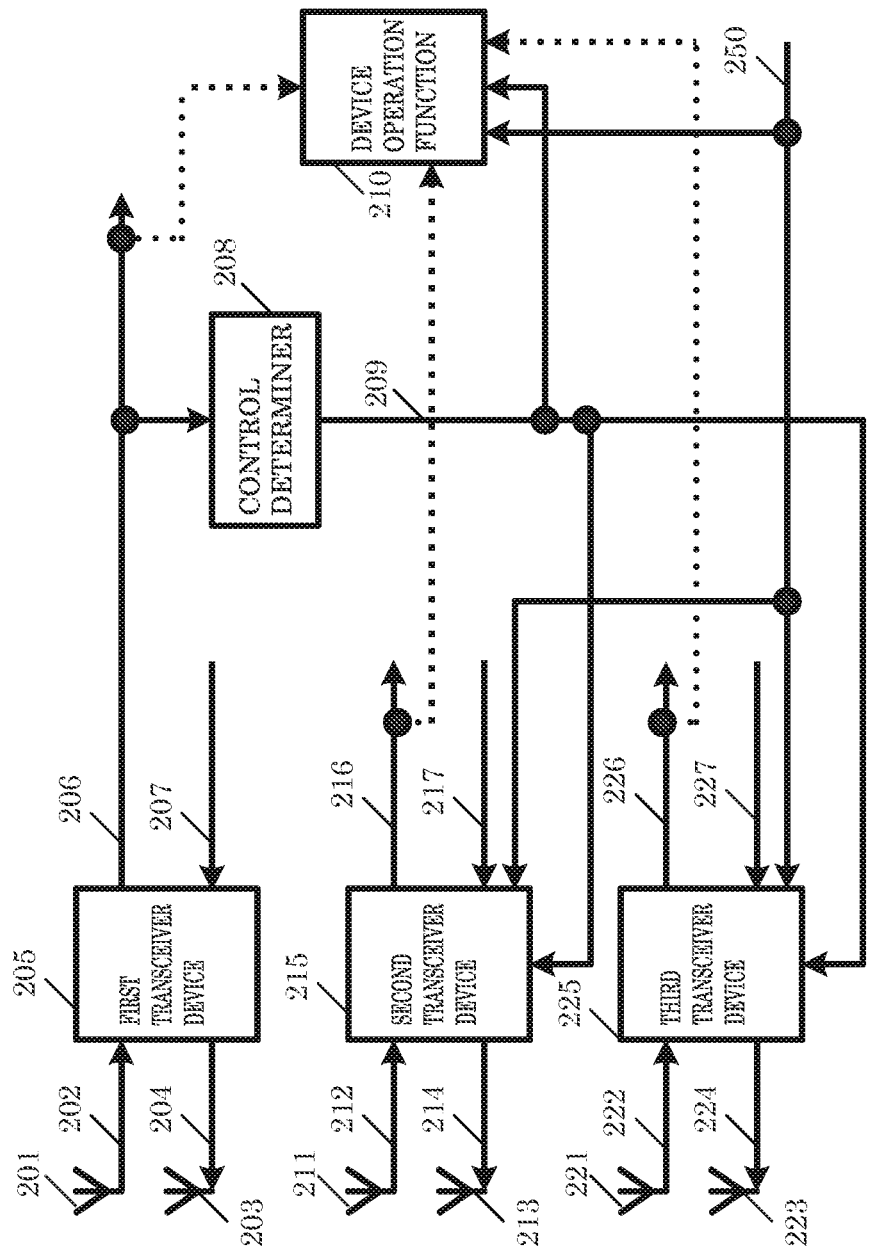
FIG. 2 illustrates one example of a configuration of a communication device.

FIG. 2 illustrates one example of a configuration of terminal #1 labeled 101 illustrated in FIG. 1. Transceiver device 205 illustrated in FIG. 2 performs processing for transmission via the first communication scheme, and performs processing for reception via the first communication scheme.

First transceiver device 205 receives an input of data 207, performs processing for the first communication scheme, such as error correction encoding, modulation, and frequency conversion, and generates and outputs modulated signal 204 conforming to the first communication scheme. Modulated signal 204 conforming to the first communication scheme is then output as radio waves from antenna 203.

First transceiver device 205 receives an input of modulated signal 202 conforming to the first communication scheme received via antenna 201, performs processing such as demodulation and error correction decoding, and obtains data 206.

Control determiner 208 receives an input of data 206, determines whether to wake up second transceiver device 215, determines whether to wake up third transceiver device 225, and determines whether to wake up device operation function 210, and outputs control signal 209 including information on these determinations.

Second transceiver device 215 receives an input of control signal 209, and thereby obtains information on the determination of whether to wake up second transceiver device 215.

Here, when the determination is to wake up second transceiver device 215, if second transceiver device 215 is sleeping, second transceiver device 215 wakes up and begins communicating.

When the determination is to not wake up second transceiver device 215, if second transceiver device 215 is sleeping, second transceiver device 215 keeps sleeping. Note that if second transceiver device 215 is operating, second transceiver device 215 may sleep.

Second transceiver device 215, third transceiver device 225, and device operation function 210 receive an input of operation control signal 250. Second transceiver device 215 is controlled according to control information related to operation of the second transceiver device, which is included in operation control signal 250. For example, when the control information related to operation of the second transceiver device is information indicating to stop operation of second transceiver device 215 and place second transceiver device 215 in standby, second transceiver device 215 stops operation and enters standby. This reduces the power consumption of second transceiver device 215.

As described above, second transceiver device 215 only operates its communication functionality when required, in accordance with control signal 209 and operation control signal 250. This achieves the advantageous effect of reduced power consumption.

In addition to the information on the determination of whether to wake up second transceiver device 215, control signal 209 may also include control information for putting second transceiver device 215 to sleep. This will be described in greater detail later.

Similarly, third transceiver device 225 receives an input of control signal 209, and thereby obtains information on the determination of whether to wake up third transceiver device 225.

Here, when the determination is to wake up third transceiver device 225, if third transceiver device 225 is sleeping, third transceiver device 225 wakes up and begins communicating.

When the determination is to not wake up third transceiver device 225, if third transceiver device 225 is sleeping, third transceiver device 225 keeps sleeping. Note that if third transceiver device 225 is operating, third transceiver device 225 may sleep.

Second transceiver device 215, third transceiver device 225, and device operation function 210 receive an input of operation control signal 250. Third transceiver device 225 is controlled according to control information related to operation of the third transceiver device, which is included in operation control signal 250. For example, when the control information related to operation of the third transceiver device is information indicating to stop operation of third transceiver device 225 and place third transceiver device 225 in standby, third transceiver device 225 stops operation and enters standby. This reduces the power consumption of third transceiver device 225.

As described above, third transceiver device 225 only operates its communication functionality when required, in accordance with control signal 209 and operation control signal 250. This achieves the advantageous effect of reduced power consumption.

In addition to the information on the determination of whether to wake up third transceiver device 225, control signal 209 may also include control information for putting third transceiver device 225 to sleep. This will be described in greater detail later.

Device operation function 210 receives an input of control signal 209, and thereby obtains information on the determination of whether to wake up device operation function 210.

Here, when the determination is to wake up device operation function 210, if device operation function 210 is sleeping, device operation function 210 wakes up.

When the determination is to not wake up device operation function 210, if device operation function 210 is sleeping, device operation function 210 keeps sleeping. Note that if device operation function 210 is operating, device operation function 210 may sleep.

Second transceiver device 215, third transceiver device 225, and device operation function 210 receive an input of operation control signal 250. Device operation function 210 is controlled according to control information related to operation of the device operation function, which is included in operation control signal 250. For example, when the control information related to operation of device operation function 210 is information indicating to stop operation of device operation function 210 and place device operation function 210 in standby, device operation function 210 stops operation and enters standby. This reduces the power consumption of device operation function 210.

As described above, device operation function 210 only operates its device operation functionality when required, in accordance with control signal 209 and operation control signal 250. This achieves the advantageous effect of reduced power consumption.

In addition to the information on the determination of whether to wake up device operation function 210, control signal 209 may also include control information for putting device operation function 210 to sleep. This will be described in greater detail later.

Note that a device operation function is a function for an operation of a device other than a communication device. For example, when the device illustrated in FIG. 2 is implemented in a vehicle, one example of the device operation function is a function for an operation related to the vehicle.

In another example, when the device illustrated in FIG. 2 is implemented in a home appliance, one example of the device operation function is a function for an operation related to the home appliance. For example, when the device illustrated in FIG. 2 is implemented in a computer, the device operation function is a function for an operation related to the computer. In another example, when the device illustrated in FIG. 2 is implemented in a television, the device operation function is a function for an operation related to the television. Although a vehicle and home appliances are given as examples, devices other than communication devices are not limited to these examples.

Figure 3:
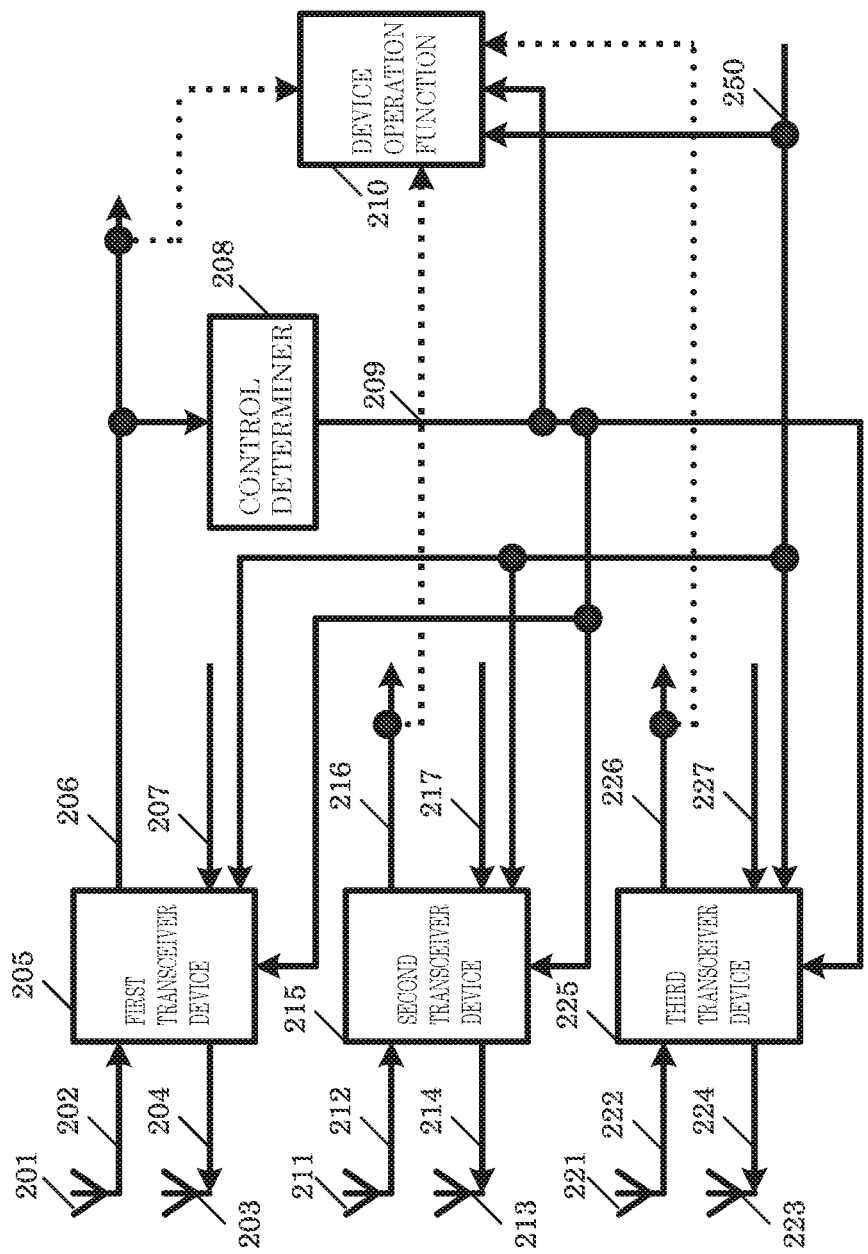
FIG. 3 illustrates one example of a configuration of a communication device.

FIG. 3 illustrates one example of a configuration of terminal #1 labeled 101 illustrated in FIG. 1 that differs from the example illustrated in FIG. 2. FIG. 3 differs from FIG. 2 in that first transceiver device 205 receives an input of control signal 209. Note that in FIG. 3, elements that operate the same as in FIG. 2 share like reference signs, and repeated description thereof will be omitted.

Control determiner 208 receives an input of data 206, determines whether to wake up the transmission function of first transceiver device 205, determines whether to wake up second transceiver device 215, determines whether to wake up third transceiver device 225, and determines whether to wake up device operation function 210, and outputs control signal 209 including information on these determinations.

First transceiver device 205 receives an input of control signal 209, and thereby obtains information on the determination of whether to wake up the transmission function of first transceiver device 205.

Here, when the determination is to wake up the transmission function of first transceiver device 205, if the transmission function of first transceiver device 205 is sleeping, the transmission function of first transceiver device 205 wakes up.

When the determination is to not wake up the transmission function of first transceiver device 205, if the transmission function of first transceiver device 205 is sleeping, the transmission function of first transceiver device 205 keeps sleeping. Note that if the transmission function of first transceiver device 205 is operating, the transmission function of first transceiver device 205 may sleep.

First transceiver device 205, second transceiver device 215, third transceiver device 225, and device operation function 210 receive an input of operation control signal 250. First transceiver device 205 is controlled according to control information related to operation of the transmission function of the first transceiver device, which is included in operation control signal 250. For example, when the control information related to operation of the transmission function of the first transceiver device is information indicating to stop operation of the transmission function of first transceiver device 205 and place the transmission function of first transceiver device 205 in standby, first transceiver device 205 stops operation of the transmission function and places the transmission function in standby. This reduces the power consumption of first transceiver device 205.

As described above, first transceiver device 205 only operates its communication functionality when required, in accordance with control signal 209 and operation control signal 250. This achieves the advantageous effect of reduced power consumption.

In addition to the information on the determination of whether to wake up the transmission function of first transceiver device 205, control signal 209 may also include control information for putting the transmission function of first transceiver device 205 to sleep. This will be described in greater detail later.

Figure 4:
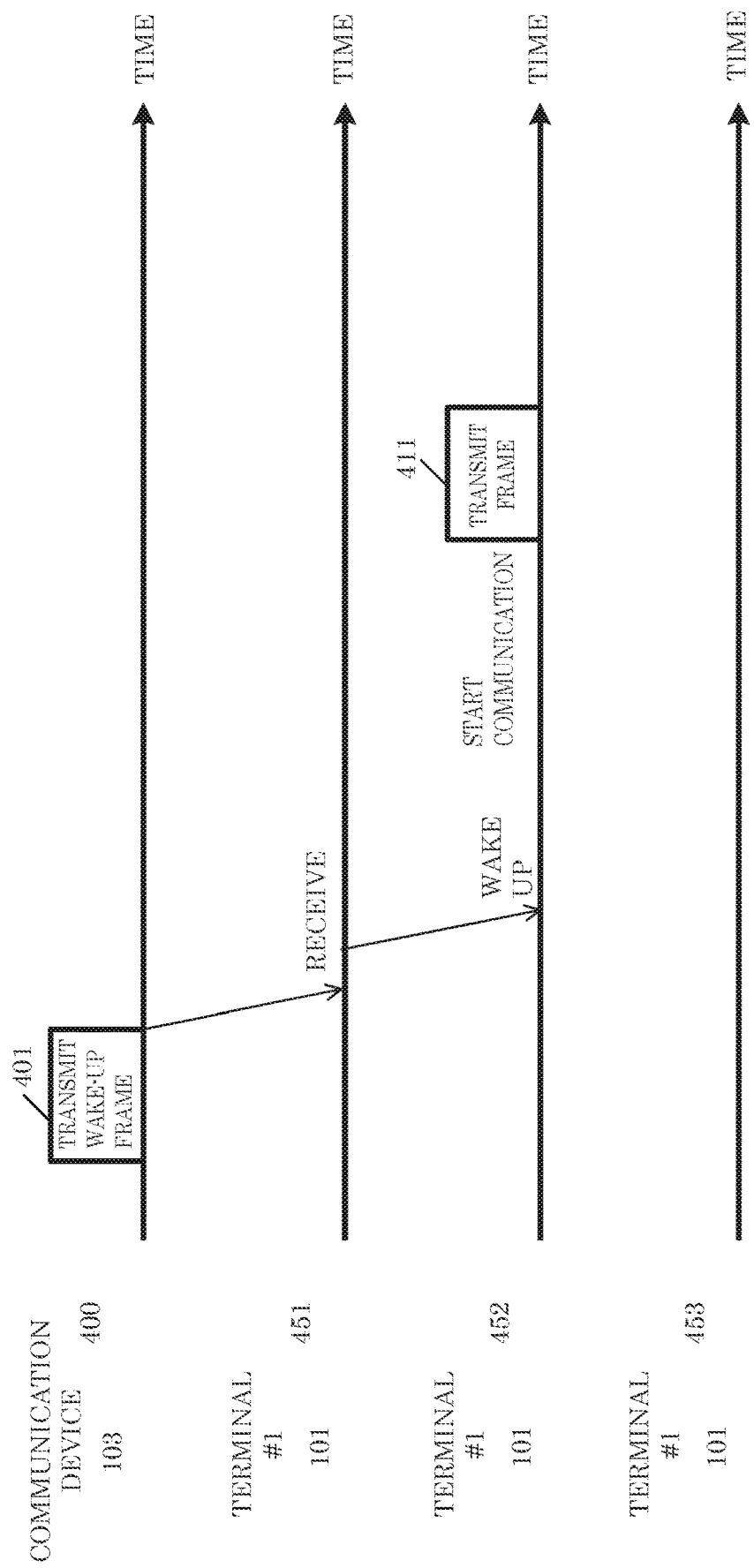
FIG. 4 illustrates one example of communication between a communication device and terminals.

FIG. 4 illustrates one example of the flow of communication, relative to the time axis, between communication device 103 and terminal #1 labeled 101, which are illustrated in FIG. 1. In FIG. 4, time is represented on the horizontal axis.

400 in FIG. 4 indicates an example of communication by communication device 103, relative to the time axis.

451 in FIG. 4 indicates an example of communication by first transceiver device 205 included in terminal #1 labeled 101, relative to the time axis.

452 in FIG. 4 indicates an example of communication by second transceiver device 215 included in terminal #1 labeled 101, relative to the time axis.

453 in FIG. 4 indicates an example of communication by third transceiver device 225 included in terminal #1 labeled 101, relative to the time axis.

As illustrated in FIG. 4, first, communication device 103 transmits a wake-up frame (401). In this example, the transmission of the wake-up frame (401) includes information indicating to wake up second transceiver device 215 included in terminal #1 labeled 101. In this example, the transmission of the wake-up frame (401) is configured as a modulated signal based on the first communication scheme.

First transceiver device 205 included in terminal #1 labeled 101 then receives wake-up frame 401. First transceiver device 205 included in terminal #1 labeled 101 then performs processing such as demodulation on wake-up frame 401, thereby obtaining the information indicating to wake up second transceiver device 215 included in terminal #1 labeled 101.

Accordingly, as illustrated in FIG. 4, second transceiver device 215 included in terminal #1 labeled 101 wakes up. Thereafter, base station #A labeled 100_1 and (second transceiver device 215 included in) terminal #1 labeled 101 that are illustrated in FIG. 1 start communicating.

In FIG. 4, after communication starts, second transceiver device 215 included in terminal #1 labeled 101 is exemplified as transmitting a frame (411).

Note that wake-up frame 401 in FIG. 4 may include information indicating to wake up device operation function 210 included in terminal #1 labeled 101. In such cases, based on wake-up frame 401, terminal #1 labeled 101 wakes up device operation function 210.

Wake-up frame 401 in FIG. 4 may also include information indicating to wake up the transmission function of first transceiver device 205 included in terminal #1 labeled 101. In such cases, based on wake-up frame 401, terminal #1 labeled 101 wakes up the transmission function of first transceiver device 205 included in terminal #1 labeled 101.

With this, a plurality of devices can be simultaneously woken up in response to the transmission of the wake-up frame, which eliminates the need to transmit the wake-up frame a plurality of times. This is advantageous as it increases data transmission speeds.

Figure 5:
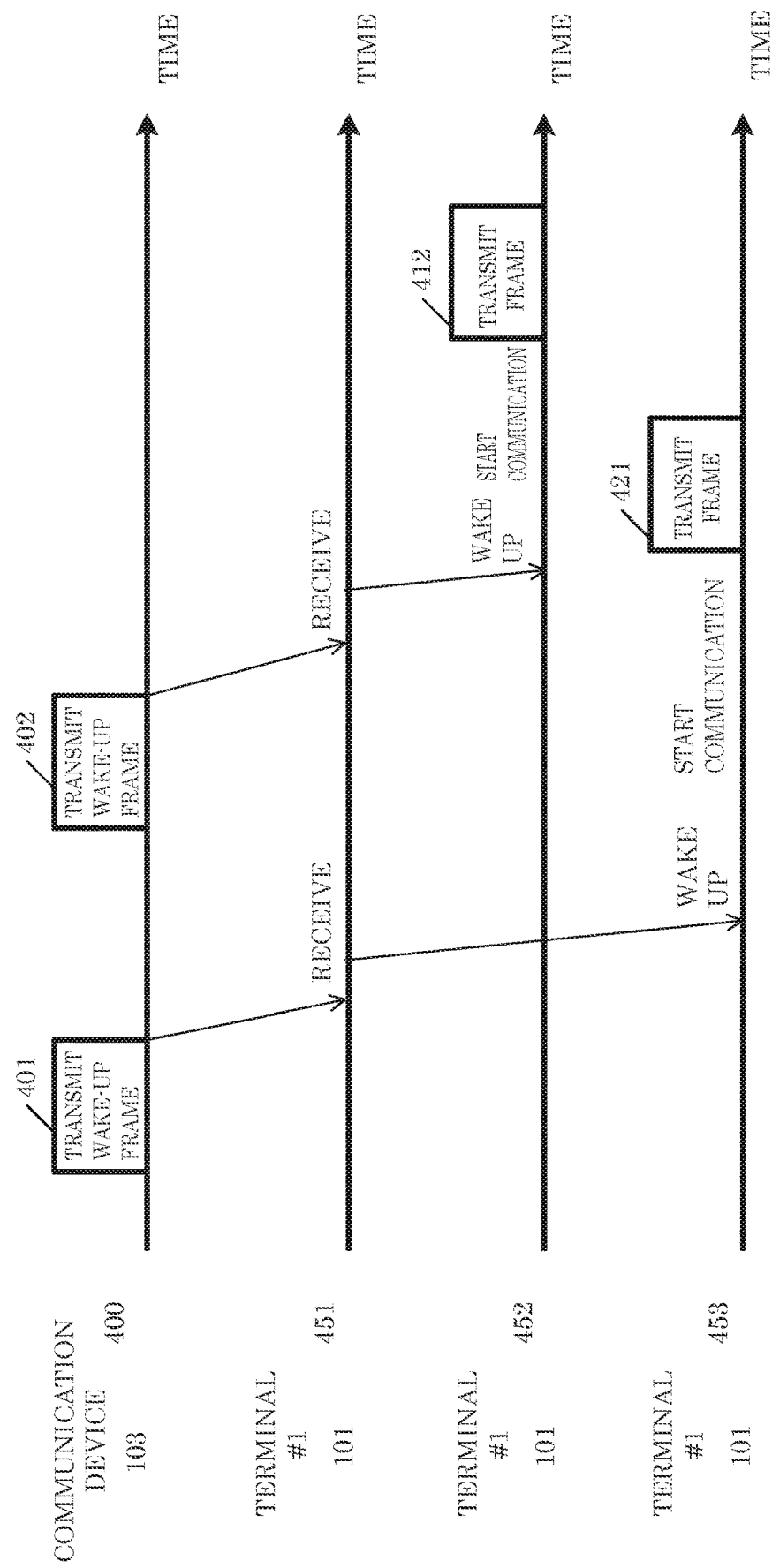
FIG. 5 illustrates one example of communication between a communication device and terminals.

FIG. 5 illustrates one example of the flow of communication, relative to the time axis, between communication device 103 and terminal #1 labeled 101, which are illustrated in FIG. 1. In FIG. 5, time is represented on the horizontal axis. 400 in FIG. 5 indicates an example of communication by communication device 103, relative to the time axis.

451 in FIG. 5 indicates an example of communication by first transceiver device 205 included in terminal #1 labeled 101, relative to the time axis. 452 in FIG. 5 indicates an example of communication by second transceiver device 215 included in terminal #1 labeled 101, relative to the time axis.

453 in FIG. 5 indicates an example of communication by third transceiver device 225 included in terminal #1 labeled 101, relative to the time axis.

As illustrated in FIG. 5, first, communication device 103 transmits a wake-up frame (401). In this example, the transmission of the wake-up frame (401) includes information indicating to wake up third transceiver device 225 included in terminal #1 labeled 101. In this example, the transmission of the wake-up frame (401) is configured as a modulated signal based on the first communication scheme.

First transceiver device 205 included in terminal #1 labeled 101 then receives wake-up frame 401. First transceiver device 205 included in terminal #1 labeled 101 then performs processing such as demodulation on wake-up frame 401, thereby obtaining the information indicating to wake up third transceiver device 225 included in terminal #1 labeled 101.

Accordingly, as illustrated in FIG. 5, third transceiver device 225 included in terminal #1 labeled 101 wakes up. Thereafter, base station #B labeled 100_2 and (third transceiver device 225 included in) terminal #1 labeled 101 that are illustrated in FIG. 1 start communicating.

In FIG. 5, after communication starts, third transceiver device 225 included in terminal #1 labeled 101 is exemplified as transmitting a frame (421).

Communication device 103 transmits a wake-up frame (402). In this example, the transmission of the wake-up frame (402) includes information indicating to wake up second transceiver device 215 included in terminal #1 labeled 101. In this example, the transmission of the wake-up frame (402) is configured as a modulated signal based on the first communication scheme.

First transceiver device 205 included in terminal #1 labeled 101 then receives wake-up frame 402. First transceiver device 205 included in terminal #1 labeled 101 then performs processing such as demodulation on wake-up frame 402, thereby obtaining the information indicating to wake up second transceiver device 215 included in terminal #1 labeled 101.

Accordingly, as illustrated in FIG. 5, second transceiver device 215 included in terminal #1 labeled 101 wakes up. Thereafter, base station #A labeled 100_1 and (second transceiver device 215 included in) terminal #1 labeled 101 that are illustrated in FIG. 1 start communicating.

In FIG. 5, after communication starts, second transceiver device 215 included in terminal #1 labeled 101 is exemplified as transmitting a frame (412).

Note that wake-up frame 401 in FIG. 5 may include information indicating to wake up device operation function 210 included in terminal #1 labeled 101. In such cases, based on wake-up frame 401, terminal #1 labeled 101 wakes up device operation function 210.

Wake-up frame 401 in FIG. 5 may also include information indicating to wake up the transmission function of first transceiver device 205 included in terminal #1 labeled 101. In such cases, based on wake-up frame 401, terminal #1 labeled 101 wakes up the transmission function of first transceiver device 205 included in terminal #1 labeled 101.

Note that wake-up frame 402 in FIG. 5 may include information indicating to wake up device operation function 210 included in terminal #1 labeled 101. Here, based on wake-up frame 402, terminal #1 labeled 101 wakes up device operation function 210.

Wake-up frame 402 in FIG. 5 may also include information indicating to wake up the transmission function of first transceiver device 205 included in terminal #1 labeled 101. Here, based on wake-up frame 402, terminal #1 labeled 101 wakes up the transmission function of first transceiver device 205 included in terminal #1 labeled 101.

With this, a plurality of devices can be simultaneously woken up in response to the transmission of the wake-up frame, which eliminates the need to transmit the wake-up frame a plurality of times. This is advantageous as it increases data transmission speeds.

Figure 6:
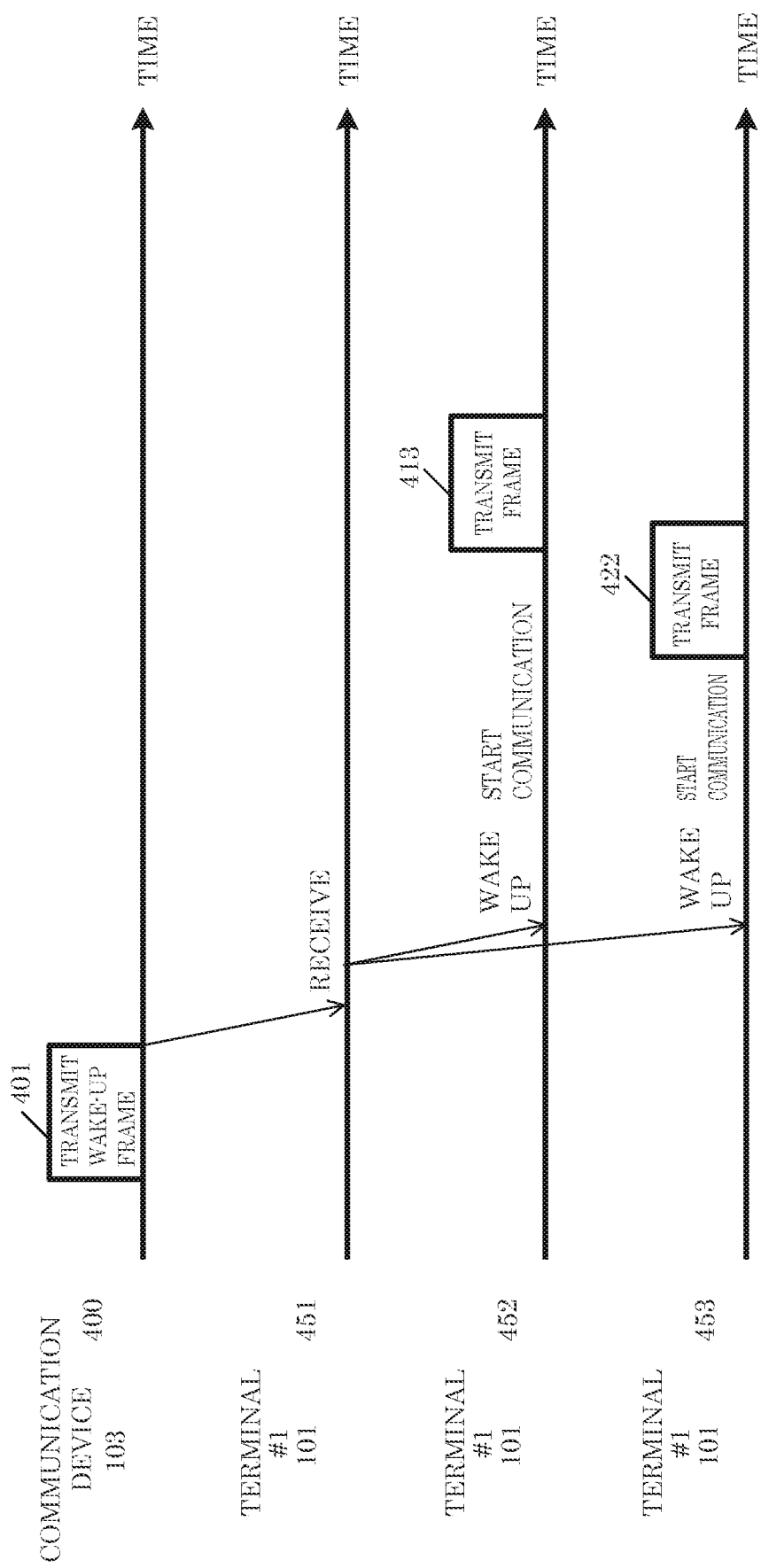
FIG. 6 illustrates one example of communication between a communication device and terminals.

FIG. 6 illustrates one example of the flow of communication, relative to the time axis, between communication device 103 and terminal #1 labeled 101, which are illustrated in FIG. 1. In FIG. 6, time is represented on the horizontal axis.

400 in FIG. 6 indicates an example of communication by communication device 103, relative to the time axis.

451 in FIG. 6 indicates an example of communication by first transceiver device 205 included in terminal #1 labeled 101, relative to the time axis.

452 in FIG. 6 indicates an example of communication by second transceiver device 215 included in terminal #1 labeled 101, relative to the time axis.

453 in FIG. 6 indicates an example of communication by third transceiver device 225 included in terminal #1 labeled 101, relative to the time axis.

As illustrated in FIG. 6, communication device 103 transmits a wake-up frame (401). In this example, the transmission of the wake-up frame (401) includes information indicating to wake up second transceiver device 215 included in terminal #1 labeled 101 and information indicating to wake up third transceiver device 225 included in terminal #1 labeled 101. In this example, the transmission of the wake-up frame (401) is configured as a modulated signal based on the first communication scheme. In this way, a plurality of communication schemes may be simultaneously woken up in response to the transmission of the wake-up frame, which eliminates the need to transmit the wake-up frame a plurality of times. This is advantageous as it increases data transmission speeds.

First transceiver device 205 included in terminal #1 labeled 101 receives wake-up frame 401. First transceiver device 205 included in terminal #1 labeled 101 then performs processing such as demodulation on wake-up frame 401, thereby obtaining the information indicating to wake up second transceiver device 215 included in terminal #1 labeled 101 and the information indicating to wake up third transceiver device 225 included in terminal #1 labeled 101.

Accordingly, as illustrated in FIG. 6, second transceiver device 215 included in terminal #1 labeled 101 wakes up, and third transceiver device 225 included in terminal #1 labeled 101 also wakes up. Thereafter, base station #A labeled 100_1 and (second transceiver device 215 included in) terminal #1 labeled 101 that are illustrated in FIG. 1 start communicating, and base station #B labeled 100_2 and (third transceiver device 225 included in) terminal #1 labeled 101 that are illustrated in FIG. 1 start communicating.

In FIG. 6, after communication starts, second transceiver device 215 included in terminal #1 labeled 101 is exemplified as transmitting a frame (413), and furthermore, third transceiver device 225 included in terminal #1 labeled 101 is exemplified as transmitting a frame (422).

Note that wake-up frame 401 in FIG. 6 may include information indicating to wake up device operation function 210 included in terminal #1 labeled 101. In such cases, based on wake-up frame 401, terminal #1 labeled 101 wakes up device operation function 210.

Wake-up frame 401 in FIG. 6 may also include information indicating to wake up the transmission function of first transceiver device 205 included in terminal #1 labeled 101. In such cases, based on wake-up frame 401, terminal #1 labeled 101 wakes up the transmission function of first transceiver device 205 included in terminal #1 labeled 101.

With this, a plurality of devices can be simultaneously woken up in response to the transmission of the wake-up frame, which eliminates the need to transmit the wake-up frame a plurality of times. This is advantageous as it increases data transmission speeds.

Next, an example of operations performed after the wake-up operation in the flow of communication, relative to the time axis, between communication device 103 and terminal #1 labeled 101, which are illustrated in FIG. 1, described in FIG. 4, FIG. 5, and FIG. 6 will be given.

For example, in FIG. 4, after first transceiver device 205 included in terminal #1 labeled 101 receives wake-up frame 401, second transceiver device 215 included in terminal #1 labeled 101 wakes up.

Hereinafter, an example of subsequent operations will be given. After first transceiver device 205 included in terminal #1 labeled 101 receives wake-up frame 401, second transceiver device 215 included in terminal #1 labeled 101 wakes up. At this time, base station #A labeled 100_1 illustrated in FIG. 1, which is the communication partner of second transceiver device 215 included in terminal #1 labeled 101, transmits a modulated signal including software data for executing an operation of device operation function 210 or a modulated signal including updated software data for executing an operation of device operation function 210. Note that wake-up frame 401 may include information indicating to wake up device operation function 210. Device operation function 210 may be woken up by this information.

In such cases, since second transceiver device 215 included in terminal #1 labeled 101 has been woken up, second transceiver device 215 included in terminal #1 labeled 101 is capable of receiving the modulated signal including software data for executing an operation of device operation function 210 or the modulated signal including updated software data for executing an operation of device operation function 210. Second transceiver device 215 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of second transceiver device 215 and the updating of the software for device operation function 210 together, this has the advantageous effect of being able to execute the updating of the software for device operation function 210 with more certainty.

Furthermore, by executing the waking up of device operation function 210, the waking up of second transceiver device 215, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 216 (the dotted line).

This is to obtain the software data. Note that when device operation function 210 obtains the software, the software is installed at a suitable time.

For example, in FIG. 5, after first transceiver device 205 included in terminal #1 labeled 101 receives wake-up frame 401, third transceiver device 225 included in terminal #1 labeled 101 wakes up. Hereinafter, an example of subsequent operations will be given.

After first transceiver device 205 included in terminal #1 labeled 101 receives wake-up frame 401, third transceiver device 225 included in terminal #1 labeled 101 wakes up. At this time, base station #B labeled 100_2 illustrated in FIG. 1, which is the communication partner of third transceiver device 225 included in terminal #1 labeled 101, transmits a modulated signal including software data for executing an operation of device operation function 210 or a modulated signal including updated software data for executing an operation of device operation function 210. Note that wake-up frame 401 may include information indicating to wake up device operation function 210. Device operation function 210 may be woken up by this information.

In such cases, since third transceiver device 225 included in terminal #1 labeled 101 has been woken up, third transceiver device 225 included in terminal #1 labeled 101 is capable of receiving the modulated signal including software data for executing an operation of device operation function 210 or the modulated signal including updated software data for executing an operation of device operation function 210. Third transceiver device 225 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of third transceiver device 225 and the updating of the software for device operation function 210 together, this has the advantageous effect of being able to execute the updating of the software for device operation function 210 with more certainty.

Furthermore, by executing the waking up of device operation function 210, the waking up of third transceiver device 225, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 226 (the dotted line). This is to obtain the software data. Note that when device operation function 210 obtains the software, the software is installed at a suitable time.

Hereinafter, another example will be given. In FIG. 5, after first transceiver device 205 included in terminal #1 labeled 101 receives wake-up frame 402, second transceiver device 215 included in terminal #1 labeled 101 wakes up. Hereinafter, an example of subsequent operations will be given.

After first transceiver device 205 included in terminal #1 labeled 101 receives wake-up frame 402, second transceiver device 215 included in terminal #1 labeled 101 wakes up. At this time, base station #A labeled 100_1 illustrated in FIG. 1, which is the communication partner of second transceiver device 215 included in terminal #1 labeled 101, transmits a modulated signal including software data for executing an operation of device operation function 210 or a modulated signal including updated software data for executing an operation of device operation function 210. Note that wake-up frame 402 may include information indicating to wake up device operation function 210. Device operation function 210 may be woken up by this information.

In such cases, since second transceiver device 215 included in terminal #1 labeled 101 has been woken up, second transceiver device 215 included in terminal #1 labeled 101 is capable of receiving the modulated signal including software data for executing an operation of device operation function 210 or the modulated signal including updated software data for executing an operation of device operation function 210. Second transceiver device 215 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of second transceiver device 215 and the updating of the software for device operation function 210 together, this has the advantageous effect of being able to execute the updating of the software for device operation function 210 with more certainty.

Furthermore, by executing the waking up of device operation function 210, the waking up of second transceiver device 215, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 216 (the dotted line). This is to obtain the software data. Note that when device operation function 210 obtains the software, the software is installed at a suitable time.

In another example, in FIG. 5, first transceiver device 205 included in terminal #1 labeled 101 may transmit, together with wake-up frame 402, the modulated signal including software data for executing an operation of device operation function 210 or the modulated signal including updated software data for executing an operation of device operation function 210. Note that wake-up frame 402 may include information indicating to wake up device operation function 210. Device operation function 210 may be woken up by this information.

Alternatively, in FIG. 5, first transceiver device 205 included in terminal #1 labeled 101 may transmit, after the transmission of wake-up frame 402, the modulated signal including software data for executing an operation of device operation function 210 or the modulated signal including updated software data for executing an operation of device operation function 210. Note that wake-up frame 402 may include information indicating to wake up device operation function 210. Device operation function 210 may be woken up by this information.

In such cases, since the reception function of first transceiver device 205 included in terminal #1 labeled 101 is operating, second transceiver device 215 included in terminal #1 labeled 101 is capable of receiving the modulated signal including software data for executing an operation of device operation function 210 or the modulated signal including updated software data for executing an operation of device operation function 210. First transceiver device 205 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210.

Note that by executing the waking up of device operation function 210 and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 206 (the dotted line). This is to obtain the software data. Note that when device operation function 210 obtains the software, the software is installed at a suitable time.

Figure 7:
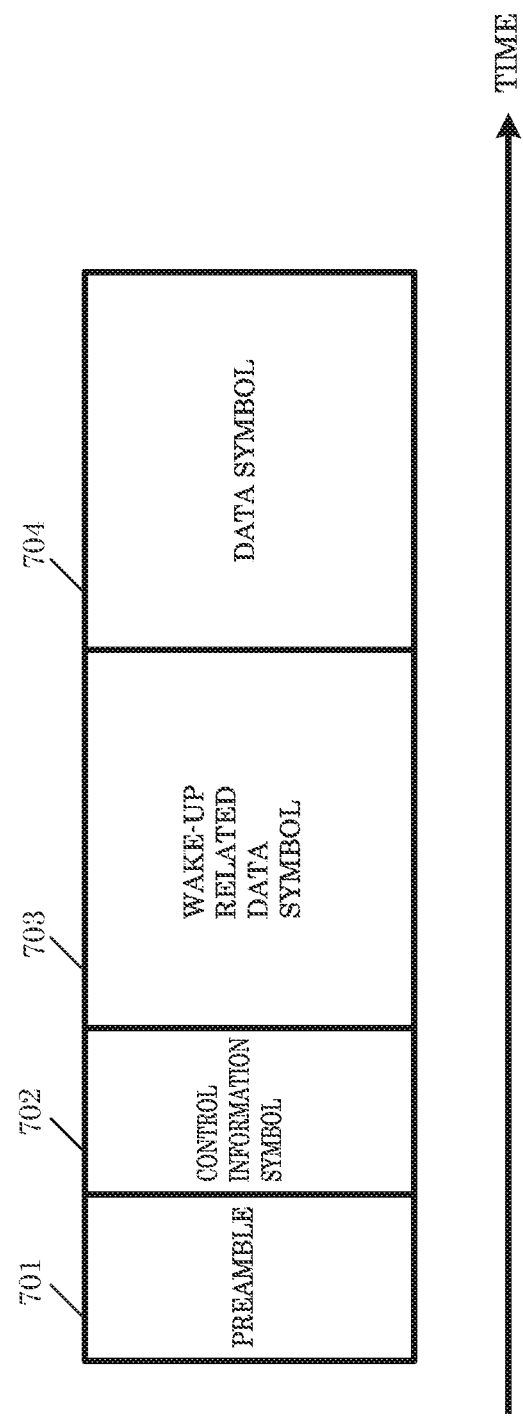
FIG. 7 illustrates one example of a configuration of a frame.

FIG. 7 illustrates one example of a configuration of wake-up frame 401 or 402 that is transmitted by communication device 103 and illustrated in FIG. 4, FIG. 5, and FIG. 6. In FIG. 7, time is represented on the horizontal axis.

Preamble 701 is a symbol for allowing the communication partner to perform time synchronization, frequency synchronization, frame synchronization, and/or channel estimation, etc.

Control information symbol 702 is a symbol for notifying the communication partner of, for example, communication rules. For example, control information symbol 702 is used for notifying the communication scheme, modulation scheme, and/or error correction encoding scheme of the modulated signal, and notifying the data length and/or packet length.

Wake-up related data symbol 703 is a symbol for notifying the communication partner of data related to a wake-up operation.

Data symbol 704 is a symbol for transmitting data to the communication partner.

Note that the frame configuration illustrated in FIG. 7 is merely one non-limiting example. Moreover, the frame may additionally include symbols not illustrated in FIG. 7.

Furthermore, although the terminology "preamble", "control information symbol", "wake-up related data symbol", and "data symbol" is used in FIG. 7, the names of the corresponding symbols are not limited to these examples. For example, the "wake-up related data symbol" may be referred to by some other name.

Hereinafter, the configuration of wake-up related data symbol 703, which is an important aspect of the present embodiment, will be described in greater detail.

Configuration Example

Figure 8:
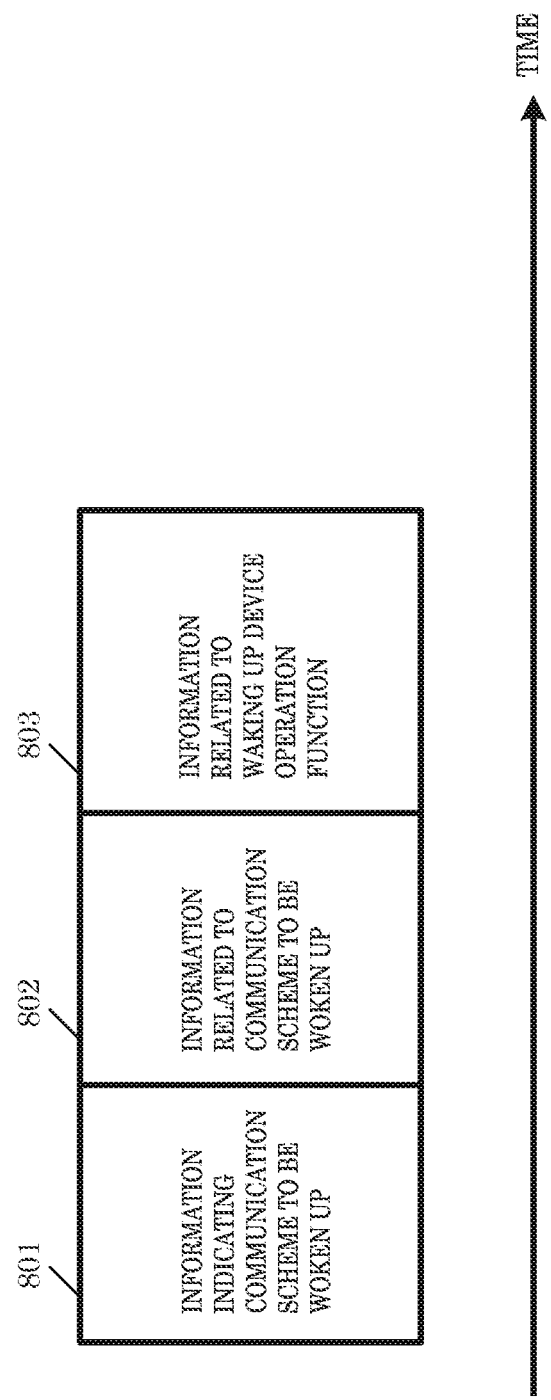
FIG. 8 illustrates one example of a configuration of a frame.

One example of a configuration of wake-up related data symbol 703 is illustrated in FIG. 8.

As illustrated in FIG. 8, wake-up related data symbol 703 includes, for example, information 801 indicating the communication scheme to be woken up, information 802 related to the communication scheme to be woken up, and information 803 related to waking up the device operation function.

Hereinafter, an example related to the configuration of information 801 indicating the communication scheme to be woken up will be given.

For example, consider a case in which communication device 103 transmits wake-up frame 401 and wakes up second transceiver device 215 included in terminal #1 labeled 101, that is to say, wakes up communication performed via the second communication scheme, as is illustrated in FIG. 4.

In this case, information 801 indicating the communication scheme to be woken up may be configured to include information indicating to wake up communication performed via the second communication scheme.

For example, information 801 indicating the communication scheme to be woken up is configured of the two bits of a0 and a1. In this case, communication device 103 transmits a0 and a1. a0 and a1 are defined as follows.

When a0=0 and a1=0, communication performed via the second communication scheme is not woken up, and communication performed via the third communication scheme is not woken up.

When a0=1 and a1=0, communication performed via the second communication scheme is woken up, and communication performed via the third communication scheme is not woken up.

When a0=0 and a1=1, communication performed via the second communication scheme is not woken up, and communication performed via the third communication scheme is woken up.

When a0=1 and a1=1, communication performed via the second communication scheme is woken up, and communication performed via the third communication scheme is woken up.

Hereinafter, another example will be given. In the example illustrated in FIG. 4, communication device 103 transmits wake-up frame 401 and wakes up second transceiver device 215 included in terminal #1 labeled 101, that is to say, wakes up communication performed via the second communication scheme. Moreover, communication device 103 does not wake up third transceiver device 225 included in terminal #1 labeled 101, that is to say, does not wake up communication performed via the third communication scheme.

In other words, information 801 indicating the communication scheme to be woken up may be configured so as to include information indicating "wake up" or "do not wake up" on a per communication scheme basis.

When terminal #1 labeled 101 is configured like illustrated in FIG. 2 or FIG. 3, communication schemes via which communication is possible include the second communication scheme and the third communication scheme. Accordingly, in the example illustrated in FIG. 4, information 801 indicating the communication scheme to be woken up includes information indicating to wake up communication performed via the second communication scheme and not wake up communication performed via the third communication scheme.

For example, information 801 indicating the communication scheme to be woken up is configured of the two bits of b0 and b1. In this case, communication device 103 transmits b0 and b1. b0 and b1 are defined as follows.

b0 is a bit related to communication performed via the second communication scheme. When b0=0, communication performed via the second communication scheme is not woken up, and when b0=1, communication performed via the second communication scheme is woken up.

b1 is a bit related to communication performed via the third communication scheme. When b1=0, communication performed via the third communication scheme is not woken up, and when b1=1, communication performed via the third communication scheme is woken up.

Communication device 103 may transmit, along with information 801 indicating the communication scheme to be woken up, information related to the communication scheme to be woken up.

For example, the second communication scheme supports communication via a 25 MHz band modulated signal and communication via a 50 MHz band modulated signal. Moreover, for example, the second communication scheme also supports single carrier communication and orthogonal frequency division multiplexing (OFDM) communication.

For example, communication device 103 transmits at least information indicating to wake up communication performed via the second communication scheme in information 801 indicating the communication scheme to be woken up. Here, for example, c0 and c1 are transmitted by communication device 103 as information 801 indicating the communication scheme to be woken up. c0 and c1 are defined as follows.

When c0=0, communication via a 25 MHz band modulated signal is performed under the second communication scheme, and when c0=1, communication via a 50 MHz band modulated signal is performed under the second communication scheme.

When c1=0, single carrier communication is performed under the second communication scheme, and when c1=1, OFDM communication is performed under the second communication scheme.

Communication device 103 may transmit information 803 related to waking up the device operation function. For example, information 803 related to waking up the device operation function is configured of the bit d0, and communication device 103 transmits d0. In this example, d0 is defined as follows.

When d0=0, device operation function 210 is not woken up, and when d0=1, device operation function 210 is woken up.

Configuring wake-up related data symbol 703 in this way allows terminal #1 labeled 101 to obtain wake-up frame information, which makes it possible to wake up a suitable device. This has the advantageous effect that power consumption of terminal #1 labeled 101 can be reduced.

Hereinafter, yet another example will be given. Information 801 indicating the communication scheme to be woken up may be configured so as to include information indicating "wake up", "do not wake up", "maintain current state", or "undefined (reserved)" on a per communication scheme basis. For example, information 801 indicating the communication scheme to be woken up is configured of the four bits of e0, e1, e2, and e3. In this case, communication device 103 transmits e0, e1, e2, and e3. e0, e1, e2, and e3 are defined as follows.

When e0=0 and e1=0, communication performed via the second communication scheme is woken up.

When e0=1 and e1=0, communication performed via the second communication scheme is put to sleep.

For example, having received this information, terminal #1 labeled 101 puts second transceiver device 215 to sleep. This has the advantageous effect that terminal #1 labeled 101 can further reduce power consumption.

When e0=0 and e1=1, the current communication state of the second communication scheme is maintained.

When e0=1 and e1=1, this indicates "undefined (or sleep)" (for example, upon receipt of this information, terminal #1 labeled 101 ignores the information (i.e., determines that the information is not valid); however, the information may be used at a later point in time).

When e2=0 and e3=0, communication performed via the third communication scheme is woken up.

When e2=1 and e3=0, communication performed via the third communication scheme is put to sleep.

For example, having received this information, terminal #1 labeled 101 puts third transceiver device 225 to sleep. This has the advantageous effect that terminal #1 labeled 101 can further reduce power consumption.

When e2=0 and e3=1, the current communication state of the third communication scheme is maintained.

When e2=1 and e3=1, this indicates "undefined (or sleep)" (for example, upon receipt of this information, terminal #1 labeled 101 ignores the information (i.e., determines that the information is not valid); however, the information may be used at a later point in time).

Configuring wake-up related data symbol 703 in this way allows terminal #1 labeled 101 is controlled according to instruction by communication device 103 so as to achieve a favorable communication state for each of the communication schemes. This has the advantageous effect that power consumption of terminal #1 labeled 101 can be reduced. Note that in the above description, the available modes are exemplified as "wake up", "sleep", "maintain current state", "undefined (reserved)", but the available modes are not limited to this example. The available modes may include one or more of "wake up", "sleep", "maintain current state", and "undefined (reserved)".

Hereinafter, yet another example will be given.

Communication device 103 may transmit information 803 related to waking up the device operation function. For example, information 803 related to waking up the device operation function is configured of the two bits of f0 and f1, and communication device 103 transmits f0 and f1. In this example, f0 is defined as follows.

When f0=0, device operation function 210 is not woken up, and when f0=1, device operation function 210 is woken up.

In this example, f1 is defined as emergency data. For example, f1 is information for notifying the device operation function of a significant defect or information for stopping operation of the device operation function due there being a significant defect in the device operation function. In this example, f1 is defined as follows.

When f1=0, there is a significant defect in the device operation function, and when f1=1, this stops operation of the device operation function due there being a significant defect in the device operation function.

This has the advantageous effect of being able to secure the safety of terminal #1 labeled 101. Note that usage of the instruction described above that stops operation of the device operation function due there being a significant defect in the device operation function is important.

Figure 9:
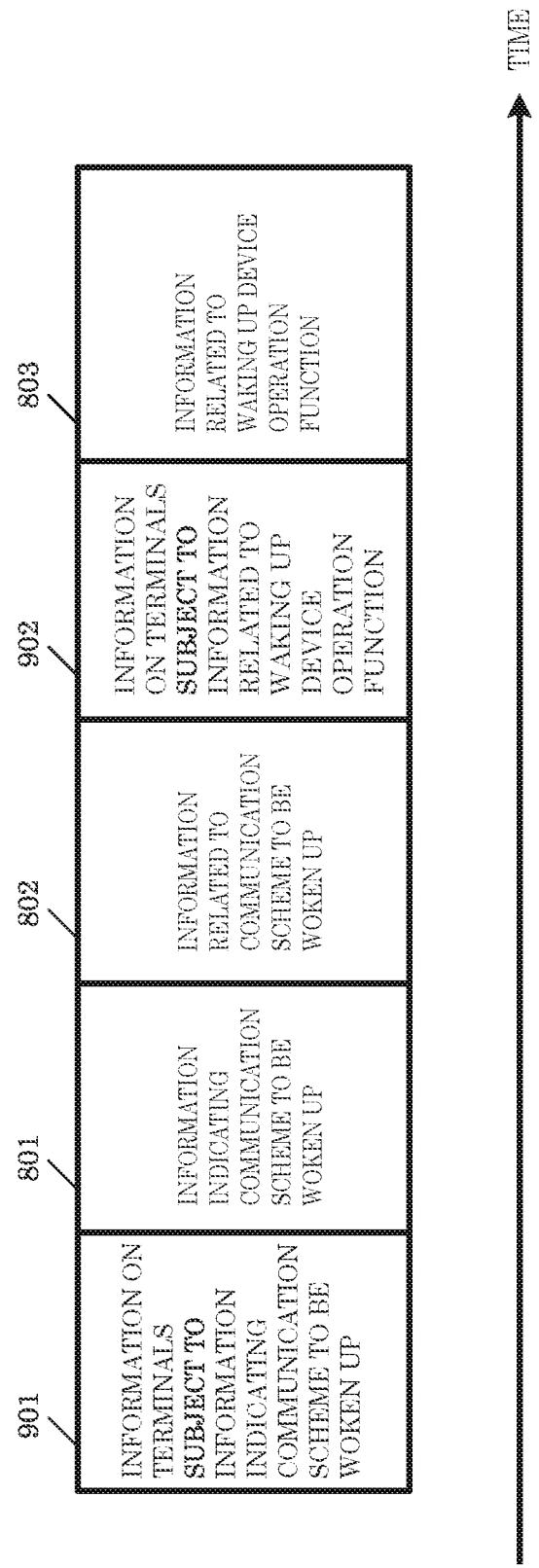
FIG. 9 illustrates one example of a configuration of a frame.

FIG. 9 illustrates another example of a configuration of wake-up related data symbol 703 that differs from the configuration illustrated in FIG. 8. Note that in FIG. 9, time is represented on the horizontal axis. Moreover, elements that operate the same as in FIG. 8 share like reference signs, and repeated description thereof will be omitted. FIG. 9 differs from FIG. 8 in regard to the inclusion of information 901 on terminals subject to the information indicating the communication scheme to be woken up and information 902 on terminals subject to the information related to waking up the device operation function.

For example, information 901 on terminals subject to the information indicating the communication scheme to be woken up may be configured so as to include information indicating "multicast transmission" or "unicast transmission" on a per communication scheme basis.

When terminal #1 labeled 101 is configured like illustrated in FIG. 2 or FIG. 3, examples of information 801 indicating the communication scheme to be woken up include information related to waking up the communication performed via the second communication scheme and information related to waking up the communication performed via the third communication scheme.

For example, information 901 on terminals subject to the information indicating the communication scheme to be woken up is configured of the two bits of g0 and g1. In this case, communication device 103 transmits g0 and g1. g0 and g1 are defined as follows.

When communication device 103 multicasts the information related to waking up the communication performed via the second communication scheme, g0 is set to 0 (g0=0), and when communication device 103 unicasts the information related to waking up the communication performed via the second communication scheme, g0 is set to 1 (g0=1).

When communication device 103 multicasts the information related to waking up the communication performed via the third communication scheme, g1 is set to 0 (g1=0), and when communication device 103 unicasts the information related to waking up the communication performed via the third communication scheme, g1 is set to 1 (g1=1).

Moreover, when g0 is set to 1 (g0=1) and the information related to waking up the communication performed via the second communication scheme is to be unicast, information indicating the type and/or information indicating a unique number (for example, the identification (ID) or serial number) of each of terminals subject to the information related to waking up the communication performed via the second communication scheme may be transmitted by communication device 103. Here, as a result of a terminal obtaining the information indicating the type and/or the information indicating a unique number (for example, the identification (ID) or serial number) of each of terminals, the terminal determines whether the information related to waking up the communication performed via the second communication scheme is valid or not. With this, a terminal that is the communication partner of communication device 103 determines whether the information related to waking up the communication performed via the second communication scheme is valid or not and performs control in accordance with the determination result. This achieves the advantageous effect that appropriate control can be performed.

Figure 10:
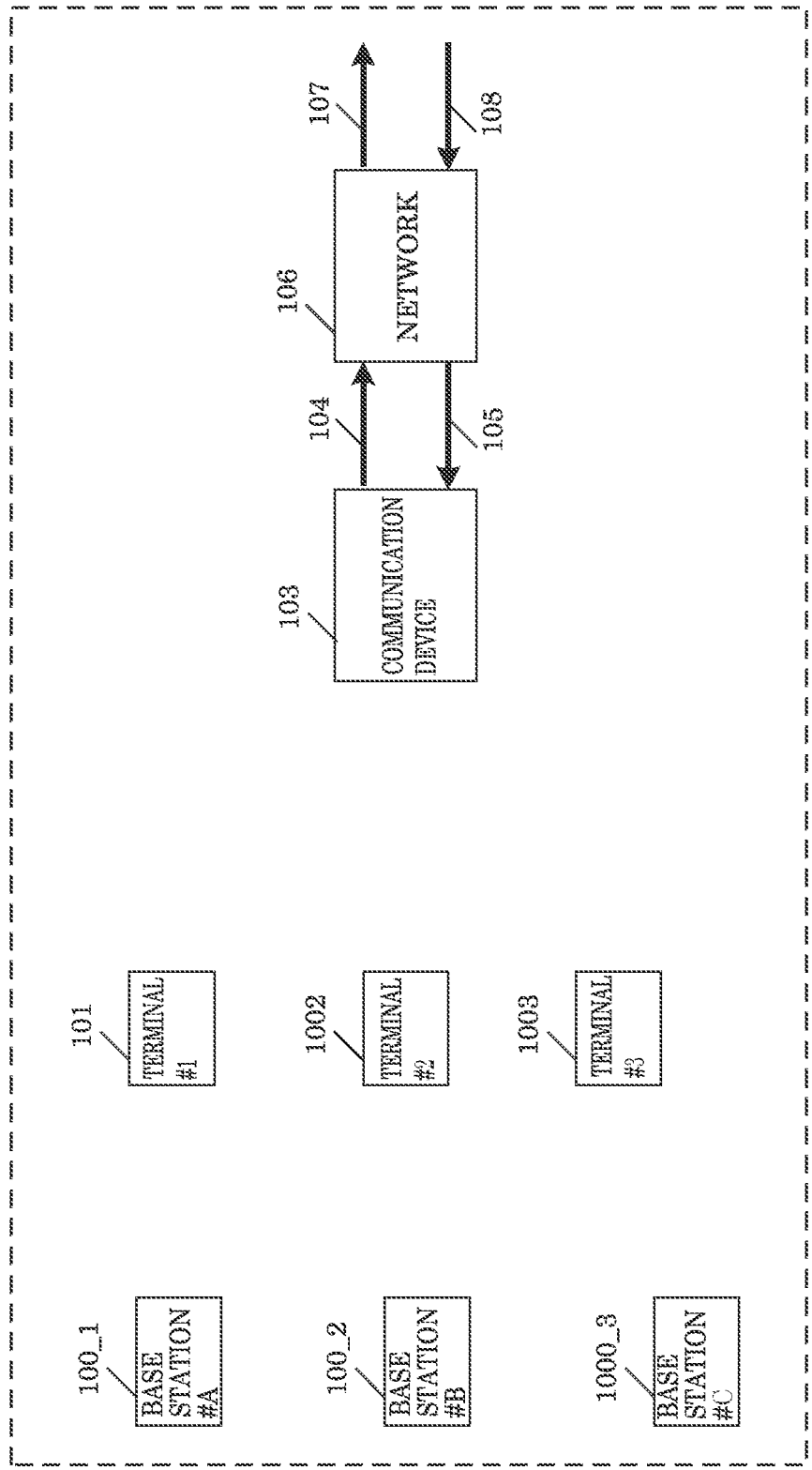
FIG. 10 illustrates one example of a configuration of a system.

Note that multicast refers to, for example in the case of FIG. 10, the communication device transmitting modulated signals including the same information to a plurality of terminals, namely terminal #1 labeled 101, terminal #2 labeled 1002, and terminal #3 labeled 1003.

Moreover, when g0 is set to 0 (g0=0) and the information related to waking up the communication performed via the second communication scheme is to be multicast, information indicating the type and/or information indicating a unique number (for example, the identification (ID) or serial number) of each of terminals subject to the information related to waking up the communication performed via the second communication scheme may be transmitted by communication device 103. Here, as a result of a terminal obtaining the information indicating the type and/or the information indicating a unique number (for example, the identification (ID) or serial number) of each of terminals, the terminal determines whether the information related to waking up the communication performed via the second communication scheme is valid or not. With this, a terminal that is the communication partner of communication device 103 determines whether the information related to waking up the communication performed via the second communication scheme is valid or not and performs control in accordance with the determination result. This achieves the advantageous effect that appropriate control can be performed.

Moreover, when g1 is set to 1 (g1=1) and the information related to waking up the communication performed via the third communication scheme is to be unicast, information indicating the type and/or information indicating a unique number (for example, the identification (ID) or serial number) of each of terminals subject to the information related to waking up the communication performed via the third communication scheme may be transmitted by communication device 103. Here, as a result of a terminal obtaining the information indicating the type and/or the information indicating a unique number (for example, the identification (ID) or serial number) of each of terminals, the terminal determines whether the information related to waking up the communication performed via the third communication scheme is valid or not. With this, a terminal that is the communication partner of communication device 103 determines whether the information related to waking up the communication performed via the third communication scheme is valid or not and performs control in accordance with the determination result. This achieves the advantageous effect that appropriate control can be performed.

Moreover, when g1 is set to 0 (g1=0) and the information related to waking up the communication performed via the third communication scheme is to be multicast, information indicating the type and/or information indicating a unique number (for example, the identification (ID) or serial number) of each of terminals subject to the information related to waking up the communication performed via the third communication scheme may be transmitted by communication device 103. Here, as a result of a terminal obtaining the information indicating the type and/or the information indicating a unique number (for example, the identification (ID) or serial number) of each of terminals, the terminal determines whether the information related to waking up the communication performed via the third communication scheme is valid or not. With this, a terminal that is the communication partner of communication device 103 determines whether the information related to waking up the communication performed via the third communication scheme is valid or not and performs control in accordance with the determination result. This achieves the advantageous effect that appropriate control can be performed.

By carrying out the above, appropriate information can be transmitted to appropriate terminals to control their operation, which achieves the advantageous effect that terminal power consumption can be reduced.

Information 902 on terminals subject to the information related to waking up the device operation function may be configured so as to include information indicating "multicast transmission" or "unicast transmission".

For example, information 902 on terminals subject to the information related to waking up the device operation function is configured of the bit h0, and communication device 103 transmits h0. h0 is defined as follows.

When communication device 103 multicasts the information related to waking up the device operation function, h0 is set to 0 (h0=0), and when communication device 103 unicasts the information related to waking up device operation function, h0 is set to 1 (h0=1). Moreover, when h0 is set to 1 (h0=1) and the information related to waking up the device operation function is to be unicast, information indicating the type and/or information indicating a unique number (for example, the identification (ID) or serial number) of each of terminals subject to the information related to waking up the device operation function may be transmitted by communication device 103. Here, as a result of a terminal obtaining the information indicating the type and/or the information indicating a unique number (for example, the identification (ID) or serial number) of each of terminals, the terminal determines whether the information related to waking up the device operation function is valid or not. With this, a terminal that is the communication partner of communication device 103 determines whether the information related to waking up the device operation function is valid or not and performs control in accordance with the determination result. This achieves the advantageous effect that appropriate control can be performed.

When h0 is set to 0 (h0=0) and the information related to waking up the device operation function is to be multicast, information indicating the type and/or information indicating a unique number (for example, the identification (ID) or serial number) of each of terminals subject to the information related to waking up the device operation function may be transmitted by communication device 103. Here, as a result of a terminal obtaining the information indicating the type and/or the information indicating a unique number (for example, the identification (ID) or serial number) of each of terminals, the terminal determines whether the information related to waking up the device operation function is valid or not. With this, a terminal that is the communication partner of communication device 103 determines whether the information related to waking up the device operation function is valid or not and performs control in accordance with the determination result. This achieves the advantageous effect that appropriate control can be performed.

By carrying out the above, appropriate information can be transmitted to appropriate terminals to control their operation, which achieves the advantageous effect that terminal power consumption can be reduced.

In the above description, terminal #1 labeled 101 performs operations such as "wake up", "sleep", and "maintain current state" for each part in accordance with instructions obtained via each of the items of information transmitted by communication device 103, namely information 801 indicating the communication scheme to be woken up, information 802 related to the communication scheme to be woken up, information 803 related to waking up the device operation function, information 901 on terminals subject to the information indicating the communication scheme to be woken up, and information 902 on terminals subject to the information related to waking up the device operation function. This has the advantageous effect that terminal #1 labeled 101 can reduce power consumption under appropriate control.

Next, the relation between the first communication scheme, the second communication scheme, and the third communication scheme described above will be described.

For example, the relation between the first communication scheme, the second communication scheme, and the third communication scheme satisfies any one of the following exemplary conditions.

Example 1

The first communication scheme and the second communication scheme are not schemes of the same standard. Additionally, the first communication scheme and the third communication scheme are not schemes of the same standard. Additionally, the second communication scheme and the third communication scheme are not schemes of the same standard.

Example 2

The first communication scheme and the second communication scheme are not schemes in the same frequency band. Additionally, the first communication scheme and the third communication scheme are not schemes in the same frequency band. Additionally, the second communication scheme and the third communication scheme are not schemes in the same frequency band.

Example 3

The first communication scheme and the second communication scheme are not compatible communication schemes. Additionally, the first communication scheme and the third communication scheme are not compatible communication schemes. Additionally, the second communication scheme and the third communication scheme are not compatible communication schemes.

Example 4

The first communication scheme and the second communication scheme have different average power consumptions. Additionally, the first communication scheme and the third communication scheme have different average power consumptions. Additionally, the second communication scheme and the third communication scheme have different average power consumptions. As used herein, average power consumption may be the average power consumption in a state in which communication is being performed, and may be the average power consumption in standby in a state in which reception of a signal can be performed.

Example 5

The first communication scheme and the second communication scheme have different maximum transfer speeds. Additionally, the first communication scheme and the third communication scheme have different maximum transfer speeds. Additionally, the second communication scheme and the third communication scheme have different maximum transfer speeds.

Example 6

The first communication scheme and the second communication scheme have different communication ranges. Additionally, the first communication scheme and the third communication scheme have different communication ranges. Additionally, the second communication scheme and the third communication scheme have different communication ranges.

Example 7

The first communication scheme and the second communication scheme performed using different communication circuits. Additionally, the first communication scheme and the third communication scheme performed using different communication circuits. Additionally, the second communication scheme and the third communication scheme performed using different communication circuits. As used herein, a communication circuit is, for example, a circuit that performs processes for generating a modulated signal from transmission data in accordance with the corresponding communication scheme and/or processes for obtaining reception data from a reception signal. Although the example above uses the terminology "different communication circuits", the two communication schemes may use different regions of a single integrated circuit.

Example 8

The first communication scheme and the second communication scheme communicate using different antennas. Additionally, the first communication scheme and the third communication scheme communicate using different antennas. Additionally, the second communication scheme and the third communication scheme communicate using different antennas. Although the example above uses the terminology "different antennas", any of the first communication scheme, the second communication scheme, and the third communication scheme may be schemes for wired communication or optical communication, and in such cases, instead of an antenna, communication is performed using, for example, a connection terminal, a light emitting diode (LED), or a photodiode. In other words, the communication schemes may use different elements to perform communication.

An example of operations performed after the wake-up operation in the flow of communication, relative to the time axis, between communication device 103 and terminal #1 labeled 101, which are illustrated in FIG. 1, described in FIG. 4, FIG. 5, and FIG. 6 will be described again.

For example, in FIG. 4, after first transceiver device 205 included in terminal #1 labeled 101 receives wake-up frame 401, second transceiver device 215 included in terminal #1 labeled 101 wakes up. Hereinafter, an example of subsequent operations will be given.

Communication device 103 transmits wake-up frame 401, and in this example, wake-up frame 401 includes information indicating that software data for executing an operation of device operation function 210 or updated software data for executing an operation of device operation function 210 is transmitted using the modulated signal of base station #A labeled 100_1.

Accordingly, after first transceiver device 205 included in terminal #1 labeled 101 receives wake-up frame 401, second transceiver device 215 included in terminal #1 labeled 101 wakes up. At this time, base station #A labeled 100_1 illustrated in FIG. 1, which is the communication partner of second transceiver device 215 included in terminal #1 labeled 101, transmits a modulated signal including software data for executing an operation of device operation function 210 or a modulated signal including updated software data for executing an operation of device operation function 210. Note that wake-up frame 401 may include information indicating to wake up device operation function 210. Device operation function 210 may be woken up by this information. Terminal #1 labeled 101 may transmit a modulated signal for notifying communication device 103 or base station #A labeled 100_1 that first transceiver device 205 included in terminal #1 labeled 101 received wake-up frame 401.

Accordingly, after second transceiver device 215 included in terminal #1 labeled 101 wakes up, second transceiver device 215 included in terminal #1 labeled 101 is capable of receiving the modulated signal including software data for executing an operation of device operation function 210 or the modulated signal including updated software data for executing an operation of device operation function 210. Second transceiver device 215 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of second transceiver device 215 and the updating of the software for device operation function 210 together, this has the advantageous effect of being able to execute the updating of the software for device operation function 210 with more certainty.

Furthermore, by executing the waking up of device operation function 210, the waking up of second transceiver device 215, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 216 (the dotted line). This is to obtain the software data. Note that when device operation function 210 obtains the software, the software is installed at a suitable time.

Note that wake-up frame 401 may include information on the communication devices that transmitted the software data for executing an operation of device operation function 210 or the updated software data for executing an operation of device operation function 210 (in this example, the communication devices are base station #A labeled 100_1, base station #B labeled 100_2, and communication device 103), and based on this information, terminal #1 labeled 101 can easily update the software.

For example, in FIG. 5, after first transceiver device 205 included in terminal #1 labeled 101 receives wake-up frame 401, third transceiver device 225 included in terminal #1 labeled 101 wakes up. Hereinafter, an example of subsequent operations will be given.

Communication device 103 transmits wake-up frame 401, and in this example, wake-up frame 401 includes information indicating that software data for executing an operation of device operation function 210 or updated software data for executing an operation of device operation function 210 is transmitted using the modulated signal of base station #B labeled 100_2.

Accordingly, after first transceiver device 205 included in terminal #1 labeled 101 receives wake-up frame 401, third transceiver device 225 included in terminal #1 labeled 101 wakes up. At this time, base station #B labeled 100_2 illustrated in FIG. 1, which is the communication partner of third transceiver device 225 included in terminal #1 labeled 101, transmits a modulated signal including software data for executing an operation of device operation function 210 or a modulated signal including updated software data for executing an operation of device operation function 210. Note that wake-up frame 401 may include information indicating to wake up device operation function 210. Device operation function 210 may be woken up by this information. Terminal #1 labeled 101 may transmit a modulated signal for notifying communication device 103 or base station #B labeled 100_2 that first transceiver device 205 included in terminal #1 labeled 101 received wake-up frame 401.

Accordingly, after third transceiver device 225 included in terminal #1 labeled 101 wakes up, third transceiver device 225 included in terminal #1 labeled 101 is capable of receiving the modulated signal including software data for executing an operation of device operation function 210 or the modulated signal including updated software data for executing an operation of device operation function 210. Third transceiver device 225 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of third transceiver device 225 and the updating of the software for device operation function 210 together, this has the advantageous effect of being able to execute the updating of the software for device operation function 210 with more certainty.

Furthermore, by executing the waking up of device operation function 210, the waking up of third transceiver device 225, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 226 (the dotted line). This is to obtain the software data. Note that when device operation function 210 obtains the software, the software is installed at a suitable time.

Note that wake-up frame 401 may include information on the communication devices that transmitted the software data for executing an operation of device operation function 210 or the updated software data for executing an operation of device operation function 210 (in this example, the communication devices are base station #A labeled 100_1, base station #B labeled 100_2, and communication device 103), and based on this information, terminal #1 labeled 101 can easily update the software.

Hereinafter, another example will be given. In FIG. 5, after first transceiver device 205 included in terminal #1 labeled 101 receives wake-up frame 402, second transceiver device 215 included in terminal #1 labeled 101 wakes up. Hereinafter, an example of subsequent operations will be given.

Communication device 103 transmits wake-up frame 402, and in this example, wake-up frame 402 includes information indicating that software data for executing an operation of device operation function 210 or updated software data for executing an operation of device operation function 210 is transmitted using the modulated signal of base station #A labeled 100_1.

Accordingly, after first transceiver device 205 included in terminal #1 labeled 101 receives wake-up frame 402, second transceiver device 215 included in terminal #1 labeled 101 wakes up. At this time, base station #A labeled 100_1 illustrated in FIG. 1, which is the communication partner of second transceiver device 215 included in terminal #1 labeled 101, transmits a modulated signal including software data for executing an operation of device operation function 210 or a modulated signal including updated software data for executing an operation of device operation function 210. Note that wake-up frame 402 may include information indicating to wake up device operation function 210. Device operation function 210 may be woken up by this information. Terminal #1 labeled 101 may transmit a modulated signal for notifying communication device 103 or base station #A labeled 100_1 that first transceiver device 205 included in terminal #1 labeled 101 received wake-up frame 402.

Accordingly, after second transceiver device 215 included in terminal #1 labeled 101 wakes up, second transceiver device 215 included in terminal #1 labeled 101 is capable of receiving the modulated signal including software data for executing an operation of device operation function 210 or the modulated signal including updated software data for executing an operation of device operation function 210. Second transceiver device 215 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of second transceiver device 215 and the updating of the software for device operation function 210 together, this has the advantageous effect of being able to execute the updating of the software for device operation function 210 with more certainty.

Furthermore, by executing the waking up of device operation function 210, the waking up of second transceiver device 215, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 216 (the dotted line). This is to obtain the software data. Note that when device operation function 210 obtains the software, the software is installed at a suitable time.

Note that wake-up frame 402 may include information on the communication devices that transmitted the software data for executing an operation of device operation function 210 or the updated software data for executing an operation of device operation function 210 (in this example, the communication devices are base station #A labeled 100_1, base station #B labeled 100_2, and communication device 103), and based on this information, terminal #1 labeled 101 can easily update the software.

As described above, implementing the present embodiment achieves the advantageous effect that it is possible to reduce device power consumption by suitably controlling the waking up of the device.

Note that in the present embodiment, how the information and symbols are configured is not limited to the examples illustrated in FIG. 7, FIG. 8, and FIG. 9. How the information and symbols are configured and the order in which the information and symbols are transmitted are not limited to the examples illustrated in FIG. 7, FIG. 8, and FIG. 9. Moreover, in addition to the information and symbols illustrated in FIG. 7, FIG. 8, and FIG. 9, other information, a control information symbol, a pilot symbol, and/or a reference symbol may also be transmitted therewith.

Moreover, in FIG. 1 and FIG. 10, although the devices are referred to as "communication device", "terminal", and "base station", the names of these devices are not limited thereto.

Furthermore, in the present embodiment, the communication schemes for wake-up using the first communication scheme were exemplified as the two communication schemes of the second communication scheme and the third communication scheme, but the number of communication schemes for wake-up using the first communication scheme is not limited to two; one may be used, and three or more may be used.

Embodiment 2

In the present embodiment, an implementation example in which a satellite communication device is used will be described as a variation of Embodiment 1.

Figure 11:
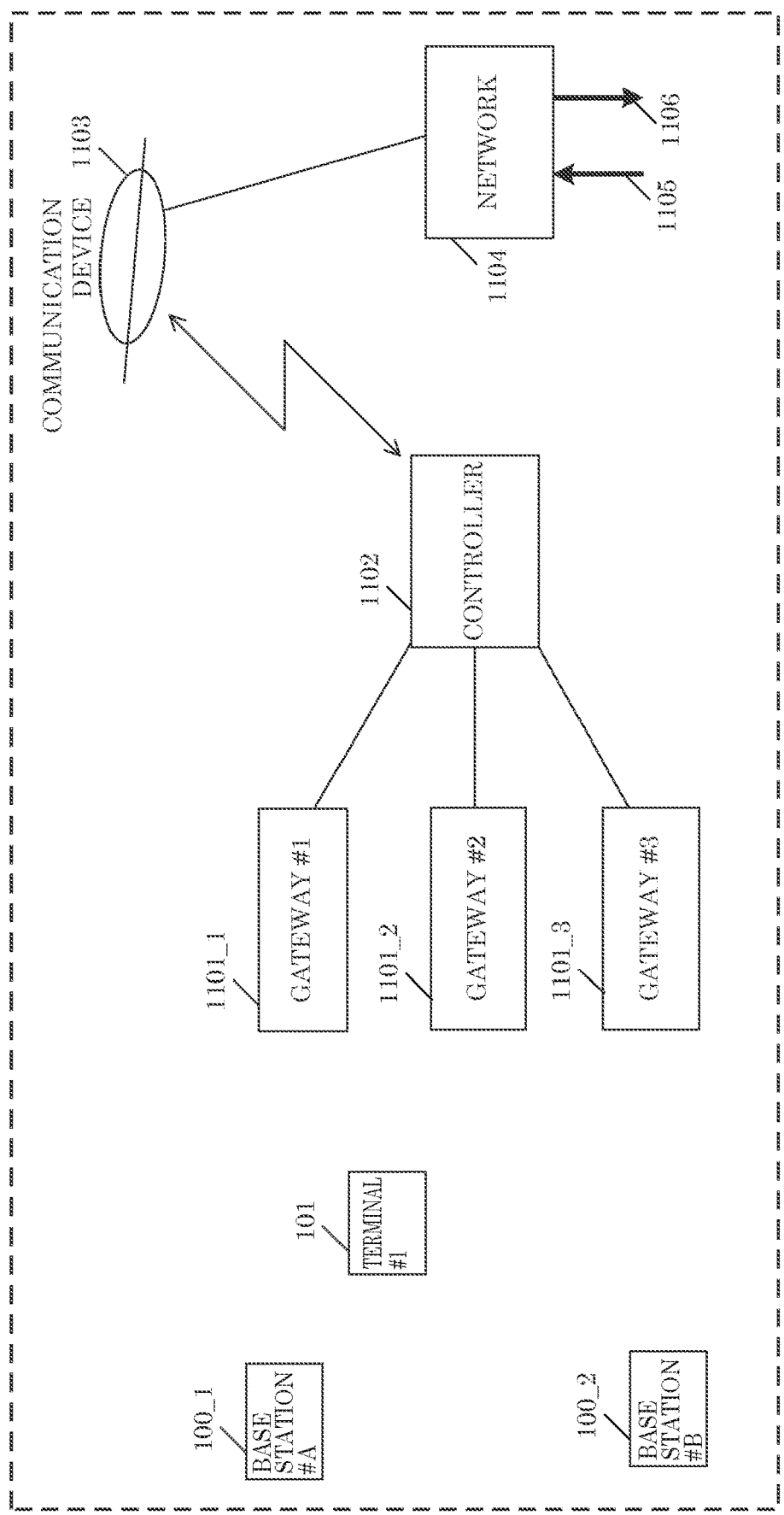
FIG. 11 illustrates one example of a configuration of a system.

FIG. 11 illustrates one example of a configuration of a communication system according to the present embodiment. Note that in FIG. 11, elements that operate the same as in FIG. 1 share like reference signs.

Terminal #1 labeled 101 communicates with gateway #1 labeled 1101_1 or gateway #2 labeled 1101_2 or gateway #3 labeled 1101_3 using the first communication scheme. Note that hereinafter, an example in which terminal #1 labeled 101 communicates with gateway #1 labeled 1101_1 using the first communication scheme will be given.

For example, terminal #1 labeled 101 generates a modulated signal conforming to the first communication scheme that includes first data, and transmits the modulated signal to gateway #1 labeled 1101_1. Gateway #1 labeled 1101_1 receives the modulated signal, performs processing such as demodulation and error correction decoding, and obtains the first data. Gateway #1 labeled 1101_1 then transmits data including the first data to controller 1102, and also transmits data including the first data to communication device 1103. Although communication device 1103 is exemplified here as a satellite communication device, communication device 1103 is not limited to this example.

Gateway #1 labeled 1101_1 generates a modulated signal conforming to the first communication scheme that includes second data, and transmits the modulated signal to terminal #1 labeled 101. Terminal #1 labeled 101 receives the modulated signal, performs processing such as demodulation and error correction decoding, and obtains the second data.

Note that communication device 1103 transmits data including the second data to controller 1102, and controller 1102 transmits data including the second data to gateway #1 labeled 1101_1.

Here, communication (transmission and reception) between gateway #1 labeled 1101_1 (or gateway #2 labeled 1101_2 or gateway #3 labeled 1101_3) and controller 1102 may be wireless communication, and, alternatively, may be wired communication. Accordingly, when gateway #1 labeled 1101_1 (or gateway #2 labeled 1101_2 or gateway #3 labeled 1101_3) transmits data to controller 1102, the gateway may transmit the data as-is to controller 1102, and, alternatively, may generate a modulated signal from the data transmit and the generated modulated signal to controller 1102. Similarly, when controller 1102 transmits data to gateway #1 labeled 1101_1 (or gateway #2 labeled 1101_2 or gateway #3 labeled 1101_3), controller 1102 may transmit the data as-is, and, alternatively, may generate a modulated signal from the data and transmit the generated modulated signal to gateway #1 labeled 1101_1 (or gateway #2 labeled 1101_2 or gateway #3 labeled 1101_3).

Similarly, communication (transmission and reception) between communication device 1103 and the controller may be wireless communication, and, alternatively, may be wired communication. Accordingly, when communication device 1103 transmits data to controller 1102, communication device 1103 may transmit the data as-is to controller 1102, and, alternatively, may generate a modulated signal from the data and transmit the generated modulated signal to controller 1102. Similarly, when controller 1102 transmits data to communication device 1103, controller 1102 may transmit the data as-is to communication device 1103, and, alternatively, may generate a modulated signal from the data and transmit the generated modulated signal to communication device 1103. Note that when communication device 1103 is a satellite communication device, the communication with the controller is assumed to be wireless communication.

Communication device 1103 transmits data obtained from controller 1102 to, for example, a device such as a server via, for example, network 10104.

Moreover, communication device 1103 obtains data from another device via network 1104.

Note that when communication device 1103 is a satellite communication device, network 1104 includes another satellite communication device and a communication device on Earth. Note that the communication device on Earth transmits a modulated signal including data to the satellite communication device. Moreover, the satellite communication device transmits a modulated signal including data to the communication device on Earth.

Terminal #1 labeled 101 communicates with base station #A labeled 100_1 using a second communication scheme. For example, terminal #1 labeled 101 generates a modulated signal conforming to the second communication scheme that includes data, and transmits the modulated signal to base station #A labeled 100_1. Base station #A labeled 100_1 receives the modulated signal, performs processing such as demodulation and error correction decoding, and obtains the data.

Base station #A labeled 100_1 generates a modulated signal conforming to the second communication scheme that includes data, and transmits the modulated signal to terminal #1 labeled 101. Terminal #1 labeled 101 receives the modulated signal, performs processing such as demodulation and error correction decoding, and obtains the data.

Terminal #1 labeled 101 communicates with base station #B labeled 100_2 using a third communication scheme. For example, terminal #1 labeled 101 generates a modulated signal conforming to the third communication scheme that includes data, and transmits the modulated signal to base station #B labeled 100_2. Base station #B labeled 100_2 receives the modulated signal, performs processing such as demodulation and error correction decoding, and obtains the data.

FIG. 2 illustrates one example of a configuration of terminal #1 labeled 101 illustrated in FIG. 1. Transceiver device 205 illustrated in FIG. 2 performs processing for transmission via the first communication scheme, and performs processing for reception via the first communication scheme.

First transceiver device 205 receives an input of data 207, performs processing for the first communication scheme, such as error correction encoding, modulation, and frequency conversion, and generates and outputs modulated signal 204 conforming to the first communication scheme. Modulated signal 204 conforming to the first communication scheme is then output as radio waves from antenna 203.

First transceiver device 205 receives an input of modulated signal 202 conforming to the first communication scheme received via antenna 201, performs processing such as demodulation and error correction decoding, and obtains data 206.

Control determiner 208 receives an input of data 206, determines whether to wake up second transceiver device 215, determines whether to wake up third transceiver device 225, and determines whether to wake up device operation function 210, and outputs control signal 209 including information on these determinations.

Second transceiver device 215 receives an input of control signal 209, and thereby obtains information on the determination of whether to wake up second transceiver device 215.

Here, when the determination is to wake up second transceiver device 215, if second transceiver device 215 is sleeping, second transceiver device 215 wakes up and begins communicating.

When the determination is to not wake up second transceiver device 215, if second transceiver device 215 is sleeping, second transceiver device 215 keeps sleeping. Note that if second transceiver device 215 is operating, second transceiver device 215 may sleep.

Second transceiver device 215, third transceiver device 225, and device operation function 210 receive an input of operation control signal 250. Second transceiver device 215 is controlled according to control information related to operation of the second transceiver device, which is included in operation control signal 250. For example, when the control information related to operation of the second transceiver device is information indicating to stop operation of second transceiver device 215 and place second transceiver device 215 in standby, second transceiver device 215 stops operation and enters standby. This reduces the power consumption of second transceiver device 215.

As described above, second transceiver device 215 only operates its communication functionality when required, in accordance with control signal 209 and operation control signal 250. This achieves the advantageous effect of reduced power consumption.

In addition to the information on the determination of whether to wake up second transceiver device 215, control signal 209 may also include control information for putting second transceiver device 215 to sleep. This point has already been described in Embodiment 1.

Similarly, third transceiver device 225 receives an input of control signal 209, and thereby obtains information on the determination of whether to wake up third transceiver device 225.

Here, when the determination is to wake up third transceiver device 225, if third transceiver device 225 is sleeping, third transceiver device 225 wakes up and begins communicating.

When the determination is to not wake up third transceiver device 225, if third transceiver device 225 is sleeping, third transceiver device 225 keeps sleeping. Note that if third transceiver device 225 is operating, third transceiver device 225 may sleep.

Second transceiver device 215, third transceiver device 225, and device operation function 210 receive an input of operation control signal 250. Third transceiver device 225 is controlled according to control information related to operation of the third transceiver device, which is included in operation control signal 250. For example, when the control information related to operation of the third transceiver device is information indicating to stop operation of third transceiver device 225 and place third transceiver device 225 in standby, third transceiver device 225 stops operation and enters standby. This reduces the power consumption of third transceiver device 225.

As described above, third transceiver device 225 only operates its communication functionality when required, in accordance with control signal 209 and operation control signal 250. This achieves the advantageous effect of reduced power consumption.

In addition to the information on the determination of whether to wake up third transceiver device 225, control signal 209 may also include control information for putting third transceiver device 225 to sleep. This point has already been described in Embodiment 1.

Device operation function 210 receives an input of control signal 209, and thereby obtains information on the determination of whether to wake up device operation function 210.

Here, when the determination is to wake up device operation function 210, if device operation function 210 is sleeping, device operation function 210 wakes up.

When the determination is to not wake up device operation function 210, if device operation function 210 is sleeping, device operation function 210 keeps sleeping. Note that if device operation function 210 is operating, device operation function 210 may sleep.

Second transceiver device 215, third transceiver device 225, and device operation function 210 receive an input of operation control signal 250. Device operation function 210 is controlled according to control information related to operation of the device operation function, which is included in operation control signal 250. For example, when the control information related to operation of device operation function 210 is information indicating to stop operation of device operation function 210 and place device operation function 210 in standby, device operation function 210 stops operation and enters standby. This reduces the power consumption of device operation function 210.

As described above, device operation function 210 only operates its device operation functionality when required, in accordance with control signal 209 and operation control signal 250. This achieves the advantageous effect of reduced power consumption.

In addition to the information on the determination of whether to wake up device operation function 210, control signal 209 may also include control information for putting device operation function 210 to sleep. This point has already been described in Embodiment 1.

Note that a device operation function is a function for an operation of a device other than a communication device. For example, when the device illustrated in FIG. 2 is implemented in a vehicle, one example of the device operation function is a function for an operation related to the vehicle.

In another example, when the device illustrated in FIG. 2 is implemented in a home appliance, one example of the device operation function is a function for an operation related to the home appliance. For example, when the device illustrated in FIG. 2 is implemented in a computer, the device operation function is a function for an operation related to the computer. In another example, when the device illustrated in FIG. 2 is implemented in a television, the device operation function is a function for an operation related to the television. Although a vehicle and home appliances are given as examples, devices other than communication devices are not limited to these examples.

FIG. 3 illustrates one example of a configuration of terminal #1 labeled 101 illustrated in FIG. 1 that differs from the example illustrated in FIG. 2. FIG. 3 differs from FIG. 2 in that first transceiver device 205 receives an input of control signal 209. Note that in FIG. 3, elements that operate the same as in FIG. 2 share like reference signs, and repeated description thereof will be omitted.

Control determiner 208 receives an input of data 206, determines whether to wake up the transmission function of first transceiver device 205, determines whether to wake up second transceiver device 215, determines whether to wake up third transceiver device 225, and determines whether to wake up device operation function 210, and outputs control signal 209 including information on these determinations.

First transceiver device 205 receives an input of control signal 209, and thereby obtains information on the determination of whether to wake up the transmission function of first transceiver device 205.

Here, when the determination is to wake up the transmission function of first transceiver device 205, if the transmission function of first transceiver device 205 is sleeping, the transmission function of first transceiver device 205 wakes up.

When the determination is to not wake up the transmission function of first transceiver device 205, if the transmission function of first transceiver device 205 is sleeping, the transmission function of first transceiver device 205 keeps sleeping. Note that if the transmission function of first transceiver device 205 is operating, the transmission function of first transceiver device 205 may sleep.

First transceiver device 205, second transceiver device 215, third transceiver device 225, and device operation function 210 receive an input of operation control signal 250. First transceiver device 205 is controlled according to control information related to operation of the transmission function of the first transceiver device, which is included in operation control signal 250. For example, when the control information related to operation of the transmission function of the first transceiver device is information indicating to stop operation of the transmission function of first transceiver device 205 and place the transmission function of first transceiver device 205 in standby, first transceiver device 205 stops operation of the transmission function and places the transmission function in standby. This reduces the power consumption of first transceiver device 205.

As described above, first transceiver device 205 only operates its communication functionality when required, in accordance with control signal 209 and operation control signal 250. This achieves the advantageous effect of reduced power consumption.

In addition to the information on the determination of whether to wake up the transmission function of first transceiver device 205, control signal 209 may also include control information for putting the transmission function of first transceiver device 205 to sleep. This point has already been described in Embodiment 1.

Figure 12:
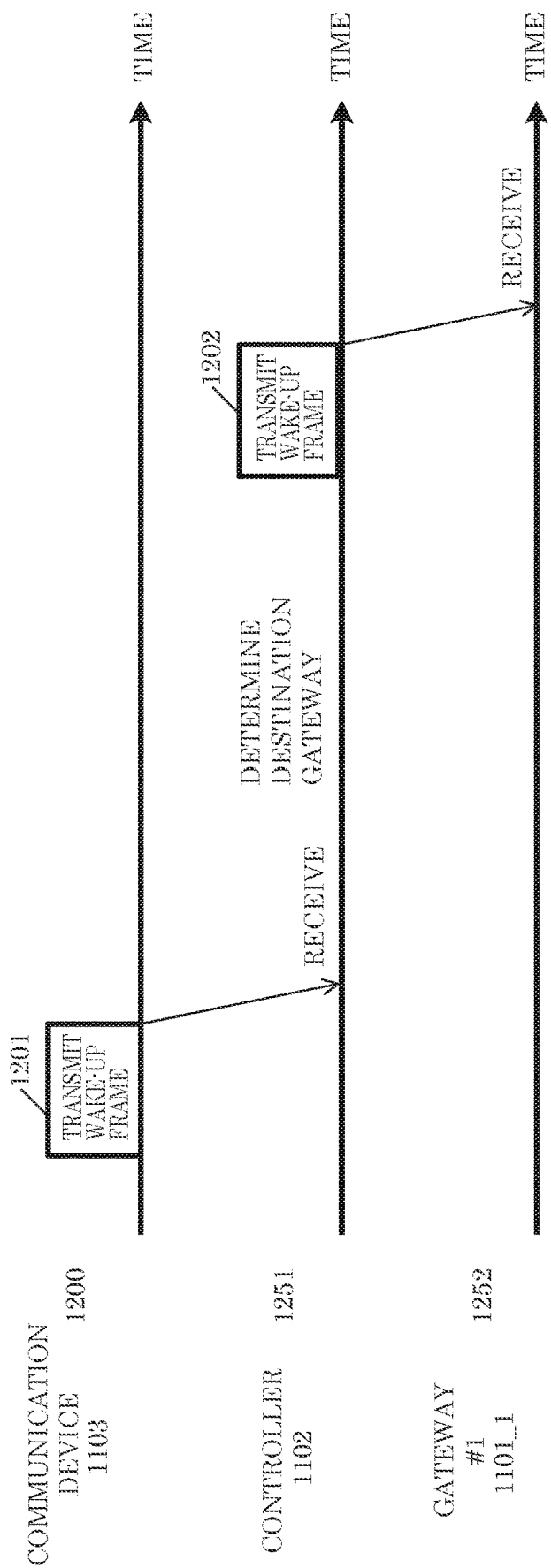
FIG. 12 illustrates one example of communication between a communication device and terminals.

FIG. 12 illustrates the flow of communication, relative to the time axis, between communication device 1103, controller 1102, and gateway #1 labeled 1101_1 illustrated in FIG. 11.

Figure 13:
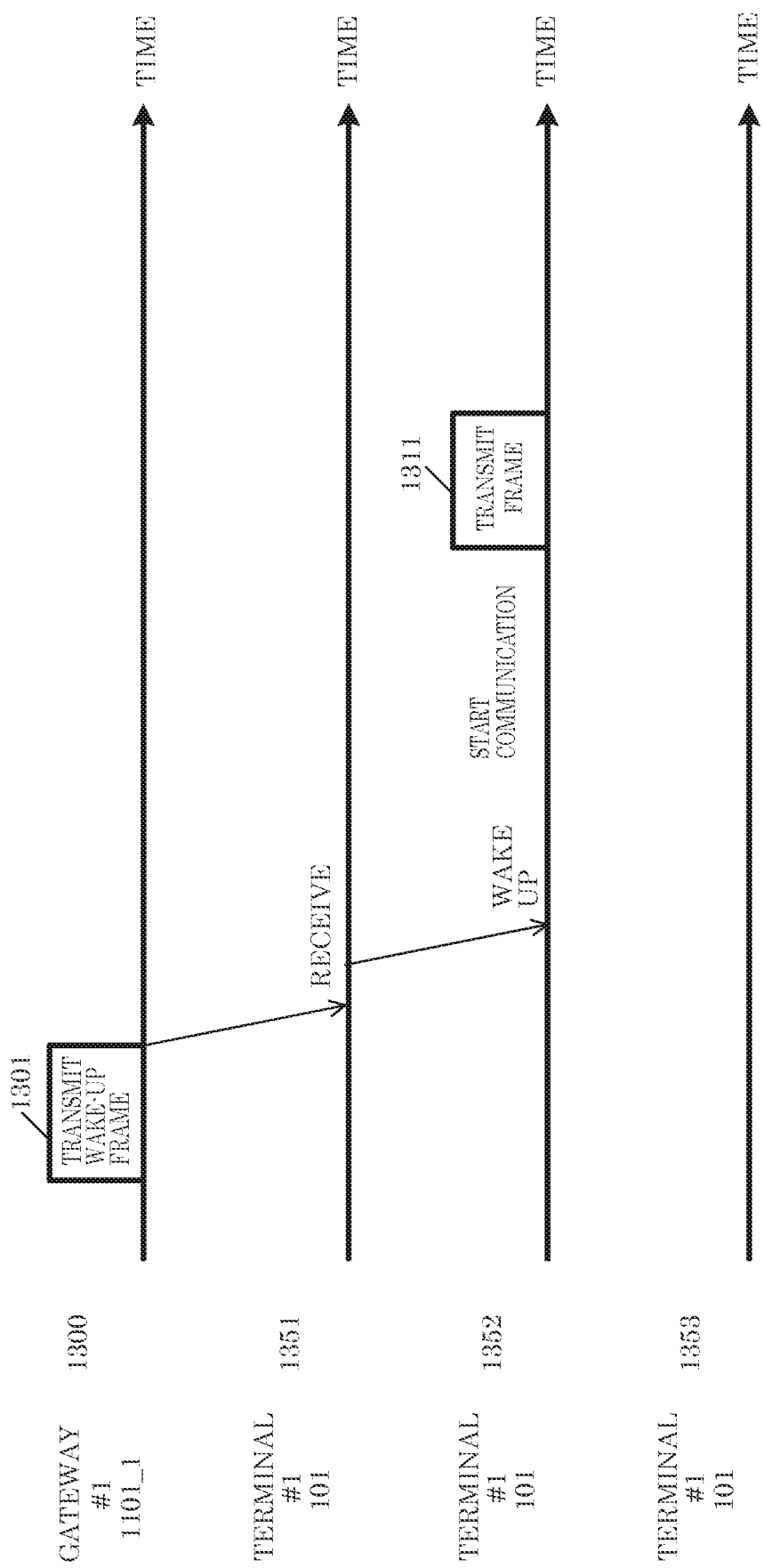
FIG. 13 illustrates one example of communication between a communication device and terminals.

FIG. 13 illustrates one example of the flow of communication, relative to the time axis, between gateway #1 labeled 1101_1 and terminal #1 labeled 101, which takes place after the communication illustrated in FIG. 12.

1200 in FIG. 12 indicates an example of communication by communication device 1103, relative to the time axis.

1251 in FIG. 12 indicates an example of communication by controller 1102, relative to the time axis, and 1252 in FIG. 12 indicates an example of communication by gateway #1 labeled 1101_1, relative to the time axis. 1300 in FIG. 13 indicates an example of communication by gateway #1 labeled 1101_1, relative to the time axis. 1351 in FIG. 13 indicates an example of communication by first transceiver device 205 included in terminal #1 labeled 101, relative to the time axis.

1352 in FIG. 13 indicates an example of communication by second transceiver device 215 included in terminal #1 labeled 101, relative to the time axis.

1353 in FIG. 13 indicates an example of communication by third transceiver device 225 included in terminal #1 labeled 101, relative to the time axis.

As illustrated in FIG. 12, first, communication device 1103 transmits a wake-up frame (1201). In this example, the transmission of the wake-up frame (1201) includes information indicating to wake up second transceiver device 215 included in terminal #1 labeled 101. Moreover, the wake-up frame 1201 is exemplified as being transmitted by communication device 1103 and exemplified as being received by controller 1102.

Therefore, controller 1102 then receives wake-up frame 1201. Controller 1102 then performs processing such as demodulation on wake-up frame 1201, thereby obtaining the information indicating to wake up second transceiver device 215 included in terminal #1 labeled 101.

Moreover, controller 1102 receives wake-up frame 1201 and performs processing such as demodulation, thereby learning that wake-up frame 1201 is information destined for terminal #1 labeled 101, and thus determines wake-up frame 1201 needs to be transmitted to gateway #1 labeled 1101_1. Accordingly, controller 1102 transmits wake-up frame 1202. In this example, wake-up frame 1202 includes information indicating to wake up second transceiver device 215 included in terminal #1 labeled 101.

Gateway #1 labeled 1101_1 then receives wake-up frame 1202. Next, as illustrated in FIG. 13, gateway #1 labeled 1101_1 transmits wake-up frame 1301. Wake-up frame 1301 includes information indicating to wake up second transceiver device 215 included in terminal #1 labeled 101. In this example, the wake-up frame (1301) is transmitted by gateway #1 labeled 1101_1, received by terminal #1 labeled 101, and configured as a modulated signal based on the first communication scheme.

First transceiver device 205 included in terminal #1 labeled 101 then receives wake-up frame 1301. First transceiver device 205 included in terminal #1 labeled 101 then performs processing such as demodulation on wake-up frame 1301, thereby obtaining the information indicating to wake up second transceiver device 215 included in terminal #1 labeled 101.

Accordingly, as illustrated in FIG. 13, second transceiver device 215 included in terminal #1 labeled 101 wakes up. Thereafter, base station #A labeled 100_1 and (second transceiver device 215 included in) terminal #1 labeled 101 that are illustrated in FIG. 11 start communicating.

In FIG. 13, after communication starts, second transceiver device 215 included in terminal #1 labeled 101 is exemplified as transmitting a frame (1311).

Note that wake-up frame 1201, wake-up frame 1202, and wake-up frame 1301 in FIG. 12 and FIG. 13 may include information indicating to wake up device operation function 210 included in terminal #1 labeled 101. In such cases, based on wake-up frame 1201, wake-up frame 1202, and wake-up frame 1301, terminal #1 labeled 101 wakes up device operation function 210.

Moreover, wake-up frame 1201, wake-up frame 1202, and wake-up frame 1301 in FIG. 12 and FIG. 13 may include information indicating to wake up the transmission function of first transceiver device 205 included in terminal #1 labeled 101. In such cases, based on wake-up frame 1201, wake-up frame 1202, and wake-up frame 1301, terminal #1 labeled 101 wakes up the transmission function of first transceiver device 205 included in terminal #1 labeled 101.

With this, a plurality of devices can be simultaneously woken up in response to the transmission of the wake-up frame, which eliminates the need to transmit the wake-up frame a plurality of times. This is advantageous as it increases data transmission speeds.

Figure 14:
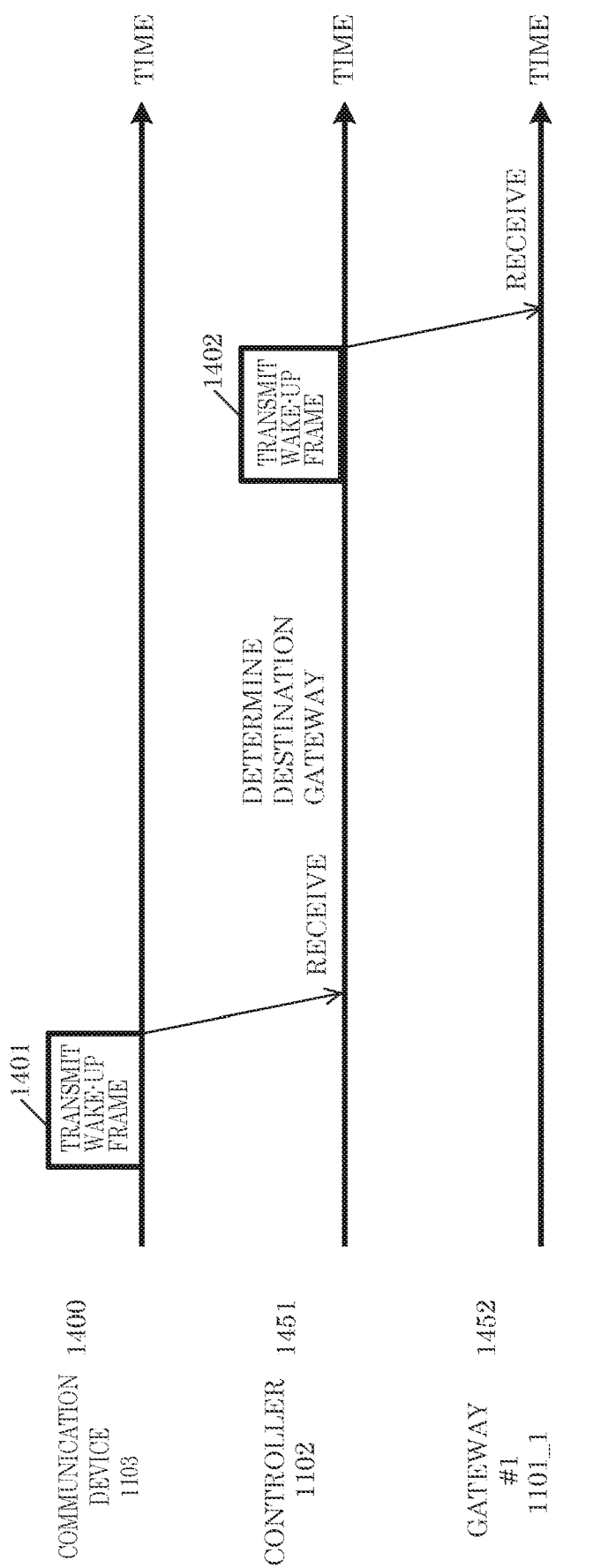
FIG. 14 illustrates one example of communication between a communication device and terminals.
Figure 15:
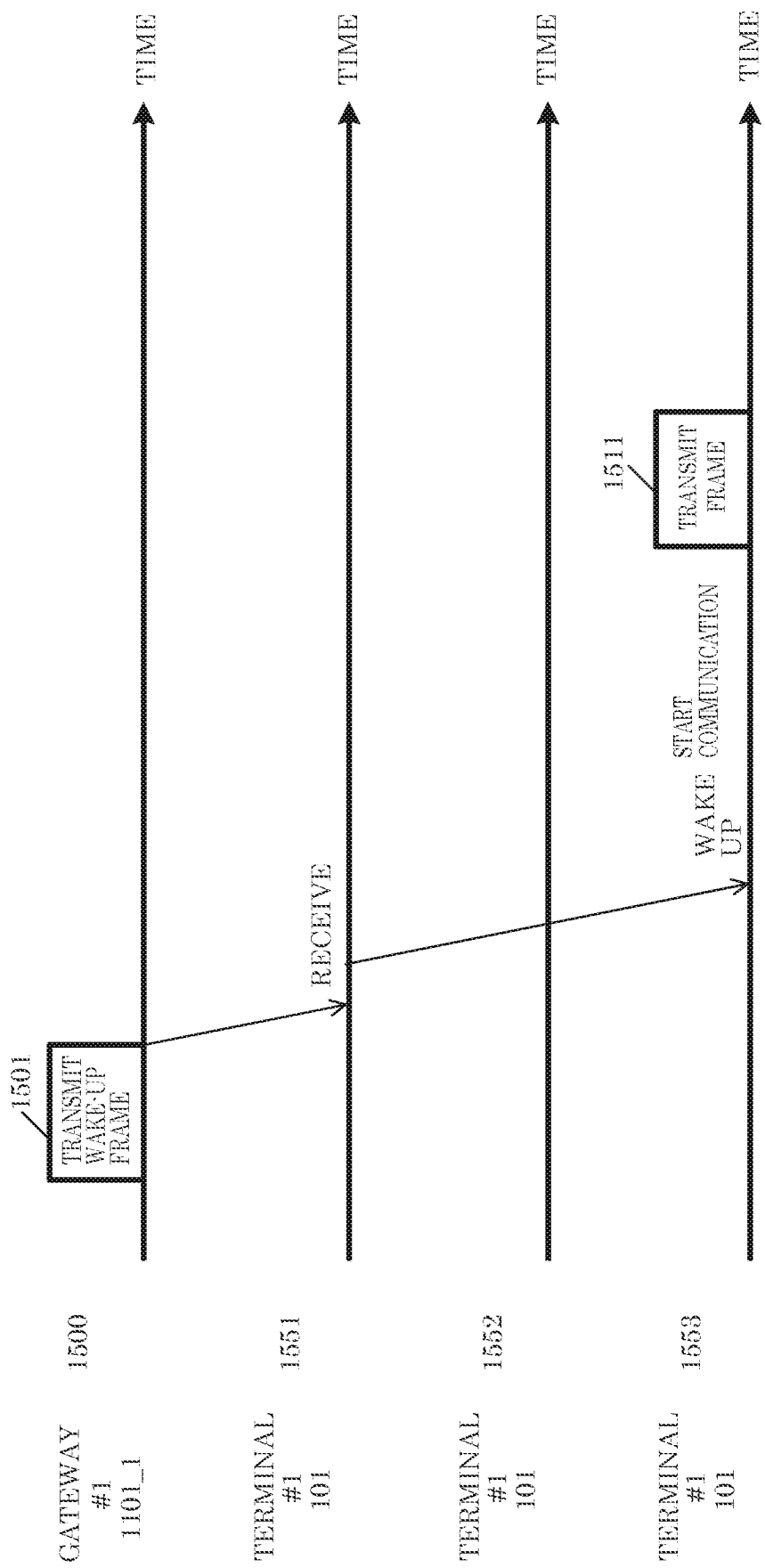
FIG. 15 illustrates one example of communication between a communication device and terminals.

After the communication illustrated in FIG. 12 and FIG. 13, communication like that illustrated in FIG. 14 and FIG. 15 may be performed. This will be described in greater detail hereinafter.

FIG. 14 illustrates the flow of communication, relative to the time axis, between communication device 1103, controller 1102, and gateway #1 labeled 1101_1 illustrated in FIG. 11.

FIG. 15 illustrates one example of the flow of communication, relative to the time axis, between gateway #1 labeled 1101_1 and terminal #1 labeled 101, which takes place after the communication illustrated in FIG. 14.

1400 in FIG. 14 indicates an example of communication by gateway #1 labeled 1101_1, relative to the time axis.

1451 in FIG. 14 indicates an example of communication by controller 1102, relative to the time axis, and 1452 in FIG. 14 indicates an example of communication by gateway #1 labeled 1101_1, relative to the time axis.

1500 in FIG. 15 indicates an example of communication by gateway #1 labeled 1101_1, relative to the time axis.

1551 in FIG. 15 indicates an example of communication by first transceiver device 205 included in terminal #1 labeled 101, relative to the time axis.

1552 in FIG. 15 indicates an example of communication by second transceiver device 215 included in terminal #1 labeled 101, relative to the time axis.

1553 in FIG. 15 indicates an example of communication by third transceiver device 225 included in terminal #1 labeled 101, relative to the time axis.

As illustrated in FIG. 14, first, communication device 1103 transmits a wake-up frame (1401). In this example, the transmission of the wake-up frame (1401) includes information indicating to wake up third transceiver device 225 included in terminal #1 labeled 101.

Moreover, the wake-up frame 1401 is transmitted by communication device 1103 and received by controller 1102.

Therefore, controller 1102 then receives wake-up frame 1401. Controller 1102 then performs processing such as demodulation on wake-up frame 1401, thereby obtaining the information indicating to wake up third transceiver device 225 included in terminal #1 labeled 101.

Moreover, controller 1102 receives wake-up frame 1401 and performs processing such as demodulation, thereby learning that wake-up frame 1401 is information destined for terminal #1 labeled 101, and thus determines wake-up frame 1401 needs to be transmitted to gateway #1 labeled 1101_1. Accordingly, controller 1102 transmits wake-up frame 1402. In this example, wake-up frame 1402 includes information indicating to wake up third transceiver device 225 included in terminal #1 labeled 101.

Gateway #1 labeled 1101_1 then receives wake-up frame 1402. Next, as illustrated in FIG. 15, gateway #1 labeled 1101_1 transmits wake-up frame 1501. Wake-up frame 1501 includes information indicating to wake up third transceiver device 225 included in terminal #1 labeled 101. In this example, the wake-up frame (1501) is transmitted by gateway #1 labeled 1101_1, received by terminal #1 labeled 101, and configured as a modulated signal based on the first communication scheme.

First transceiver device 205 included in terminal #1 labeled 101 then receives wake-up frame 1501. First transceiver device 205 included in terminal #1 labeled 101 then performs processing such as demodulation on wake-up frame 1501, thereby obtaining the information indicating to wake up third transceiver device 225 included in terminal #1 labeled 101.

Accordingly, as illustrated in FIG. 15, third transceiver device 225 included in terminal #1 labeled 101 wakes up. Thereafter, base station #B labeled 100_2 and (third transceiver device 225 included in) terminal #1 labeled 101 that are illustrated in FIG. 11 start communicating.

In FIG. 15, after communication starts, third transceiver device 225 included in terminal #1 labeled 101 is exemplified as transmitting a frame (1511).

Note that wake-up frame 1401, wake-up frame 1402, and wake-up frame 1501 in FIG. 14 and FIG. 15 may include information indicating to wake up device operation function 210 included in terminal #1 labeled 101. In such cases, based on wake-up frame 1401, wake-up frame 1402, and wake-up frame 1501, terminal #1 labeled 101 wakes up device operation function 210.

Moreover, wake-up frame 1401, wake-up frame 1402, and wake-up frame 1501 in FIG. 14 and FIG. 15 may include information indicating to wake up the transmission function of first transceiver device 205 included in terminal #1 labeled 101. In such cases, based on wake-up frame 1401, wake-up frame 1402, and wake-up frame 1501, terminal #1 labeled 101 wakes up the transmission function of first transceiver device 205 included in terminal #1 labeled 101.

With this, a plurality of devices can be simultaneously woken up in response to the transmission of the wake-up frame, which eliminates the need to transmit the wake-up frame a plurality of times. This is advantageous as it increases data transmission speeds.

Hereinafter, another communication example will be given.

Figure 16:
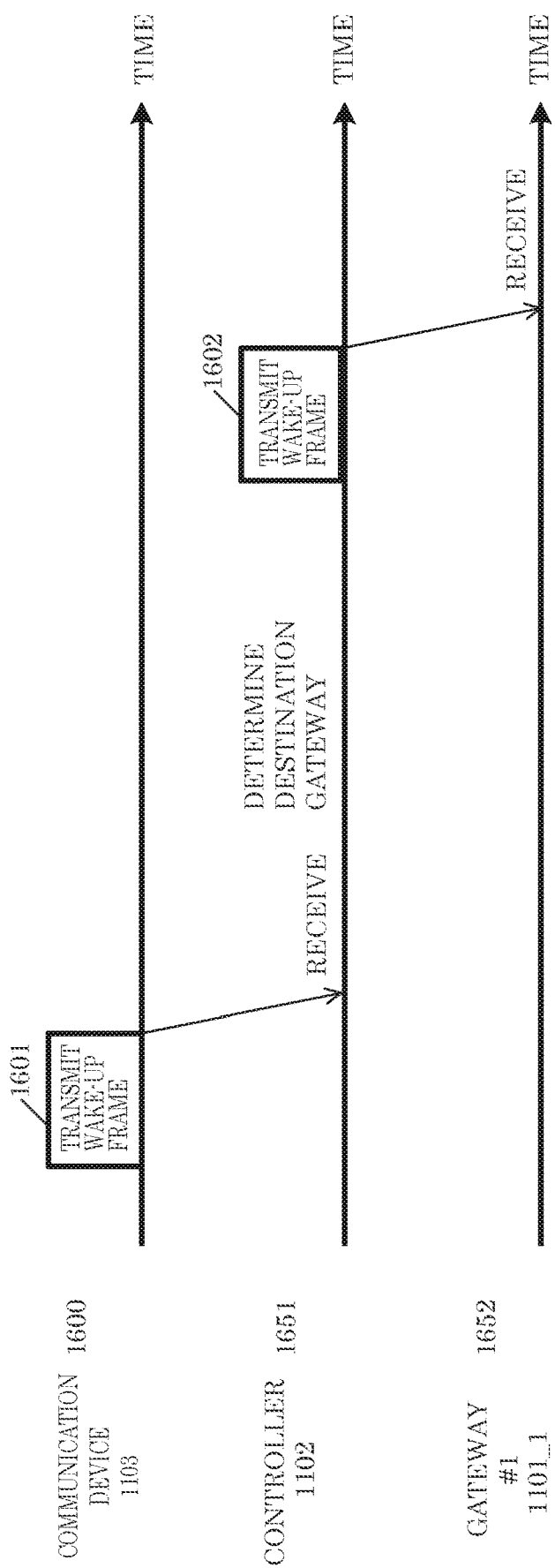
FIG. 16 illustrates one example of communication between a communication device and terminals.

FIG. 16 illustrates the flow of communication, relative to the time axis, between communication device 1103, controller 1102, and gateway #1 labeled 1101_1 illustrated in FIG. 11.

Figure 17:
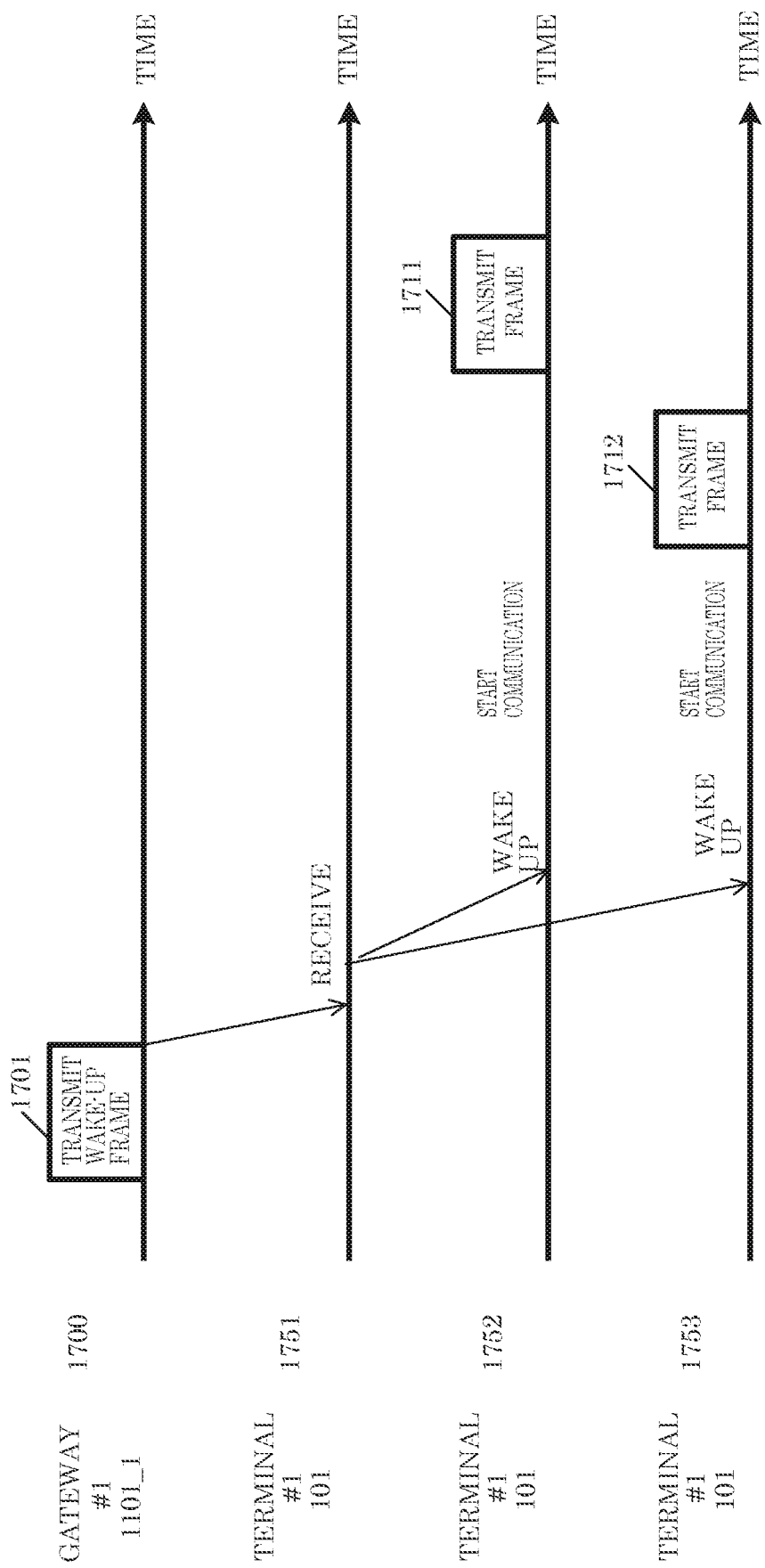
FIG. 17 illustrates one example of communication between a communication device and terminals.

FIG. 17 illustrates one example of the flow of communication between gateway #1 labeled 1101_1 and terminal #1 labeled 101, relative to the time axis.

1600 in FIG. 16 indicates an example of communication by gateway #1 labeled 1101_1, relative to the time axis.

1651 in FIG. 16 indicates an example of communication by controller 1102, relative to the time axis, and 1652 in FIG. 16 indicates an example of communication by gateway #1 labeled 1101_1, relative to the time axis.

1700 in FIG. 17 indicates an example of communication by gateway #1 labeled 1101_1, relative to the time axis.

1751 in FIG. 17 indicates an example of communication by first transceiver device 205 included in terminal #1 labeled 101, relative to the time axis.

1752 in FIG. 17 indicates an example of communication by second transceiver device 215 included in terminal #1 labeled 101, relative to the time axis.

1753 in FIG. 17 indicates an example of communication by third transceiver device 225 included in terminal #1 labeled 101, relative to the time axis.

As illustrated in FIG. 16, first, communication device 1103 transmits a wake-up frame (1601). In this example, the transmission of the wake-up frame (1601) includes information indicating to wake up second transceiver device 215 included in terminal #1 labeled 101 and information indicating to wake up third transceiver device 225 included in terminal #1 labeled 101. Moreover, the wake-up frame 1601 is transmitted by communication device 1103 and received by controller 1102.

Therefore, controller 1102 then receives wake-up frame 1601. Controller 1102 then performs processing such as demodulation on wake-up frame 1601, thereby obtaining the information indicating to wake up second transceiver device 215 included in terminal #1 labeled 101 and the information indicating to wake up third transceiver device 225 included in terminal #1 labeled 101.

Moreover, controller 1102 receives wake-up frame 1601 and performs processing such as demodulation, thereby learning that wake-up frame 1601 is information destined for terminal #1 labeled 101, and thus determines wake-up frame 1601 needs to be transmitted to gateway #1 labeled 1101_1. Accordingly, controller 1102 transmits wake-up frame 1602. In this example, wake-up frame 1602 includes information indicating to wake up second transceiver device 215 included in terminal #1 labeled 101 and information indicating to wake up third transceiver device 225 included in terminal #1 labeled 101.

Gateway #1 labeled 1101_1 then receives wake-up frame 1602. Next, as illustrated in FIG. 17, gateway #1 labeled 1101_1 transmits wake-up frame 1701. Wake-up frame 1701 includes information indicating to wake up second transceiver device 215 included in terminal #1 labeled 101 and information indicating to wake up third transceiver device 225 included in terminal #1 labeled 101. In this example, the wake-up frame (1701) is transmitted by gateway #1 labeled 1101_1, received by terminal #1 labeled 101, and configured as a modulated signal based on the first communication scheme.

First transceiver device 205 included in terminal #1 labeled 101 then receives wake-up frame 1701. First transceiver device 205 included in terminal #1 labeled 101 then performs processing such as demodulation on wake-up frame 1701, thereby obtaining the information indicating to wake up second transceiver device 215 included in terminal #1 labeled 101 and the information indicating to wake up third transceiver device 225 included in terminal #1 labeled 101.

Accordingly, as illustrated in FIG. 17, second transceiver device 215 included in terminal #1 labeled 101 wakes up. Thereafter, base station #A labeled 100_1 and (second transceiver device 215 included in) terminal #1 labeled 101 that are illustrated in FIG. 11 start communicating.

In FIG. 17, after communication starts, second transceiver device 215 included in terminal #1 labeled 101 is exemplified as transmitting a frame (1711).

Furthermore, as illustrated in FIG. 17, third transceiver device 225 included in terminal #1 labeled 101 wakes up. Thereafter, base station #B labeled 100_2 and (third transceiver device 225 included in) terminal #1 labeled 101 that are illustrated in FIG. 11 start communicating.

In FIG. 17, after communication starts, third transceiver device 225 included in terminal #1 labeled 101 is exemplified as transmitting a frame (1712).

Note that wake-up frame 1601, wake-up frame 1602, and wake-up frame 1701 in FIG. 16 and FIG. 17 may include information indicating to wake up device operation function 210 included in terminal #1 labeled 101. In such cases, based on wake-up frame 1601, wake-up frame 1602, and wake-up frame 1701, terminal #1 labeled 101 wakes up device operation function 210.

Moreover, wake-up frame 1601, wake-up frame 1602, and wake-up frame 1701 in FIG. 16 and FIG. 17 may include information indicating to wake up the transmission function of first transceiver device 205 included in terminal #1 labeled 101. In such cases, based on wake-up frame 1601, wake-up frame 1602, and wake-up frame 1701, terminal #1 labeled 101 wakes up the transmission function of first transceiver device 205 included in terminal #1 labeled 101.

With this, a plurality of devices can be simultaneously woken up in response to the transmission of the wake-up frame, which eliminates the need to transmit the wake-up frame a plurality of times. This is advantageous as it increases data transmission speeds.

Next, examples of operations performed after the wake-up in FIG. 12, FIG. 13, FIG. 14, FIG. 15, and FIG. 16 will be given.

For example, in FIG. 13, after first transceiver device 205 included in terminal #1 labeled 101 receives wake-up frame 1301, second transceiver device 215 included in terminal #1 labeled 101 wakes up. Hereinafter, examples of subsequent operations will be given.

After first transceiver device 205 included in terminal #1 labeled 101 receives wake-up frame 1301, second transceiver device 215 included in terminal #1 labeled 101 wakes up. At this time, base station #A labeled 100_1 illustrated in FIG. 1, which is the communication partner of second transceiver device 215 included in terminal #1 labeled 101, transmits a modulated signal including software data for executing an operation of device operation function 210 or a modulated signal including updated software data for executing an operation of device operation function 210. Note that wake-up frame 1301 may include information indicating to wake up device operation function 210. Device operation function 210 may be woken up by this information.

In such cases, since second transceiver device 215 included in terminal #1 labeled 101 has been woken up, second transceiver device 215 included in terminal #1 labeled 101 is capable of receiving the modulated signal including software data for executing an operation of device operation function 210 or the modulated signal including updated software data for executing an operation of device operation function 210. Second transceiver device 215 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of second transceiver device 215 and the updating of the software for device operation function 210 together, this has the advantageous effect of being able to execute the updating of the software for device operation function 210 with more certainty.

Furthermore, by executing the waking up of device operation function 210, the waking up of second transceiver device 215, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 216 (the dotted line).

This is to obtain the software data. Note that when device operation function 210 obtains the software, the software is installed at a suitable time.

For example, in FIG. 15, after first transceiver device 205 included in terminal #1 labeled 101 receives wake-up frame 1501, third transceiver device 225 included in terminal #1 labeled 101 wakes up. Hereinafter, an example of subsequent operations will be given.

After first transceiver device 205 included in terminal #1 labeled 101 receives wake-up frame 1501, third transceiver device 225 included in terminal #1 labeled 101 wakes up. At this time, base station #B labeled 100_2 illustrated in FIG. 1, which is the communication partner of third transceiver device 225 included in terminal #1 labeled 101, transmits a modulated signal including software data for executing an operation of device operation function 210 or a modulated signal including updated software data for executing an operation of device operation function 210. Note that wake-up frame 1501 may include information indicating to wake up device operation function 210. Device operation function 210 may be woken up by this information.

In such cases, since third transceiver device 225 included in terminal #1 labeled 101 has been woken up, third transceiver device 225 included in terminal #1 labeled 101 is capable of receiving the modulated signal including software data for executing an operation of device operation function 210 or the modulated signal including updated software data for executing an operation of device operation function 210. Third transceiver device 225 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of third transceiver device 225 and the updating of the software for device operation function 210 together, this has the advantageous effect of being able to execute the updating of the software for device operation function 210 with more certainty.

Furthermore, by executing the waking up of device operation function 210, the waking up of third transceiver device 225, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 226 (the dotted line). This is to obtain the software data. Note that when device operation function 210 obtains the software, the software is installed at a suitable time.

FIG. 7 can be taken as one example of the configuration of wake-up frame 1201, 1401, or 1601 transmitted by communication device 1103 in FIG. 12, FIG. 14, and FIG. 16. In FIG. 7, time is represented on the horizontal axis.

Preamble 701 is a symbol for allowing the communication partner to perform time synchronization, frequency synchronization, frame synchronization, and/or channel estimation, etc.

Control information symbol 702 is a symbol for notifying the communication partner of, for example, communication rules. For example, control information symbol 702 is used for notifying the communication scheme, modulation scheme, and/or error correction encoding scheme of the modulated signal, and notifying the data length and/or packet length.

Wake-up related data symbol 703 is a symbol for notifying the communication partner of data related to a wake-up operation.

Data symbol 704 is a symbol for transmitting data to the communication partner.

Note that the frame configuration illustrated in FIG. 7 is merely one non-limiting example. Moreover, the frame may additionally include symbols not illustrated in FIG. 7.

Furthermore, although the terminology "preamble", "control information symbol", "wake-up related data symbol", and "data symbol" is used in FIG. 7, the names of the corresponding symbols are not limited to these examples. For example, the "wake-up related data symbol" may be referred to by some other name.

Hereinafter, the configuration of wake-up related data symbol 703, which is an important aspect of the present embodiment, will be described in greater detail.

Configuration Example

One example of a configuration of wake-up related data symbol 703 is illustrated in FIG. 8.

As illustrated in FIG. 8, wake-up related data symbol 703 includes, for example, information 801 indicating the communication scheme to be woken up, information 802 related to the communication scheme to be woken up, and information 803 related to waking up the device operation function.

Hereinafter, an example related to the configuration of information 801 indicating the communication scheme to be woken up will be given.

For example, consider a case in which communication device 1103 transmits wake-up frame 1201 and wakes up second transceiver device 215 included in terminal #1 labeled 101 via controller 1102 and gateway #1 labeled 1101_1, that is to say, wakes up communication performed via the second communication scheme, as is illustrated in FIG. 12.

In this case, information 801 indicating the communication scheme to be woken up may be configured to include information indicating to wake up communication performed via the second communication scheme.

For example, information 801 indicating the communication scheme to be woken up is configured of the two bits of a0 and a1. In this case, communication device 1103 transmits a0 and a1. a0 and a1 are defined as follows.

When a0=0 and a1=0, communication performed via the second communication scheme is not woken up, and communication performed via the third communication scheme is not woken up.

When a0=1 and a1=0, communication performed via the second communication scheme is woken up, and communication performed via the third communication scheme is not woken up.

When a0=0 and a1=1, communication performed via the second communication scheme is not woken up, and communication performed via the third communication scheme is woken up.

When a0=1 and a1=1, communication performed via the second communication scheme is woken up, and communication performed via the third communication scheme is woken up.

It goes without saying that information equivalent to information 801 indicating the communication scheme to be woken up that includes the two bits a0 and a1 is included in the wake-up frame 1202 transmitted by controller 1102 and in wake-up frame 1301 transmitted by gateway #1 labeled 1101_1.

Hereinafter, another example will be given. In the example illustrated in FIG. 12, communication device 1103 transmits wake-up frame 1201 and wakes up second transceiver device 215 included in terminal #1 labeled 101 via controller 1102 and gateway #1 labeled 1101_1, that is to say, wakes up communication performed via the second communication scheme. Moreover, communication device 103 does not wake up third transceiver device 225 included in terminal #1 labeled 101, that is to say, does not wake up communication performed via the third communication scheme.

In other words, information 801 indicating the communication scheme to be woken up may be configured so as to include information indicating "wake up" or "do not wake up" on a per communication scheme basis.

When terminal #1 labeled 101 is configured like illustrated in FIG. 2 or FIG. 3, communication schemes via which communication is possible include the second communication scheme and the third communication scheme. Accordingly, in the example illustrated in FIG. 12, information 801 indicating the communication scheme to be woken up includes information indicating to wake up communication performed via the second communication scheme and not wake up communication performed via the third communication scheme.

For example, information 801 indicating the communication scheme to be woken up is configured of the two bits of b0 and b1. In this case, communication device 103 transmits b0 and b1. b0 and b1 are defined as follows.

b0 is a bit related to communication performed via the second communication scheme. When b0=0, communication performed via the second communication scheme is not woken up, and when b0=1, communication performed via the second communication scheme is woken up.

b1 is a bit related to communication performed via the third communication scheme. When b1=0, communication performed via the third communication scheme is not woken up, and when b1=1, communication performed via the third communication scheme is woken up.

It goes without saying that information equivalent to information 801 indicating the communication scheme to be woken up that includes the two bits b0 and b1 is included in the wake-up frame 1202 transmitted by controller 1102 and in wake-up frame 1301 transmitted by gateway #1 labeled 1101_1.

Communication device 1103 may transmit, along with information 801 indicating the communication scheme to be woken up, information related to the communication scheme to be woken up.

For example, the second communication scheme supports communication via a 25 MHz band modulated signal and communication via a 50 MHz band modulated signal. Moreover, for example, the second communication scheme also supports single carrier communication and orthogonal frequency division multiplexing (OFDM) communication.

For example, communication device 1103 transmits at least information indicating to wake up communication performed via the second communication scheme in information 801 indicating the communication scheme to be woken up. Here, for example, c0 and c1 are transmitted by communication device 1103 as information 801 indicating the communication scheme to be woken up. c0 and c1 are defined as follows.

When c0=0, communication via a 25 MHz band modulated signal is performed under the second communication scheme, and when c0=1, communication via a 50 MHz band modulated signal is performed under the second communication scheme.

When c1=0, single carrier communication is performed under the second communication scheme, and when c1=1, OFDM communication is performed under the second communication scheme.

Communication device 1103 may transmit information 803 related to waking up the device operation function. For example, information 803 related to waking up the device operation function is configured of the bit d0, and communication device 1103 transmits d0. In this example, d0 is defined as follows.

When d0=0, device operation function 210 is not woken up, and when d0=1, device operation function 210 is woken up.

It goes without saying that information equivalent to information 801 indicating the communication scheme to be woken up that includes c0, c1, and d0 is included in the wake-up frame 1202 transmitted by controller 1102 and in wake-up frame 1301 transmitted by gateway #1 labeled 1101_1.

Configuring wake-up related data symbol 703 in this way allows terminal #1 labeled 101 to obtain wake-up frame information, which makes it possible to wake up a suitable device. This has the advantageous effect that power consumption of terminal #1 labeled 101 can be reduced.

Hereinafter, yet another example will be given. Information 801 indicating the communication scheme to be woken up may be configured so as to include information indicating "wake up", "do not wake up", "maintain current state", or "undefined (reserved)" on a per communication scheme basis. For example, information 801 indicating the communication scheme to be woken up is configured of the four bits of e0, e1, e2, and e3. In this case, communication device 1103 transmits e0, e1, e2, and e3. e0, e1, e2, and e3 are defined as follows.

When e0=0 and e1=0, communication performed via the second communication scheme is woken up.

When e0=1 and e1=0, communication performed via the second communication scheme is put to sleep. For example, having received this information, terminal #1 labeled 101 puts second transceiver device 215 to sleep. This has the advantageous effect that terminal #1 labeled 101 can further reduce power consumption.

When e0=0 and e1=1, the current communication state of the second communication scheme is maintained.

When e0=1 and e1=1, this indicates "undefined (or sleep)" (for example, upon receipt of this information, terminal #1 labeled 101 ignores the information (i.e., determines that the information is not valid); however, the information may be used at a later point in time).

When e2=0 and e3=0, communication performed via the third communication scheme is woken up.

When e2=1 and e3=0, communication performed via the third communication scheme is put to sleep. For example, having received this information, terminal #1 labeled 101 puts third transceiver device 225 to sleep. This has the advantageous effect that terminal #1 labeled 101 can further reduce power consumption.

When e2=0 and e3=1, the current communication state of the third communication scheme is maintained.

When e2=1 and e3=1, this indicates "undefined (or sleep)" (for example, upon receipt of this information, terminal #1 labeled 101 ignores the information (i.e., determines that the information is not valid); however, the information may be used at a later point in time).

It goes without saying that information equivalent to information 801 indicating the communication scheme to be woken up that includes e0, e1, e2, and e3 is included in the wake-up frame 1202 transmitted by controller 1102 and in wake-up frame 1301 transmitted by gateway #1 labeled 1101_1.

Configuring wake-up related data symbol 703 in this way allows terminal #1 labeled 101 is controlled according to instruction by communication device 103 so as to achieve a favorable communication state for each of the communication schemes. This has the advantageous effect that power consumption of terminal #1 labeled 101 can be reduced. Note that in the above description, the available modes are exemplified as "wake up", "sleep", "maintain current state", "undefined (reserved)", but the available modes are not limited to this example. The available modes may include one or more of "wake up", "sleep", "maintain current state", and "undefined (reserved)".

Hereinafter, yet another example will be given.

Communication device 1103 may transmit information 803 related to waking up the device operation function. For example, information 803 related to waking up the device operation function is configured of the two bits of f0 and f1, and communication device 1103 transmits f0 and f1. In this example, f0 is defined as follows.

When f0=0, device operation function 210 is not woken up, and when f0=1, device operation function 210 is woken up.

In this example, f1 is defined as emergency data. For example, f1 is information for notifying the device operation function of a significant defect or information for stopping operation of the device operation function due there being a significant defect in the device operation function. In this example, f1 is defined as follows.

When f1=0, there is a significant defect in the device operation function, and when f1=1, this stops operation of the device operation function due there being a significant defect in the device operation function.

It goes without saying that information equivalent to information 803 related to waking up the device operation function that includes f0 and f1 is included in the wake-up frame 1202 transmitted by controller 1102 and in wake-up frame 1301 transmitted by gateway #1 labeled 1101_1.

This has the advantageous effect of being able to secure the safety of terminal #1 labeled 101. Note that usage of the instruction described above that stops operation of the device operation function due there being a significant defect in the device operation function is important.

FIG. 9 illustrates another example of a configuration of wake-up related data symbol 703 that differs from the configuration illustrated in FIG. 8. Note that in FIG. 9, time is represented on the horizontal axis. Moreover, elements that operate the same as in FIG. 8 share like reference signs, and repeated description thereof will be omitted. FIG. 9 differs from FIG. 8 in regard to the inclusion of information 901 on terminals subject to the information indicating the communication scheme to be woken up and information 902 on terminals subject to the information related to waking up the device operation function.

For example, information 901 on terminals subject to the information indicating the communication scheme to be woken up may be configured so as to include information indicating "multicast transmission" or "unicast transmission" on a per communication scheme basis.

When terminal #1 labeled 101 is configured like illustrated in FIG. 2 or FIG. 3, examples of information 801 indicating the communication scheme to be woken up include information related to waking up the communication performed via the second communication scheme and information related to waking up the communication performed via the third communication scheme.

For example, information 901 on terminals subject to the information indicating the communication scheme to be woken up is configured of the two bits of g0 and g1. In this case, communication device 1103 transmits g0 and g1. g0 and g1 are defined as follows.

When controller 1102 and gateways labeled 1101_1, 1101_2, and 1101_3 multicast the information related to waking up the communication performed via the second communication scheme, g0 is set to 0 (g0=0), and when controller 1102 and gateways labeled 1101_1, 1101_2, and 1101_3 unicast the information related to waking up the communication performed via the second communication scheme, g0 is set to 1 (g0=1).

When controller 1102 and gateways labeled 1101_1, 1101_2, and 1101_3 multicast the information related to waking up the communication performed via the third communication scheme, g1 is set to 0 (g1=0), and when controller 1102 and gateways labeled 1101_1, 1101_2, and 1101_3 unicast the information related to waking up the communication performed via the third communication scheme, g1 is set to 1 (g1=1).

Moreover, when g0 is set to 1 (g0=1) and the information related to waking up the communication performed via the second communication scheme is to be unicast, information indicating the type and/or information indicating a unique number (for example, the identification (ID) or serial number) of each of terminals subject to the information related to waking up the communication performed via the second communication scheme may be transmitted by communication device 1103. Here, as a result of a terminal obtaining the information indicating the type and/or the information indicating a unique number (for example, the identification (ID) or serial number) of each of terminals, the terminal determines whether the information related to waking up the communication performed via the second communication scheme is valid or not.

With this, a terminal determines whether the information related to waking up the communication performed via the second communication scheme is valid or not and performs control in accordance with the determination result. This achieves the advantageous effect that appropriate control can be performed.

Figure 18:
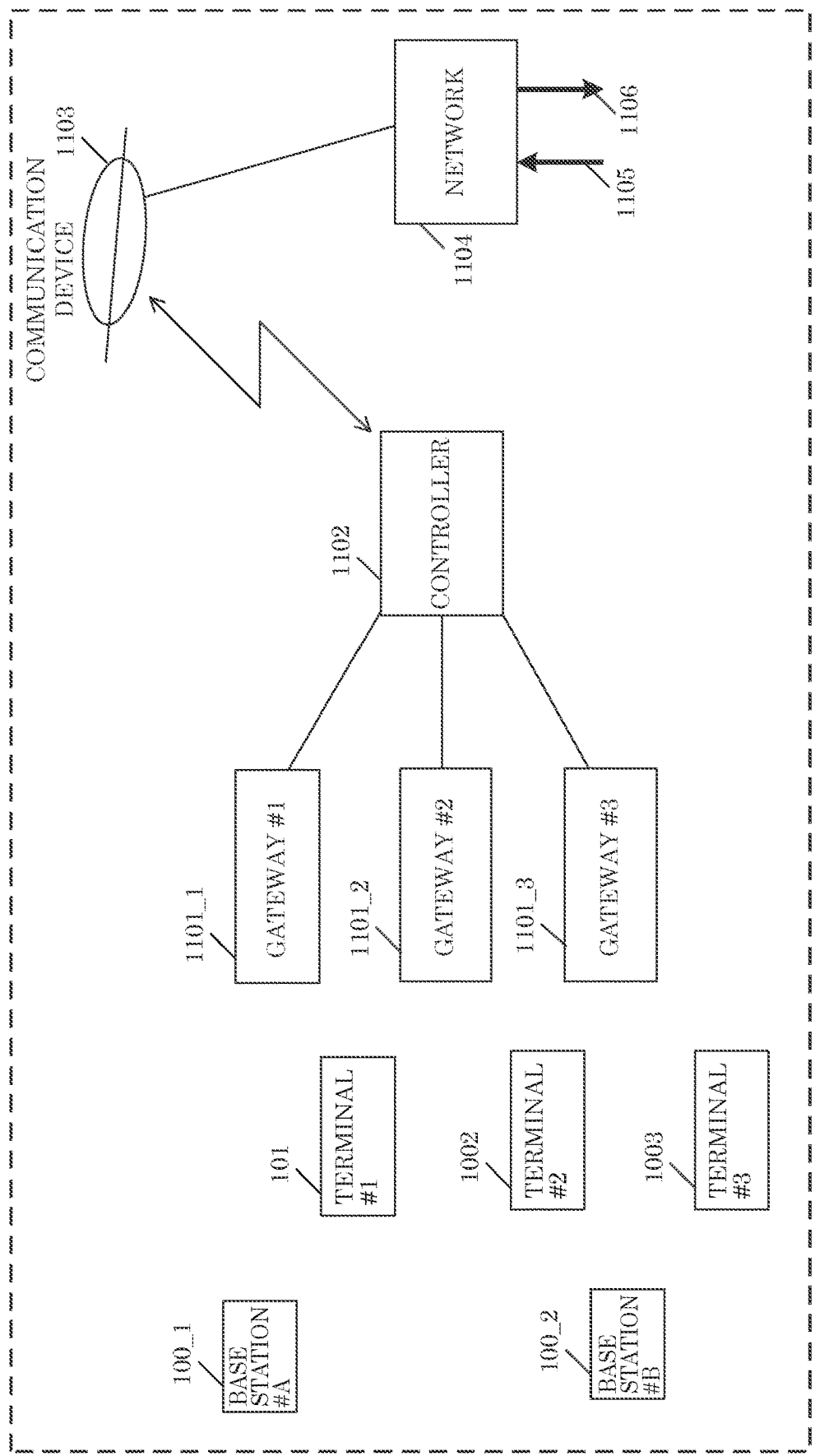
FIG. 18 illustrates one example of a configuration of a system.

Note that multicast refers to, for example in the case of FIG. 18, controller 1102 and gateways labeled 1101_1, 1101_2, and 1101_3 transmitting modulated signals including the same information to a plurality of terminals, namely terminal #1 labeled 101, terminal #2 labeled 1002, and terminal #3 labeled 1003.

Moreover, when g0 is set to 0 (g0=0) and the information related to waking up the communication performed via the second communication scheme is to be multicast, information indicating the type and/or information indicating a unique number (for example, the identification (ID) or serial number) of each of terminals subject to the information related to waking up the communication performed via the second communication scheme may be transmitted by communication device 1103. Here, as a result of a terminal obtaining the information indicating the type and/or the information indicating a unique number (for example, the identification (ID) or serial number) of each of terminals, the terminal determines whether the information related to waking up the communication performed via the second communication scheme is valid or not.

With this, a terminal determines whether the information related to waking up the communication performed via the second communication scheme is valid or not and performs control in accordance with the determination result. This achieves the advantageous effect that appropriate control can be performed.

Moreover, when g1 is set to 1 (g1=1) and the information related to waking up the communication performed via the third communication scheme is to be unicast, information indicating the type and/or information indicating a unique number (for example, the identification (ID) or serial number) of each of terminals subject to the information related to waking up the communication performed via the third communication scheme may be transmitted by communication device 1103. Here, as a result of a terminal obtaining the information indicating the type and/or the information indicating a unique number (for example, the identification (ID) or serial number) of each of terminals, the terminal determines whether the information related to waking up the communication performed via the third communication scheme is valid or not.

With this, a terminal determines whether the information related to waking up the communication performed via the third communication scheme is valid or not and performs control in accordance with the determination result. This achieves the advantageous effect that appropriate control can be performed.

Moreover, when g1 is set to 0 (g1=0) and the information related to waking up the communication performed via the third communication scheme is to be multicast, information indicating the type and/or information indicating a unique number (for example, the identification (ID) or serial number) of each of terminals subject to the information related to waking up the communication performed via the third communication scheme may be transmitted by communication device 1103. Here, as a result of a terminal obtaining the information indicating the type and/or the information indicating a unique number (for example, the identification (ID) or serial number) of each of terminals, the terminal determines whether the information related to waking up the communication performed via the third communication scheme is valid or not.

With this, a terminal determines whether the information related to waking up the communication performed via the third communication scheme is valid or not and performs control in accordance with the determination result. This achieves the advantageous effect that appropriate control can be performed.

It goes without saying that information equivalent to this information is included in the wake-up frame 1202 transmitted by controller 1102 and in wake-up frame 1301 transmitted by gateway #1 labeled 1101_1.

By carrying out the above, appropriate information can be transmitted to appropriate terminals to control their operation, which achieves the advantageous effect that terminal power consumption can be reduced.

Information 902 on terminals subject to the information related to waking up the device operation function may be configured so as to include information indicating "multicast transmission" or "unicast transmission".

For example, information 902 on terminals subject to the information related to waking up the device operation function is configured of the bit h0, and communication device 1103 transmits h0. h0 is defined as follows.

When controller 1102 and gateways labeled 1101_1, 1101_2, and 1101_3 multicast the information related to waking up the device operation function, h0 is set to 0 (h0=0), and when controller 1102 and gateways labeled 1101_1, 1101_2, and 1101_3 unicast the information related to waking up device operation function, h0 is set to 1 (h0=1).

Moreover, when h0 is set to 1 (h0=1) and the information related to waking up the device operation function is to be unicast, information indicating the type and/or information indicating a unique number (for example, the identification (ID) or serial number) of each of terminals subject to the information related to waking up the device operation function may be transmitted by communication device 1103. Here, as a result of a terminal obtaining the information indicating the type and/or the information indicating a unique number (for example, the identification (ID) or serial number) of each of terminals, the terminal determines whether the information related to waking up the device operation function is valid or not.

With this, a terminal determines whether the information related to waking up the device operation function is valid or not and performs control in accordance with the determination result. This achieves the advantageous effect that appropriate control can be performed.

When h0 is set to 0 (h0=0) and the information related to waking up the device operation function is to be multicast, information indicating the type and/or information indicating a unique number (for example, the identification (ID) or serial number) of each of terminals subject to the information related to waking up the device operation function may be transmitted by communication device 1103. Here, as a result of a terminal obtaining the information indicating the type and/or the information indicating a unique number (for example, the identification (ID) or serial number) of each of terminals, the terminal determines whether the information related to waking up the device operation function is valid or not.

With this, a terminal determines whether the information related to waking up the device operation function is valid or not and performs control in accordance with the determination result. This achieves the advantageous effect that appropriate control can be performed.

It goes without saying that information equivalent to this information is included in the wake-up frame 1202 transmitted by controller 1102 and in wake-up frame 1301 transmitted by gateway #1 labeled 1101_1.

By carrying out the above, appropriate information can be transmitted to appropriate terminals to control their operation, which achieves the advantageous effect that terminal power consumption can be reduced.

In the above description, terminal #1 labeled 101 performs operations such as "wake up", "sleep", and "maintain current state" for each part in accordance with instructions obtained via each of the items of information transmitted by communication device 1103, controller 1102, and the gateways, namely information 801 indicating the communication scheme to be woken up, information 802 related to the communication scheme to be woken up, information 803 related to waking up the device operation function, information 901 on terminals subject to the information indicating the communication scheme to be woken up, and information 902 on terminals subject to the information related to waking up the device operation function. This has the advantageous effect that terminal #1 labeled 101 can reduce power consumption under appropriate control.

The relation between the first communication scheme, the second communication scheme, and the third communication scheme has already been described in Embodiment 1.

Examples of operations performed after the wake-up in the communication illustrated in FIG. 12 and FIG. 13, in the communication illustrated in FIG. 14 and FIG. 15, and in the communication illustrated in FIG. 16 and FIG. 17 will be described once again.

For example, in FIG. 13, after first transceiver device 205 included in terminal #1 labeled 101 receives wake-up frame 1301, second transceiver device 215 included in terminal #1 labeled 101 wakes up. Hereinafter, an example of subsequent operations will be given.

Communication device 1103 transmits wake-up frame 1301, and in this example, wake-up frame 1301 includes information indicating that software data for executing an operation of device operation function 210 or updated software data for executing an operation of device operation function 210 is transmitted using the modulated signal of base station #A labeled 100_1.

Note that this information may be included in wake-up frame 1201 and may be included in wake-up frame 1202.

Accordingly, after first transceiver device 205 included in terminal #1 labeled 101 receives wake-up frame 1301, second transceiver device 215 included in terminal #1 labeled 101 wakes up. At this time, base station #A labeled 100_1 illustrated in FIG. 1, which is the communication partner of second transceiver device 215 included in terminal #1 labeled 101, transmits a modulated signal including software data for executing an operation of device operation function 210 or a modulated signal including updated software data for executing an operation of device operation function 210. Note that wake-up frame 1301 may include information indicating to wake up device operation function 210. Device operation function 210 may be woken up by this information. Terminal #1 labeled 101 may transmit a modulated signal for notifying communication device 103 or base station #A labeled 100_1 that first transceiver device 205 included in terminal #1 labeled 101 received wake-up frame 401.

Accordingly, after second transceiver device 215 included in terminal #1 labeled 101 wakes up, second transceiver device 215 included in terminal #1 labeled 101 is capable of receiving the modulated signal including software data for executing an operation of device operation function 210 or the modulated signal including updated software data for executing an operation of device operation function 210. Second transceiver device 215 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of second transceiver device 215 and the updating of the software for device operation function 210 together, this has the advantageous effect of being able to execute the updating of the software for device operation function 210 with more certainty.

Furthermore, by executing the waking up of device operation function 210, the waking up of second transceiver device 215, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 216 (the dotted line). This is to obtain the software data. Note that when device operation function 210 obtains the software, the software is installed at a suitable time.

Note that wake-up frame 1301 may include information on the communication devices that transmitted the software data for executing an operation of device operation function 210 or the updated software data for executing an operation of device operation function 210 (in this example, the communication devices are base station #A labeled 100_1, base station #B labeled 100_2, and communication device 103), and based on this information, terminal #1 labeled 101 can easily update the software.

For example, in FIG. 15, after first transceiver device 205 included in terminal #1 labeled 101 receives wake-up frame 1501, third transceiver device 225 included in terminal #1 labeled 101 wakes up. Hereinafter, an example of subsequent operations will be given.

Communication device 1103 transmits wake-up frame 1501, and in this example, wake-up frame 1501 includes information indicating that software data for executing an operation of device operation function 210 or updated software data for executing an operation of device operation function 210 is transmitted using the modulated signal of base station #B labeled 100_2.

Note that this information may be included in wake-up frame 1401 and may be included in wake-up frame 1402.

Accordingly, after first transceiver device 205 included in terminal #1 labeled 101 receives wake-up frame 1501, third transceiver device 225 included in terminal #1 labeled 101 wakes up. At this time, base station #B labeled 100_2 illustrated in FIG. 1, which is the communication partner of third transceiver device 225 included in terminal #1 labeled 101, transmits a modulated signal including software data for executing an operation of device operation function 210 or a modulated signal including updated software data for executing an operation of device operation function 210. Note that wake-up frame 1501 may include information indicating to wake up device operation function 210. Device operation function 210 may be woken up by this information. Terminal #1 labeled 101 may transmit a modulated signal for notifying communication device 103 or base station #B labeled 100_2 that first transceiver device 205 included in terminal #1 labeled 101 received wake-up frame 1501.

Accordingly, after third transceiver device 225 included in terminal #1 labeled 101 wakes up, third transceiver device 225 included in terminal #1 labeled 101 is capable of receiving the modulated signal including software data for executing an operation of device operation function 210 or the modulated signal including updated software data for executing an operation of device operation function 210. Third transceiver device 225 included in terminal #1 labeled 101 then demodulates the modulated signal to obtain the software or the updated software.

Device operation function 210 obtaining the software or the updated software, and updating the software achieves the advantageous result that the device operation of device operation function 210 can operate as intended or that new functions can be added to the device operation of device operation function 210. Note that by executing the waking up of third transceiver device 225 and the updating of the software for device operation function 210 together, this has the advantageous effect of being able to execute the updating of the software for device operation function 210 with more certainty.

Furthermore, by executing the waking up of device operation function 210, the waking up of third transceiver device 225, and the updating of the software for device operation function 210 together, this has the advantageous effect of being able to execute the updating of the software for device operation function 210 with more certainty.

In FIG. 2 and FIG. 3, device operation function 210 is illustrated as receiving an input of data 226 (the dotted line). This is to obtain the software data. Note that when device operation function 210 obtains the software, the software is installed at a suitable time.

Note that wake-up frame 1501 may include information on the communication devices that transmitted the software data for executing an operation of device operation function 210 or the updated software data for executing an operation of device operation function 210 (in this example, the communication devices are base station #A labeled 100_1, base station #B labeled 100_2, and communication device 103), and based on this information, terminal #1 labeled 101 can easily update the software.

As described above, implementing the present embodiment achieves the advantageous effect that it is possible to reduce device power consumption by suitably controlling the waking up of the device.

Note that in the present embodiment, how the information and symbols are configured is not limited to the examples illustrated in FIG. 7, FIG. 8, and FIG. 9. How the information and symbols are configured and the order in which the information and symbols are transmitted are not limited to the examples illustrated in FIG. 7, FIG. 8, and FIG. 9. Moreover, in addition to the information and symbols illustrated in FIG. 7, FIG. 8, and FIG. 9, other information, a control information symbol, a pilot symbol, and/or a reference symbol may also be transmitted therewith.

Moreover, in FIG. 11 and FIG. 18, although the devices are referred to as "communication device", "controller", "gateway", "terminal", and "base station", the names of these devices are not limited thereto.

Furthermore, in the present embodiment, the communication schemes for wake-up using the first communication scheme were exemplified as the two communication schemes of the second communication scheme and the third communication scheme, but the number of communication schemes for wake-up using the first communication scheme is not limited to two; one may be used, and three or more may be used.

Embodiment 3

In the present embodiment, an implementation example that utilizes the wake-up operation described in Embodiment 1 and Embodiment 2 will be given.

Figure 19:
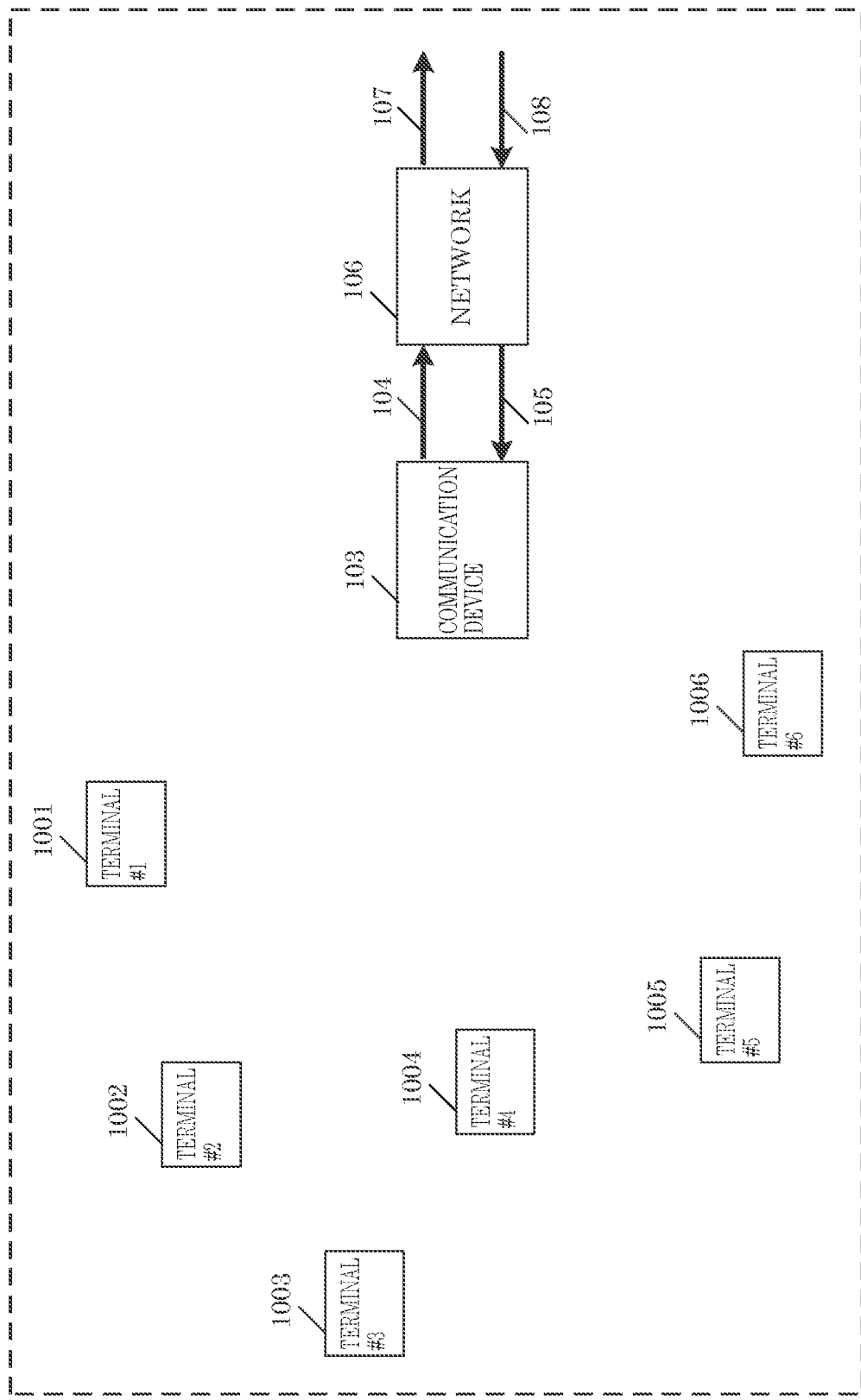
FIG. 19 illustrates one example of a configuration of a communication system.

FIG. 19 illustrates one example of a configuration of a communication system according to the present embodiment. Note that in FIG. 19, elements that operate the same as in FIG. 1 and FIG. 10 share like reference signs.

Terminal #1 labeled 1001 communicates with communication device 103 using a first communication scheme. For example, terminal #1 labeled 1001 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #1 labeled 1001. Terminal #1 labeled 1001 receives the modulated signal, performs processing such as demodulation and error correction decoding, and obtains the data.

Similarly, terminal #2 labeled 1002 communicates with communication device 103 using the first communication scheme. For example, terminal #2 labeled 1002 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #2 labeled 1002. Terminal #2 labeled 1002 receives the modulated signal, performs processing such as demodulation and error correction decoding, and obtains the data.

Terminal #3 labeled 1003 communicates with communication device 103 using the first communication scheme. For example, terminal #3 labeled 1003 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #3 labeled 1003. Terminal #3 labeled 1003 receives the modulated signal, performs processing such as demodulation and error correction decoding, and obtains the data.

Terminal #4 labeled 1004 communicates with communication device 103 using the first communication scheme. For example, terminal #4 labeled 1004 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #4 labeled 1004. Terminal #4 labeled 1004 receives the modulated signal, performs processing such as demodulation and error correction decoding, and obtains the data.

Terminal #5 labeled 1005 communicates with communication device 103 using the first communication scheme. For example, terminal #5 labeled 1005 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #5 labeled 1005. Terminal #5 labeled 1005 receives the modulated signal, performs processing such as demodulation and error correction decoding, and obtains the data.

Terminal #6 labeled 1006 communicates with communication device 103 using the first communication scheme. For example, terminal #6 labeled 1006 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #6 labeled 1006. Terminal #6 labeled 1006 receives the modulated signal, performs processing such as demodulation and error correction decoding, and obtains the data.

For example, communication device 103 forwards, for example, data obtained from another device to, for example, a server via, for example, network 106. The flow of data is indicated by the arrows labeled 108 and 105, and the data flows in the listed order.

Communication device 103 transmits data obtained from another device to a device such as a server via network 106. The flow of data is indicated by the arrows labeled 104 and 107, and the data flows in the listed order.

FIG. 2 illustrates one example of a configuration of any one of terminal #1 labeled 1001, terminal #2 labeled 1002, terminal #3 labeled 1003, terminal #4 labeled 1004, terminal #5 labeled 1005, and terminal #6 labeled 1006 illustrated in FIG. 19. As operations have already been described in detail in Embodiment 1 and Embodiment 2, repeated description will be omitted. Note that when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the first communication scheme, these terminals do not include parts related to first transceiver device 205. Similarly, when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the second communication scheme, these terminals do not include parts related to second transceiver device 215. Similarly, when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the third communication scheme, these terminals do not include parts related to third transceiver device 225.

Figure 20:
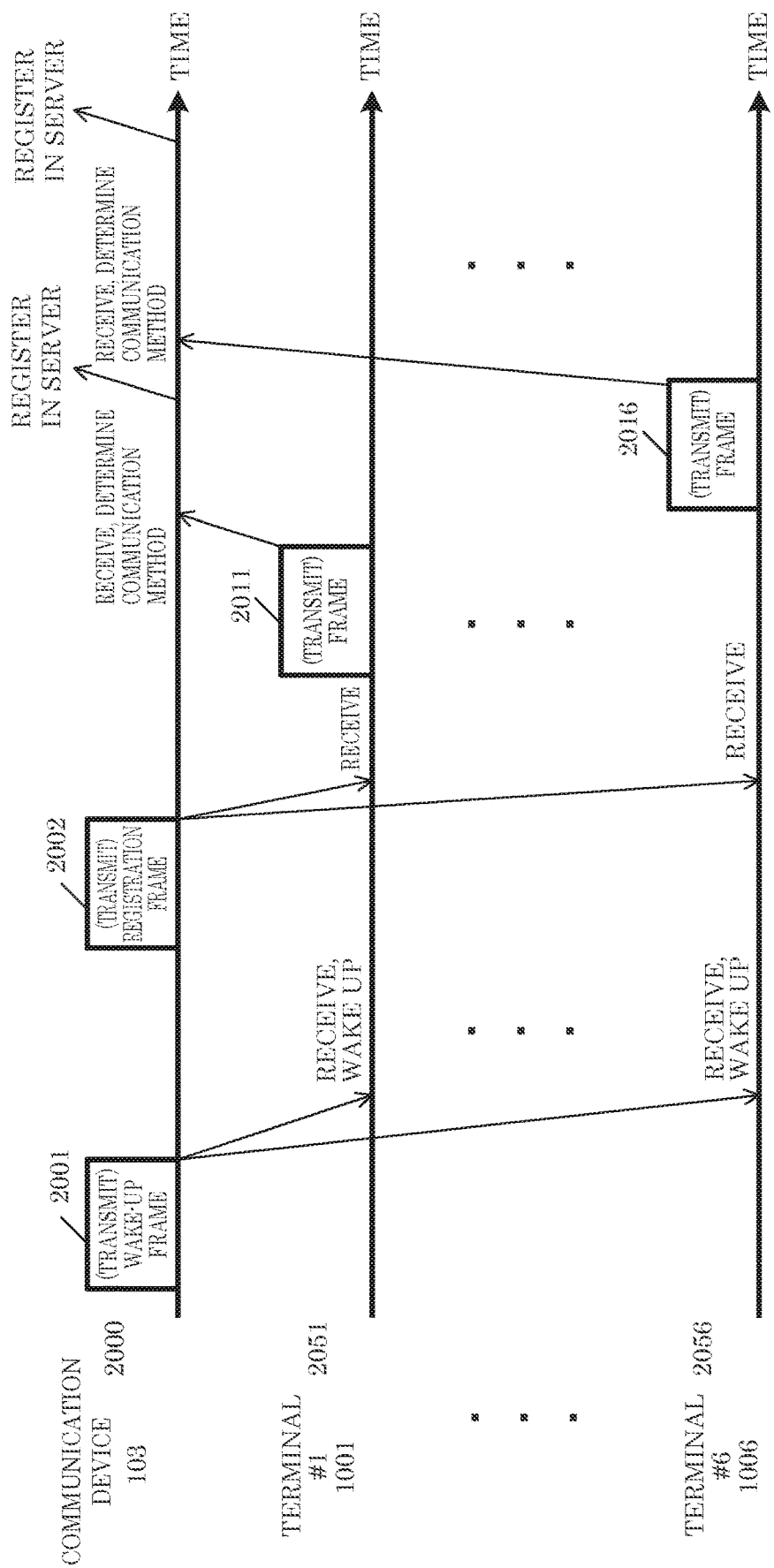
FIG. 20 illustrates one example of the flow of communication.

FIG. 20 illustrates one example of the flow of communication, relative to the time axis, between communication device 103, terminal #1 labeled 1001, terminal #2 labeled 1002, terminal #3 labeled 1003, terminal #4 labeled 1004, terminal #5 labeled 1005, and terminal #6 labeled 1006 illustrated in FIG. 19. Time is represented on the horizontal axis in FIG. 20.

2000 in FIG. 20 indicates an example of communication by communication device 103, relative to the time axis.

2051 is an example of communication by first transceiver device 205 included in terminal #1 labeled 1001, relative to the time axis.

2052 is an example of communication by first transceiver device 205 included in terminal #2 labeled 1002, relative to the time axis.

2053 is an example of communication by first transceiver device 205 included in terminal #3 labeled 1003, relative to the time axis.

2054 is an example of communication by first transceiver device 205 included in terminal #4 labeled 1004, relative to the time axis.

2055 is an example of communication by first transceiver device 205 included in terminal #5 labeled 1005, relative to the time axis.

2056 is an example of communication by first transceiver device 205 included in terminal #6 labeled 1006, relative to the time axis.

Note that in FIG. 20, illustration of the communication indicated by 2052, 2053, 2054, and 2055 is omitted.

As illustrated in FIG. 20, first, communication device 103 transmits wake-up frame 2001. In this example, wake-up frame 2001 includes information indicating to wake up terminal #1 labeled 1001, wake up terminal #2 labeled 1002, wake up terminal #3 labeled 1003, wake up terminal #4 labeled 1004, wake up terminal #5 labeled 1005, and wake up terminal #6 labeled 1006. In this example, wake-up frame 2001 is configured as a modulated signal based on the first communication scheme. Moreover, as described in Embodiment 1 and Embodiment 2, wake-up frame 2001 may be multicast (and may be unicast).

First transceiver device 205 included in terminal #1 labeled 1001 then receives wake-up frame 2001. First transceiver device 205 included in terminal #1 labeled 1001 then performs processing such as demodulation on wake-up frame 2001, thereby obtaining the information indicating to wake up terminal #1 labeled 1001. Accordingly, in FIG. 20, terminal #1 labeled 1001 wakes up.

First transceiver device 205 included in terminal #2 labeled 1002 receives wake-up frame 2001. First transceiver device 205 included in terminal #2 labeled 1002 then performs processing such as demodulation on wake-up frame 2001, thereby obtaining the information indicating to wake up terminal #2 labeled 1002. Accordingly, in FIG. 20, terminal #2 labeled 1002 wakes up.

First transceiver device 205 included in terminal #3 labeled 1003 receives wake-up frame 2001. First transceiver device 205 included in terminal #3 labeled 1003 then performs processing such as demodulation on wake-up frame 2001, thereby obtaining the information indicating to wake up terminal #3 labeled 1003. Accordingly, in FIG. 20, terminal #3 labeled 1003 wakes up.

First transceiver device 205 included in terminal #4 labeled 1004 receives wake-up frame 2001. First transceiver device 205 included in terminal #4 labeled 1004 then performs processing such as demodulation on wake-up frame 2001, thereby obtaining the information indicating to wake up terminal #4 labeled 1004. Accordingly, in FIG. 20, terminal #4 labeled 1004 wakes up.

First transceiver device 205 included in terminal #5 labeled 1005 receives wake-up frame 2001. First transceiver device 205 included in terminal #5 labeled 1005 then performs processing such as demodulation on wake-up frame 2001, thereby obtaining the information indicating to wake up terminal #5 labeled 1005. Accordingly, in FIG. 20, terminal #5 labeled 1005 wakes up.

First transceiver device 205 included in terminal #6 labeled 1006 receives wake-up frame 2001. First transceiver device 205 included in terminal #6 labeled 1006 then performs processing such as demodulation on wake-up frame 2001, thereby obtaining the information indicating to wake up terminal #6 labeled 1006. Accordingly, in FIG. 20, terminal #6 labeled 1006 wakes up.

Although terminal #1 labeled 1001, terminal #2 labeled 1002, terminal #3 labeled 1003, terminal #4 labeled 1004, terminal #5 labeled 1005, and terminal #6 labeled 1006 are each exemplified as including first transceiver device 205 in FIG. 20, among terminal #1 labeled 1001, terminal #2 labeled 1002, terminal #3 labeled 1003, terminal #4 labeled 1004, terminal #5 labeled 1005, and terminal #6 labeled 1006, there may be a terminal that does not include first transceiver device 205. In such cases, such a terminal does not wake up.

Next, as illustrated in FIG. 20, communication device 103 transmits registration frame 2002. As described in Embodiment 1 and Embodiment 2 and the like, communication device 103 may multicast registration frame 2002. Next, registration frame 2002 will be described.

Communication device 103 illustrated in FIG. 19 is connected to a server via network 106. The server or a device that communicates with the server transmits a modulated signal including software data for executing an operation of device operation function 210 or (a modulated signal including) updated software data for executing an operation of device operation function 210 to communication device 103. The modulated signal including the software data is then transmitted to a terminal by communication device 103 (note that software is merely one example; what is included in the modulated signal may be information other than software).

Here, when communication device 103 and the server know which terminals are capable of communicating with communication device 103, this is advantageous as information such as software can be provided with certainty.

Registration frame 2002 is a frame for knowing the status of a terminal. Accordingly, registration frame 2002 includes information instructing a terminal to transmit terminal-specific information. The terminal-specific information is, for example, information that indicates the type, model number, serial number, or identification (ID) of the terminal.

Accordingly, as illustrated in FIG. 20, terminal #1 labeled 1001 receives registration frame 2002 and transmits frame 2011. Note that frame 2011 includes the terminal-specific information (for example, information that indicates the type, model number, serial number, or ID of the terminal) for terminal #1 labeled 1001, and a modulated signal including this information is transmitted by terminal #1 labeled 1001 (in one example, this modulated signal is a modulated signal conforming to the first communication scheme). As illustrated in FIG. 20, communication device 103 receives frame 2011, and thereby obtains information related to terminal #1 labeled 1001.

Similarly, terminal #2 labeled 1002 receives registration frame 2002 and transmits frame 2012. Note that illustration of this is omitted in FIG. 20. Note that frame 2012 includes the terminal-specific information (for example, information that indicates the type, model number, serial number, or ID of the terminal) for terminal #2 labeled 1002, and a modulated signal including this information is transmitted by terminal #2 labeled 1002 (in one example, this modulated signal is a modulated signal conforming to the first communication scheme). Communication device 103 receives frame 2012, and thereby obtains information related to terminal #2 labeled 1002.

Terminal #3 labeled 1003 then receives registration frame 2002 and transmits frame 2013. Note that illustration of this is omitted in FIG. 20. Note that frame 2013 includes the terminal-specific information (for example, information that indicates the type, model number, serial number, or ID of the terminal) for terminal #3 labeled 1003, and a modulated signal including this information is transmitted by terminal #3 labeled 1003 (in one example, this modulated signal is a modulated signal conforming to the first communication scheme). Communication device 103 receives frame 2013, and thereby obtains information related to terminal #3 labeled 1003.

Terminal #4 labeled 1004 receives registration frame 2002 and transmits frame 2014. Note that illustration of this is omitted in FIG. 20. Note that frame 2014 includes the terminal-specific information (for example, information that indicates the type, model number, serial number, or ID of the terminal) for terminal #4 labeled 1004, and a modulated signal including this information is transmitted by terminal #4 labeled 1004 (in one example, this modulated signal is a modulated signal conforming to the first communication scheme). Communication device 103 receives frame 2014, and thereby obtains information related to terminal #4 labeled 1004.

Terminal #5 labeled 1005 receives registration frame 2002 and transmits frame 2015. Note that illustration of this is omitted in FIG. 20. Note that frame 2015 includes the terminal-specific information (for example, information that indicates the type, model number, serial number, or ID of the terminal) for terminal #5 labeled 1005, and a modulated signal including this information is transmitted by terminal #5 labeled 1005 (in one example, this modulated signal is a modulated signal conforming to the first communication scheme). Communication device 103 receives frame 2015, and thereby obtains information related to terminal #5 labeled 1005.

Terminal #6 labeled 1006 receives registration frame 2002 and transmits frame 2016. Note that illustration of this is omitted in FIG. 20. Note that frame 2016 includes the terminal-specific information (for example, information that indicates the type, model number, serial number, or ID of the terminal) for terminal #6 labeled 1006, and a modulated signal including this information is transmitted by terminal #6 labeled 1006 (in one example, this modulated signal is a modulated signal conforming to the first communication scheme). Communication device 103 receives frame 2016, and thereby obtains information related to terminal #6 labeled 1006.

Although terminal #1 labeled 1001, terminal #2 labeled 1002, terminal #3 labeled 1003, terminal #4 labeled 1004, terminal #5 labeled 1005, and terminal #6 labeled 1006 are each exemplified in the above description as including first transceiver device 205 in FIG. 20, among terminal #1 labeled 1001, terminal #2 labeled 1002, terminal #3 labeled 1003, terminal #4 labeled 1004, terminal #5 labeled 1005, and terminal #6 labeled 1006, there may be a terminal that does not include first transceiver device 205, and in such cases, a terminal that does not include first transceiver device 205 does not receive registration frame 2002 and does not transmit a frame.

Although communication device 103 is exemplified as transmitting wake-up frame 2001 in FIG. 20, communication device 103 need not transmit wake-up frame 2001. In such cases, when there are a plurality of terminals, terminals that are awake receive registration frame 2002 and transmit a frame that serves as a response.

Next, communication between communication device 103 and the server will be described.

As illustrated in FIG. 20, communication device 103 receives a frame transmitted by each terminal. Communication device 103 performs processing such as demodulation on the frames, and obtains terminal-specific information for each terminal (for example, information that indicates the type, model number, serial number, or ID of the terminal).

Hereinafter, an example of operations performed after communication device 103 receives frame 2011 transmitted by terminal #1 labeled 1001, demodulates frame 2011, and obtains the terminal-specific information for terminal #1 labeled 1001 (for example, information that indicates the type, model number, serial number, or ID of the terminal) will be described.

Figure 21:
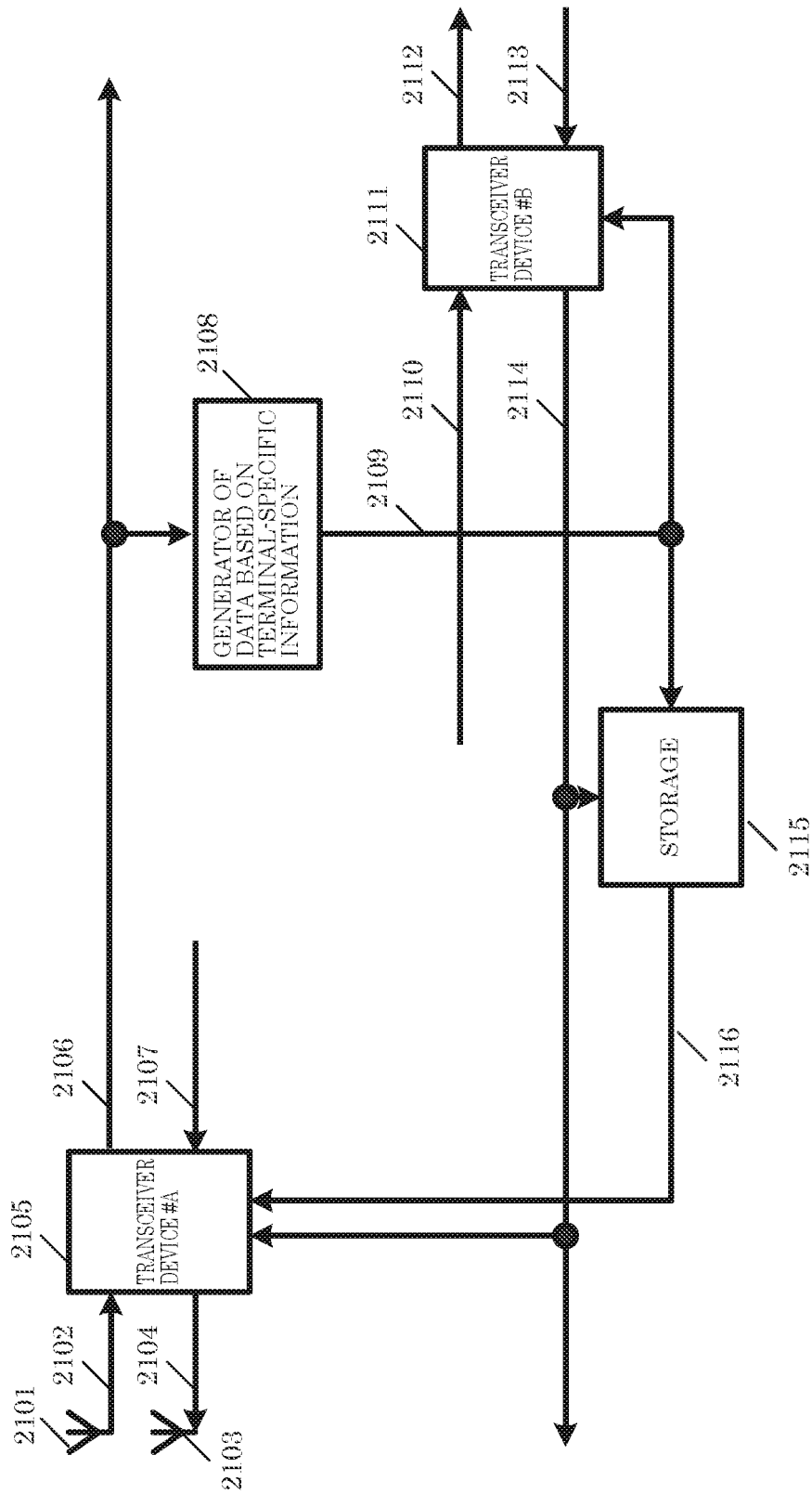
FIG. 21 illustrates one example of a configuration of a communication device.
Figure 22:
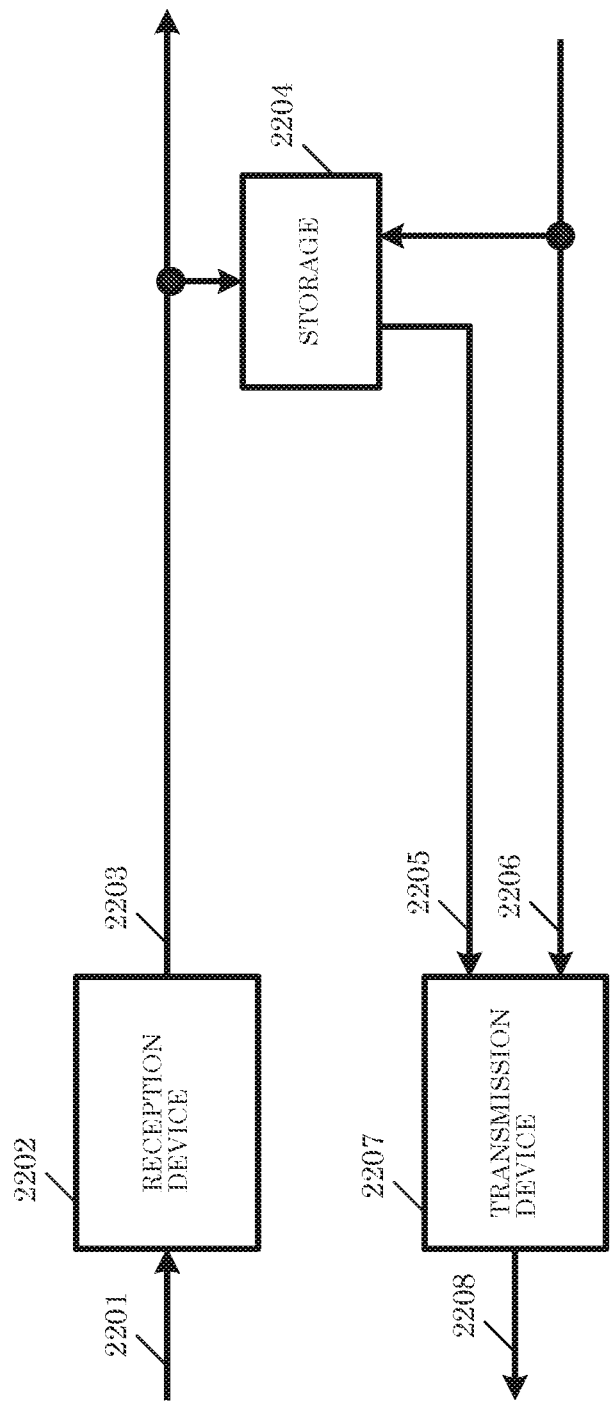
FIG. 22 illustrates one example of a configuration of a server.

FIG. 21 illustrates one example of a configuration of communication device 103. FIG. 22 illustrates one example of a configuration of a server, which is one communication partner of communication device 103.

Transceiver device #A labeled 2105 receives an input of reception signal 2102 received by antenna 2101, performs processing such as demodulation and error correction decoding, and obtains reception data 2106. Note that reception signal 2102 is a reception signal of the modulated signal transmitted by any one of, for example, terminal #1 labeled 1001, terminal #2 labeled 1002, terminal #3 labeled 1003, terminal #4 labeled 1004, terminal #5 labeled 1005, and terminal #6 labeled 1006 illustrated in FIG. 19.

Generator 2108 of data based on terminal-specific information receives an input of reception data 2106, extracts terminal-specific information included in reception data 2106, and outputs terminal-specific information 2109 (for example, information that indicates the type, model number, serial number, or ID of the terminal). For example, when reception data 2106 is obtained by receiving a modulated signal transmitted by terminal #1 labeled 1001, terminal-specific information 2109 is the terminal-specific information for terminal #1 labeled 1001.

Transceiver device #B labeled 2111 receives inputs of data 2110 and terminal-specific information 2109, for example, generates a modulated signal based on this data, and outputs the result as transmission signal 2112. Note that the communication partner of transceiver device #B labeled 2111 is the server. In the example illustrated in FIG. 19, transceiver device #B labeled 2111 communicates with the server via network 106.

Accordingly, reception device 2202 included in the server and illustrated in FIG. 22 receives an input of reception signal 2201 corresponding to modulated signal 2112, performs processing such as demodulation and error correction decoding on reception signal 2201, and outputs reception data 2203.

Storage 2204 receives an input of reception data 2203, and extracts and stores the terminal-specific information included in reception data 2203.

For example, when communication device 103 is communicating with terminal #1 labeled 1001, reception data 2203 includes the terminal-specific information for terminal #1 labeled 1001, and thus storage 2204 stores the terminal-specific information for terminal #1 labeled 1001.

Similarly, when communication device 103 is communicating with terminal #2 labeled 1002, reception data 2203 includes the terminal-specific information for terminal #2 labeled 1002, and thus storage 2204 stores the terminal-specific information for terminal #2 labeled 1002.

When communication device 103 is communicating with terminal #6 labeled 1006, reception data 2203 includes the terminal-specific information for terminal #6 labeled 1006, and thus storage 2204 stores the terminal-specific information for terminal #6 labeled 1006.

Accordingly, once the server completes the reception of frame 2011 transmitted by terminal #1 labeled 1001, the reception of frame 2012 transmitted by terminal #2 labeled 1002, the reception of frame 2013 transmitted by terminal #3 labeled 1003, the reception of frame 2014 transmitted by terminal #4 labeled 1004, the reception of frame 2015 transmitted by terminal #5 labeled 1005, and the reception of frame 2016 transmitted by terminal #6 labeled 1006, the terminal-specific information for terminal #1 labeled 1001, the terminal-specific information for terminal #2 labeled 1002, the terminal-specific information for terminal #3 labeled 1003, the terminal-specific information for terminal #4 labeled 1004, the terminal-specific information for terminal #5 labeled 1005, and the terminal-specific information for terminal #6 labeled 1006 are stored in storage 2204.

Transmission device 2207 receives an input of data 2206. In this example, data 2206 includes software data for executing an operation of device operation function 210 or updated software data for executing an operation of device operation function 210. In this example, this software data includes information indicating devices that are eligible for this software.

Storage 2204 receives an input of software data for executing an operation of device operation function 210 or updated software data for executing an operation of device operation function 210, which is included in data 2206, extracts the information indicating devices that are eligible for the software, which is included in this software data, and compares this information indicating devices that are eligible for the software with the terminal-specific information for terminal #1 labeled 1001, the terminal-specific information for terminal #2 labeled 1002, the terminal-specific information for terminal #3 labeled 1003, the terminal-specific information for terminal #4 labeled 1004, the terminal-specific information for terminal #5 labeled 1005, and the terminal-specific information for terminal #6 labeled 1006.

In this example, the information indicating devices that are eligible for the software indicates each of terminal #1 labeled 1001, terminal #2 labeled 1002, terminal #3 labeled 1003, terminal #4 labeled 1004, terminal #5 labeled 1005, and terminal #6 labeled 1006 as being eligible devices. Thus, storage 2204 outputs control signal 2205 indicating "eligible".

Transmission device 2207 receives inputs of control signal 2205 and data 2206, and when control signal 2205 indicates "eligible", performs processing such as error correction encoding on data included in the software data for executing an operation of device operation function 210 or updated software data for executing an operation of device operation function 210, which is included in data 2206, and outputs transmission signal 2208. Note that transmission signal 2208 may include information indicating the destination address of terminal in the transmission of the modulated signal by communication device 103.

Communication device 103 receives transmission signal 2208 via network 106, performs processing such as demodulation and error correction decoding to obtain the software data for executing an operation of device operation function 210 or updated software data for executing an operation of device operation function 210, generates a modulated signal including this data, and transmits the modulated signal to destination terminals. Note that this modulated signal is a modulated signal conforming to the first communication scheme.

On the other hand, when information indicating devices that are eligible for the software indicates that none of terminal #1 labeled 1001, terminal #2 labeled 1002, terminal #3 labeled 1003, terminal #4 labeled 1004, terminal #5 labeled 1005, and terminal #6 labeled 1006 are eligible, storage 2204 outputs control signal 2205 indicating "not eligible".

Transmission device 2207 then receives inputs of control signal 2205 and data 2206, and when control signal 2205 indicates "not eligible", transmission device 2207 does not output transmission signal 2208.

An example of the above operations will be given with reference to FIG. 23. For example, a case in which communication device 103 transmits, to terminal #1 labeled 1001, software data for executing an operation of device operation function 210 or updated software data for executing an operation of device operation function 210 will be described.

Figure 23:
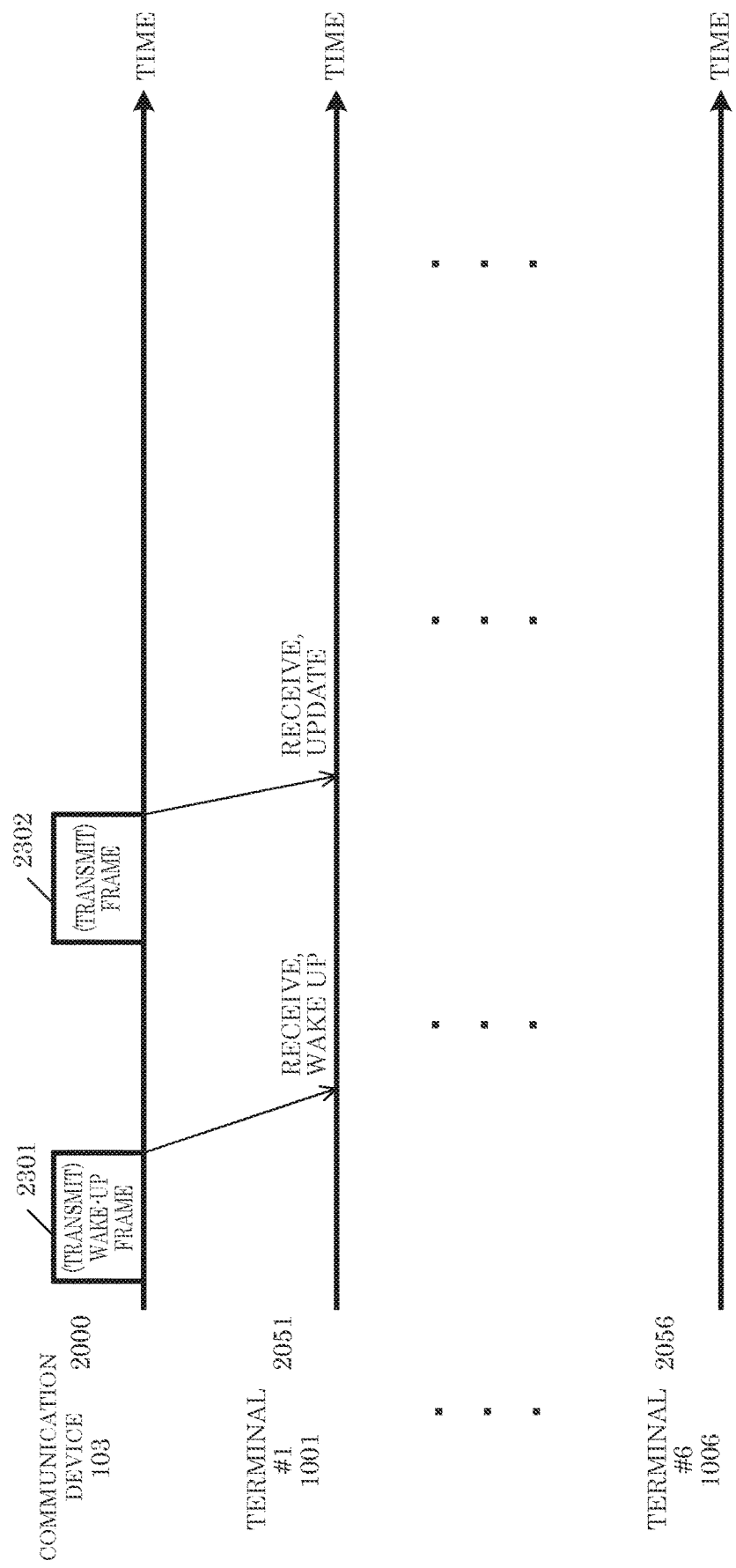
FIG. 23 illustrates one example of operations.

In FIG. 23, 2000 indicates an example of communication by communication device 103, relative to the time axis.

2051 is an example of communication by first transceiver device 205 included in terminal #1 labeled 1001, relative to the time axis.

2052 is an example of communication by first transceiver device 205 included in terminal #2 labeled 1002, relative to the time axis.

2053 is an example of communication by first transceiver device 205 included in terminal #3 labeled 1003, relative to the time axis.

2054 is an example of communication by first transceiver device 205 included in terminal #4 labeled 1004, relative to the time axis.

2055 is an example of communication by first transceiver device 205 included in terminal #5 labeled 1005, relative to the time axis.

2056 is an example of communication by first transceiver device 205 included in terminal #6 labeled 1006, relative to the time axis.

A modulated signal including software data for executing an operation of device operation function 210 or updated software data for executing an operation of device operation function 210 reaches communication device 103 from the server, which is the communication partner of communication device 103, via network 106. Here, terminal #1 labeled 1001 is eligible for this software. Here, in order to transmit the software data for executing an operation of device operation function 210 or updated software data for executing an operation of device operation function 210 to terminal #1 labeled 1001, communication device 103 transmits wake-up frame 2301 to terminal #1 labeled 1001.

Terminal #1 labeled 1001 receives wake-up frame 2301, and terminal #1 labeled 1001 wakes up.

Communication device 103 then transmits frame 2302. Frame 2302 includes software data for executing an operation of device operation function 210 or updated software data for executing an operation of device operation function 210. Here, terminal #1 labeled 1001 is eligible for this software.

Terminal #1 labeled 1001 then receives frame 2302. Terminal #1 labeled 1001 then updates its software using the software data for executing an operation of device operation function 210 or the updated software data for executing an operation of device operation function 210 that is included in frame 2302. Note that an example of operations performed up to the obtaining of this software has already been described.

Although communication device 103 is exemplified as transmitting wake-up frame 2301 in FIG. 23, communication device 103 need not transmit wake-up frame 2301.

In the present embodiment, instead of software data for executing an operation of device operation function 210 or updated software data for executing an operation of device operation function 210, data indicating an access destination to download software data for executing an operation of device operation function 210 or updated software data for executing an operation of device operation function 210 (for example, an address or uniform resource locator (URL) of a web page or server) may be used in the implementation of the present embodiment.

In such cases, terminal #1 labeled 1001 obtains information indicating an access destination to download software data for executing an operation of device operation function 210 or updated software data for executing an operation of device operation function 210, accesses the access destination, obtains the software data for executing an operation of device operation function 210 or the updated software data for executing an operation of device operation function 210, and updates its software. Note that terminal #1 labeled 1001 may access base station #A labeled 100_1 and/or base station #B labeled 100_2 in FIG. 24 in order to obtain information indicating an access destination to download software data for executing an operation of device operation function 210 or updated software data for executing an operation of device operation function 210, access the access destination, and obtain the software data for executing an operation of device operation function 210 or the updated software data for executing an operation of device operation function 210 (in such cases, terminal #1 labeled 1001 obtains the software from base station #A labeled 100_1 and/or base station #B labeled 100_2 in FIG. 24). Note that FIG. 24 will be described later.

As described above, terminal-specific information for the terminal that is a communication partner of communication device 103 is provided to communication device 103 and the server that is a communication partner of communication device 103, and as a result of the server and communication device 103 controlling the provision of software based on this information, the advantageous effect that wireless resources can be efficiently utilized can be achieved since terminal software can be updated precisely and the transmission of software information can be favorably controlled.

Although the devices in the present embodiment are named "communication device", "terminal", and "server", the names of these devices are not limited to these examples.

Embodiment 4

In the present embodiment, a variation of Embodiment 3 will be described.

Figure 24:
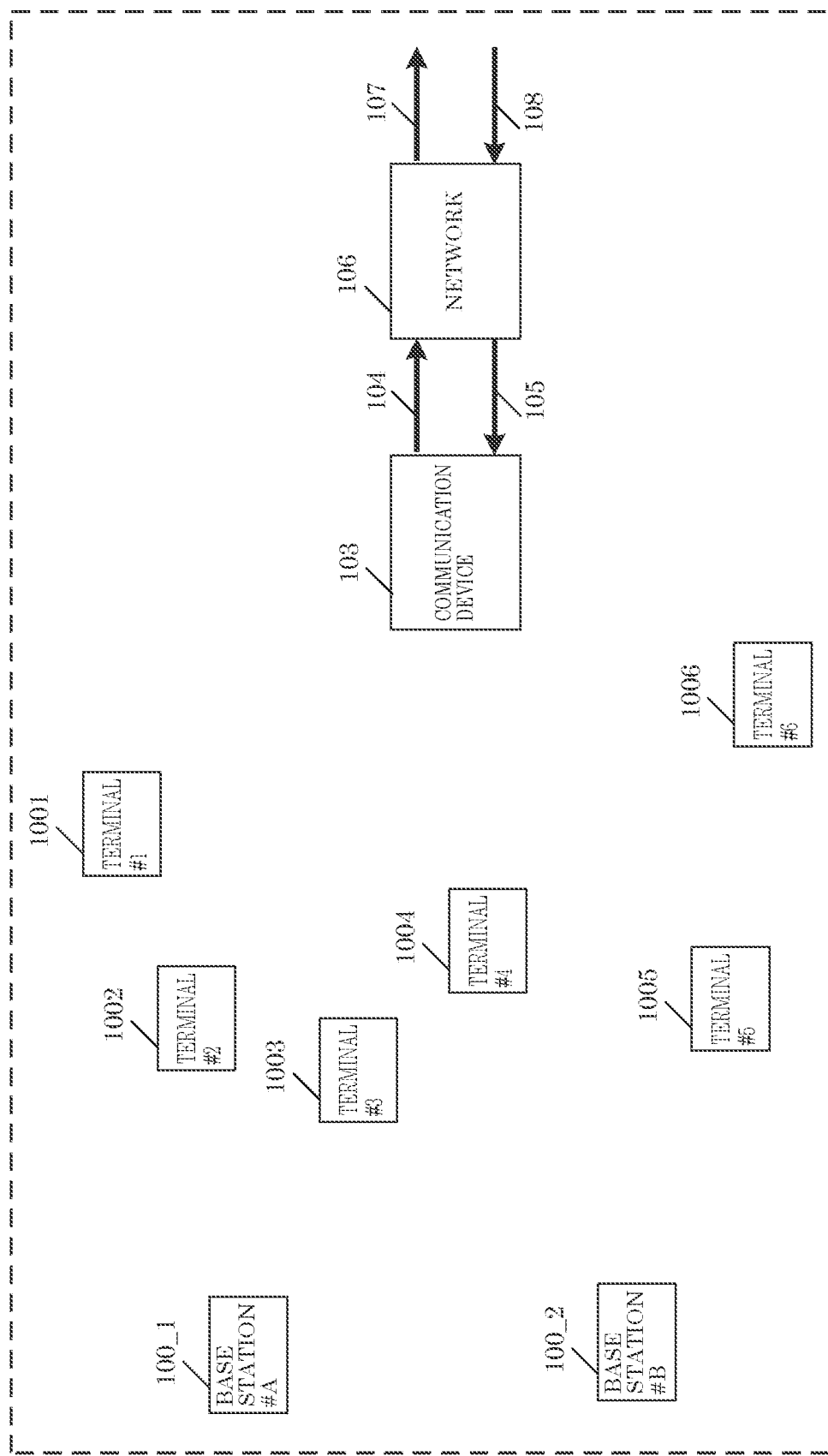
FIG. 24 illustrates one example of a configuration of a communication system.

FIG. 24 illustrates one example of a configuration of a communication system according to the present embodiment. Note that in FIG. 24, elements that operate the same as in FIG. 1, FIG. 10, and FIG. 19 share like reference signs.

Terminal #1 labeled 1001 communicates with communication device 103 using the first communication scheme. For example, terminal #1 labeled 1001 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #1 labeled 1001. Terminal #1 labeled 1001 receives the modulated signal, performs processing such as demodulation and error correction decoding, and obtains the data.

Similarly, terminal #2 labeled 1002 communicates with communication device 103 using the first communication scheme. For example, terminal #2 labeled 1002 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #2 labeled 1002. Terminal #2 labeled 1002 receives the modulated signal, performs processing such as demodulation and error correction decoding, and obtains the data.

Terminal #3 labeled 1003 communicates with communication device 103 using the first communication scheme. For example, terminal #3 labeled 1003 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #3 labeled 1003. Terminal #3 labeled 1003 receives the modulated signal, performs processing such as demodulation and error correction decoding, and obtains the data.

Terminal #4 labeled 1004 communicates with communication device 103 using the first communication scheme. For example, terminal #4 labeled 1004 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #4 labeled 1004. Terminal #4 labeled 1004 receives the modulated signal, performs processing such as demodulation and error correction decoding, and obtains the data.

Terminal #5 labeled 1005 communicates with communication device 103 using the first communication scheme. For example, terminal #5 labeled 1005 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #5 labeled 1005. Terminal #5 labeled 1005 receives the modulated signal, performs processing such as demodulation and error correction decoding, and obtains the data.

Terminal #6 labeled 1006 communicates with communication device 103 using the first communication scheme. For example, terminal #6 labeled 1006 generates a modulated signal conforming to the first communication scheme that includes data, and transmits the modulated signal to communication device 103. Communication device 103 receives the modulated signal, performs processing such as demodulation and error correction decoding, and obtains the data.

Communication device 103 generates a modulated signal conforming to the first communication scheme that includes data, and transmits the modulated signal to terminal #6 labeled 1006. Terminal #6 labeled 1006 receives the modulated signal, performs processing such as demodulation and error correction decoding, and obtains the data.

Terminal #1 labeled 1001 communicates with base station #A labeled 100_1 using the second communication scheme. This has already been described in Embodiment 1 and Embodiment 2.

Similarly, terminal #2 labeled 1002 communicates with base station #A labeled 100_1 using the second communication scheme.

Terminal #3 labeled 1003 communicates with base station #A labeled 100_1 using the second communication scheme.

Terminal #4 labeled 1004 communicates with base station #A labeled 100_1 using the second communication scheme.

Terminal #5 labeled 1005 communicates with base station #A labeled 100_1 using the second communication scheme.

Terminal #6 labeled 1006 communicates with base station #A labeled 100_1 using the second communication scheme.

Terminal #1 labeled 1001 communicates with base station #B labeled 100_2 using the third communication scheme. This has already been described in Embodiment 1 and Embodiment 2.

Similarly, terminal #2 labeled 1002 communicates with base station #B labeled 100_2 using the third communication scheme.

Terminal #3 labeled 1003 communicates with base station #B labeled 100_2 using the third communication scheme.

Terminal #4 labeled 1004 communicates with base station #B labeled 100_2 using the third communication scheme.

Terminal #5 labeled 1005 communicates with base station #B labeled 100_2 using the third communication scheme.

Terminal #6 labeled 1006 communicates with base station #B labeled 100_2 using the third communication scheme.

For example, communication device 103 forwards, for example, data obtained from another device to, for example, a server via, for example, network 106. The flow of data is indicated by the arrows labeled 108 and 105, and the data flows in the listed order.

Communication device 103 transmits data obtained from another device to a device such as a server via network 106. The flow of data is indicated by the arrows labeled 104 and 107, and the data flows in the listed order.

FIG. 2 illustrates one example of a configuration of any one of terminal #1 labeled 1001, terminal #2 labeled 1002, terminal #3 labeled 1003, terminal #4 labeled 1004, terminal #5 labeled 1005, and terminal #6 labeled 1006 illustrated in FIG. 24. As operations have already been described in detail in Embodiment 1 and Embodiment 2, repeated description will be omitted. Note that when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the first communication scheme, these terminals do not include parts related to first transceiver device 205. Moreover, when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the second communication scheme, these terminals do not include parts related to second transceiver device 215. Similarly, when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the third communication scheme, these terminals do not include parts related to third transceiver device 225.

FIG. 20 illustrates one example of the flow of communication, relative to the time axis, between communication device 103, terminal #1 labeled 1001, terminal #2 labeled 1002, terminal #3 labeled 1003, terminal #4 labeled 1004, terminal #5 labeled 1005, and terminal #6 labeled 1006 illustrated in FIG. 24. Time is represented on the horizontal axis in FIG. 20. As operations have already been described in Embodiment 3, repeated description will be omitted.

Next, communication between communication device 103 and the server will be described.

As illustrated in FIG. 20, communication device 103 receives a frame transmitted by each terminal. Communication device 103 performs processing such as demodulation on the frames, and obtains terminal-specific information for each terminal (for example, information that indicates the type, model number, serial number, or ID of the terminal).

Hereinafter, an example of operations performed after communication device 103 receives frame 2011 transmitted by terminal #1 labeled 1001, demodulates frame 2011, and obtains the terminal-specific information for terminal #1 labeled 1001 (for example, information that indicates the type, model number, serial number, or ID of the terminal) will be described.

FIG. 21 illustrates one example of a configuration of communication device 103. FIG. 22 illustrates one example of a configuration of a server, which a communication partner of communication device 103.

Transceiver device #A labeled 2105 receives an input of reception signal 2102 received by antenna 2101, performs processing such as demodulation and error correction decoding, and obtains reception data 2106. Note that reception signal 2102 is a reception signal of the modulated signal transmitted by any one of, for example, terminal #1 labeled 1001, terminal #2 labeled 1002, terminal #3 labeled 1003, terminal #4 labeled 1004, terminal #5 labeled 1005, and terminal #6 labeled 1006 illustrated in FIG. 19.

Generator 2108 of data based on terminal-specific information receives an input of reception data 2106, extracts terminal-specific information included in reception data 2106, and outputs terminal-specific information 2109 (for example, information that indicates the type, model number, serial number, or ID of the terminal). For example, when reception data 2106 is obtained by receiving a modulated signal transmitted by terminal #1 labeled 1001, terminal-specific information 2109 is the terminal-specific information for terminal #1 labeled 1001.

Transceiver device #B labeled 2111 receives inputs of data 2110 and terminal-specific information 2109, for example, generates a modulated signal based on this data, and outputs the result as transmission signal 2112. Note that the communication partner of transceiver device #B labeled 2111 is the server. In the example illustrated in FIG. 19, transceiver device #B labeled 2111 communicates with the server via network 106.

Accordingly, reception device 2202 included in the server and illustrated in FIG. 22 receives an input of reception signal 2201 corresponding to modulated signal 2112, performs processing such as demodulation and error correction decoding on reception signal 2201, and outputs reception data 2203.

Storage 2204 receives an input of reception data 2203, and extracts and stores the terminal-specific information included in reception data 2203.

For example, when communication device 103 is communicating with terminal #1 labeled 1001, reception data 2203 includes the terminal-specific information for terminal #1 labeled 1001, and thus storage 2204 stores the terminal-specific information for terminal #1 labeled 1001.

Similarly, when communication device 103 is communicating with terminal #2 labeled 1002, reception data 2203 includes the terminal-specific information for terminal #2 labeled 1002, and thus storage 2204 stores the terminal-specific information for terminal #2 labeled 1002.

When communication device 103 is communicating with terminal #6 labeled 1006, reception data 2203 includes the terminal-specific information for terminal #6 labeled 1006, and thus storage 2204 stores the terminal-specific information for terminal #6 labeled 1006.

Accordingly, once the server completes the reception of frame 2011 transmitted by terminal #1 labeled 1001, the reception of frame 2012 transmitted by terminal #2 labeled 1002, the reception of frame 2013 transmitted by terminal #3 labeled 1003, the reception of frame 2014 transmitted by terminal #4 labeled 1004, the reception of frame 2015 transmitted by terminal #5 labeled 1005, and the reception of frame 2016 transmitted by terminal #6 labeled 1006, the terminal-specific information for terminal #1 labeled 1001, the terminal-specific information for terminal #2 labeled 1002, the terminal-specific information for terminal #3 labeled 1003, the terminal-specific information for terminal #4 labeled 1004, the terminal-specific information for terminal #5 labeled 1005, and the terminal-specific information for terminal #6 labeled 1006 are stored in storage 2204.

Generator 2108 of data based on terminal-specific information in FIG. 21 receives an input of reception data 2106, extracts terminal-specific information included in reception data 2106, and outputs terminal-specific information 2109. Here, terminal-specific information 2109 may include information indicating communication schemes that each terminal supports. For example, when reception data 2106 is obtained by receiving a modulated signal transmitted by terminal #1 labeled 1001, terminal-specific information 2109 is the terminal-specific information for terminal #1 labeled 1001.

Transceiver device #B labeled 2111 receives inputs of data 2110 and terminal-specific information 2109, for example, generates a modulated signal based on this data, and outputs the result as transmission signal 2112. Note that the communication partner of transceiver device #B labeled 2111 is the server. In the example illustrated in FIG. 19, transceiver device #B labeled 2111 communicates with the server via network 106.

Accordingly, reception device 2202 included in the server and illustrated in FIG. 22 receives an input of reception signal 2201 corresponding to modulated signal 2112, performs processing such as demodulation and error correction decoding on reception signal 2201, and outputs reception data 2203.

Storage 2204 receives an input of reception data 2203, and extracts and stores the terminal-specific information included in reception data 2203.

For example, when communication device 103 is communicating with terminal #1 labeled 1001, reception data 2203 includes the terminal-specific information for terminal #1 labeled 1001, and thus storage 2204 stores the terminal-specific information for terminal #1 labeled 1001.

Similarly, when communication device 103 is communicating with terminal #2 labeled 1002, reception data 2203 includes the terminal-specific information for terminal #2 labeled 1002, and thus storage 2204 stores the terminal-specific information for terminal #2 labeled 1002.

When communication device 103 is communicating with terminal #6 labeled 1006, reception data 2203 includes the terminal-specific information for terminal #6 labeled 1006, and thus storage 2204 stores the terminal-specific information for terminal #6 labeled 1006.

Accordingly, once the server completes the reception of frame 2011 transmitted by terminal #1 labeled 1001, the reception of frame 2012 transmitted by terminal #2 labeled 1002, the reception of frame 2013 transmitted by terminal #3 labeled 1003, the reception of frame 2014 transmitted by terminal #4 labeled 1004, the reception of frame 2015 transmitted by terminal #5 labeled 1005, and the reception of frame 2016 transmitted by terminal #6 labeled 1006, the terminal-specific information for terminal #1 labeled 1001, the terminal-specific information for terminal #2 labeled 1002, the terminal-specific information for terminal #3 labeled 1003, the terminal-specific information for terminal #4 labeled 1004, the terminal-specific information for terminal #5 labeled 1005, and the terminal-specific information for terminal #6 labeled 1006 are stored in storage 2204.

Transmission device 2207 receives an input of data 2206. In this example, data 2206 includes software data for executing an operation of device operation function 210 or updated software data for executing an operation of device operation function 210. In this example, this software data includes information indicating devices that are eligible for this software.

Storage 2204 receives an input of software data for executing an operation of device operation function 210 or updated software data for executing an operation of device operation function 210, which is included in data 2206, extracts the information indicating devices that are eligible for the software, which is included in this software data, and compares this information indicating devices that are eligible for the software with the terminal-specific information for terminal #1 labeled 1001, the terminal-specific information for terminal #2 labeled 1002, the terminal-specific information for terminal #3 labeled 1003, the terminal-specific information for terminal #4 labeled 1004, the terminal-specific information for terminal #5 labeled 1005, and the terminal-specific information for terminal #6 labeled 1006.

In this example, the information indicating devices that are eligible for the software indicates each of terminal #1 labeled 1001, terminal #2 labeled 1002, terminal #3 labeled 1003, terminal #4 labeled 1004, terminal #5 labeled 1005, and terminal #6 labeled 1006 as being eligible devices. Thus, storage 2204 outputs control signal 2205 indicating "eligible".

When the information indicating devices that are eligible for the software indicates each of terminal #1 labeled 1001, terminal #2 labeled 1002, terminal #3 labeled 1003, terminal #4 labeled 1004, terminal #5 labeled 1005, and terminal #6 labeled 1006 as being eligible devices, storage 2204 outputs control signal 2205 including information indicating communication schemes that eligible terminals support.

Transmission device 2207 receives inputs of control signal 2205 and data 2206, and when control signal 2205 indicates "eligible", performs processing such as error correction encoding on data included in the software data for executing an operation of device operation function 210 or updated software data for executing an operation of device operation function 210, which is included in data 2206, and outputs transmission signal 2208. Note that the destination of transmission signal 2208 is a communication device that is capable of communication via a communication scheme supported by terminals eligible for the software as indicated in the information indicating the communication schemes that the eligible terminals support. In the present embodiment, the destination communication device is base station #A labeled 100_1 or base station #B labeled 100_2 illustrated in FIG. 24.

Base station #A labeled 100_1 or base station #B labeled 100_2 illustrated in FIG. 24 receives transmission signal 2208 and performs processing such as demodulation and error correction decoding to obtain software data for executing an operation of device operation function 210 or updated software data for executing an operation of device operation function 210. The base station then generates a modulated signal including this data and transmits the modulated signal to a destination terminal.

On the other hand, when information indicating devices that are eligible for the software indicates that none of terminal #1 labeled 1001, terminal #2 labeled 1002, terminal #3 labeled 1003, terminal #4 labeled 1004, terminal #5 labeled 1005, and terminal #6 labeled 1006 are eligible, storage 2204 outputs control signal 2205 indicating "not eligible".

Transmission device 2207 then receives inputs of control signal 2205 and data 2206, and when control signal 2205 indicates "not eligible", transmission device 2207 does not output transmission signal 2208.

An example of the above operations will be given with reference to FIG. 25. For example, a case in which base station #A labeled 100_1 illustrated in FIG. 24 transmits, to terminal #1 labeled 1001, software data for executing an operation of device operation function 210 or updated software data for executing an operation of device operation function 210 will be described.

Figure 25:
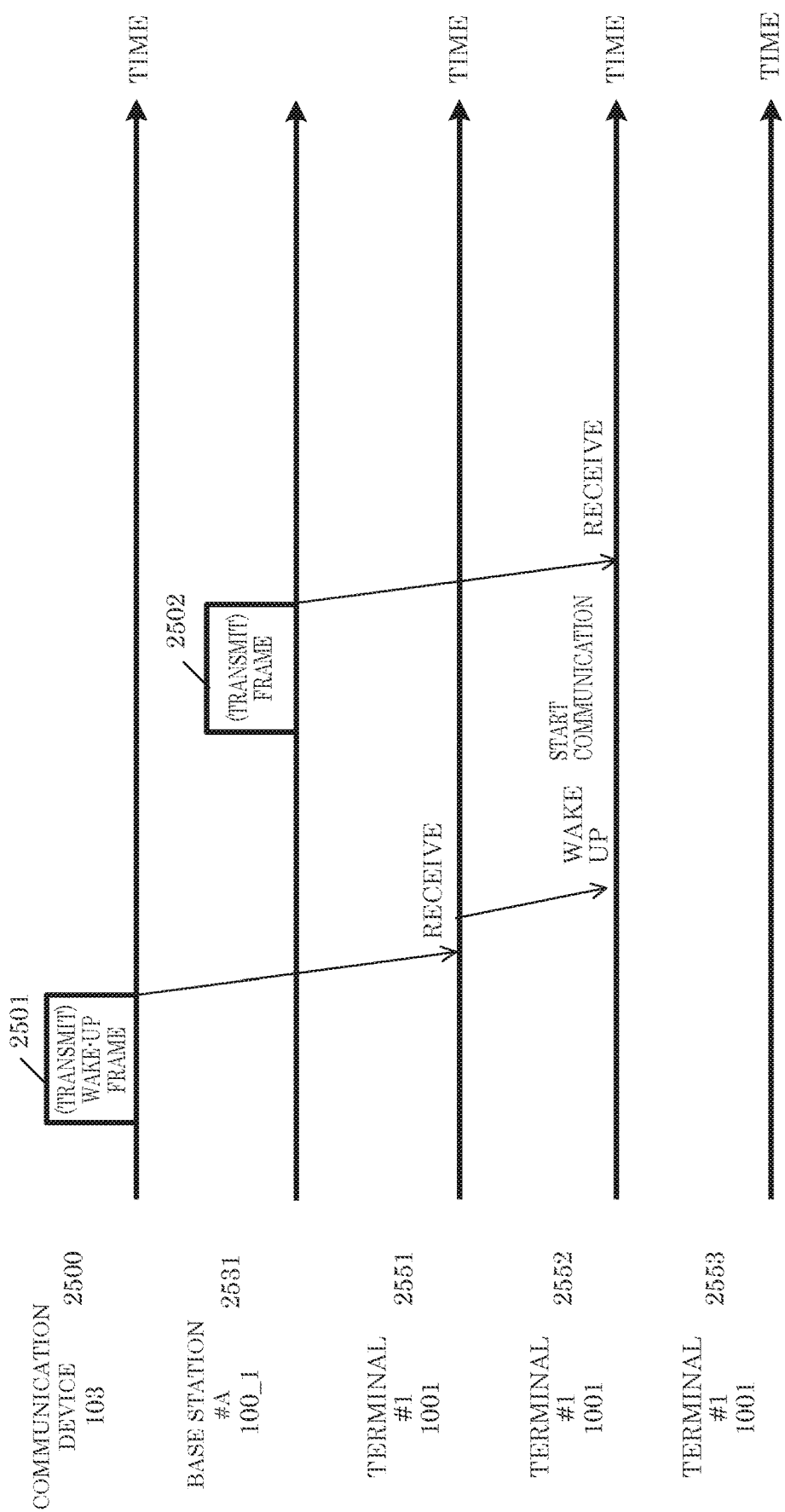
FIG. 25 illustrates one example of operations.

In FIG. 25, 2500 is an example of communication by communication device 103, relative to the time axis.

2531 is an example of communication by base station #A labeled 100_1, relative to the time axis.

2551 indicates an example of communication by first transceiver device 205 included in terminal #1 labeled 1001, relative to the time axis.

2552 indicates an example of communication by second transceiver device 215 included in terminal #1 labeled 1001, relative to the time axis.

2553 indicates an example of communication by third transceiver device 225 included in terminal #1 labeled 1001, relative to the time axis.

Communication device 103 transmits wake-up frame 2501 to terminal #1 labeled 1001.

In this example, the server transmits, to base station #A labeled 100_1, a modulated signal including software data for executing an operation of device operation function 210 or updated software data for executing an operation of device operation function 210. Here, terminal #1 labeled 1001 is eligible for this software. Accordingly, base station #A labeled 100_1 obtains the software data for executing an operation of device operation function 210 or updated software data for executing an operation of device operation function 210.

Terminal #1 labeled 1001 (first transceiver device 205 included in terminal #1 labeled 1001) receives wake-up frame 2501 and wakes up.

Accordingly, base station #A labeled 100_1 transmits frame 2502 including the software data for executing an operation of device operation function 210 or the updated software data for executing an operation of device operation function 210.

Terminal #1 labeled 1001 (second transceiver device 215 included in terminal #1 labeled 1001) then receives frame 2502. Terminal #1 labeled 1001 (second transceiver device 215 included in terminal #1 labeled 1001) then updates its software using the software data for executing an operation of device operation function 210 or updated software data for executing an operation of device operation function 210 that is included in frame 2502. Note that an example of operations performed up to the obtaining of this software has already been described.

Although communication device 103 is exemplified as transmitting wake-up frame 2501 in FIG. 25, communication device 103 need not transmit wake-up frame 2501.

In the present embodiment, instead of software data for executing an operation of device operation function 210 or updated software data for executing an operation of device operation function 210, data indicating an access destination to download software data for executing an operation of device operation function 210 or updated software data for executing an operation of device operation function 210 (for example, an address or uniform resource locator (URL) of a web page or server) may be used in the implementation of the present embodiment.

In such cases, terminal #1 labeled 1001 obtains information indicating an access destination to download software data for executing an operation of device operation function 210 or updated software data for executing an operation of device operation function 210, accesses the access destination, obtains the software data for executing an operation of device operation function 210 or the updated software data for executing an operation of device operation function 210, and updates its software.

As described above, terminal-specific information for the terminal that is a communication partner of communication device 103 is provided to communication device 103 and the server that is a communication partner of communication device 103, and as a result of the server and communication device 103 controlling the provision of software based on this information, the advantageous effect that wireless resources can be efficiently utilized can be achieved since terminal software can be updated precisely and the transmission of software information can be favorably controlled.

Although the devices in the present embodiment are named "communication device", "terminal", and "server", the names of these devices are not limited to these examples.

Embodiment 5

In the present embodiment, an implementation example that utilizes the wake-up operation described in Embodiment 1 and Embodiment 2 will be given.

Figure 26:
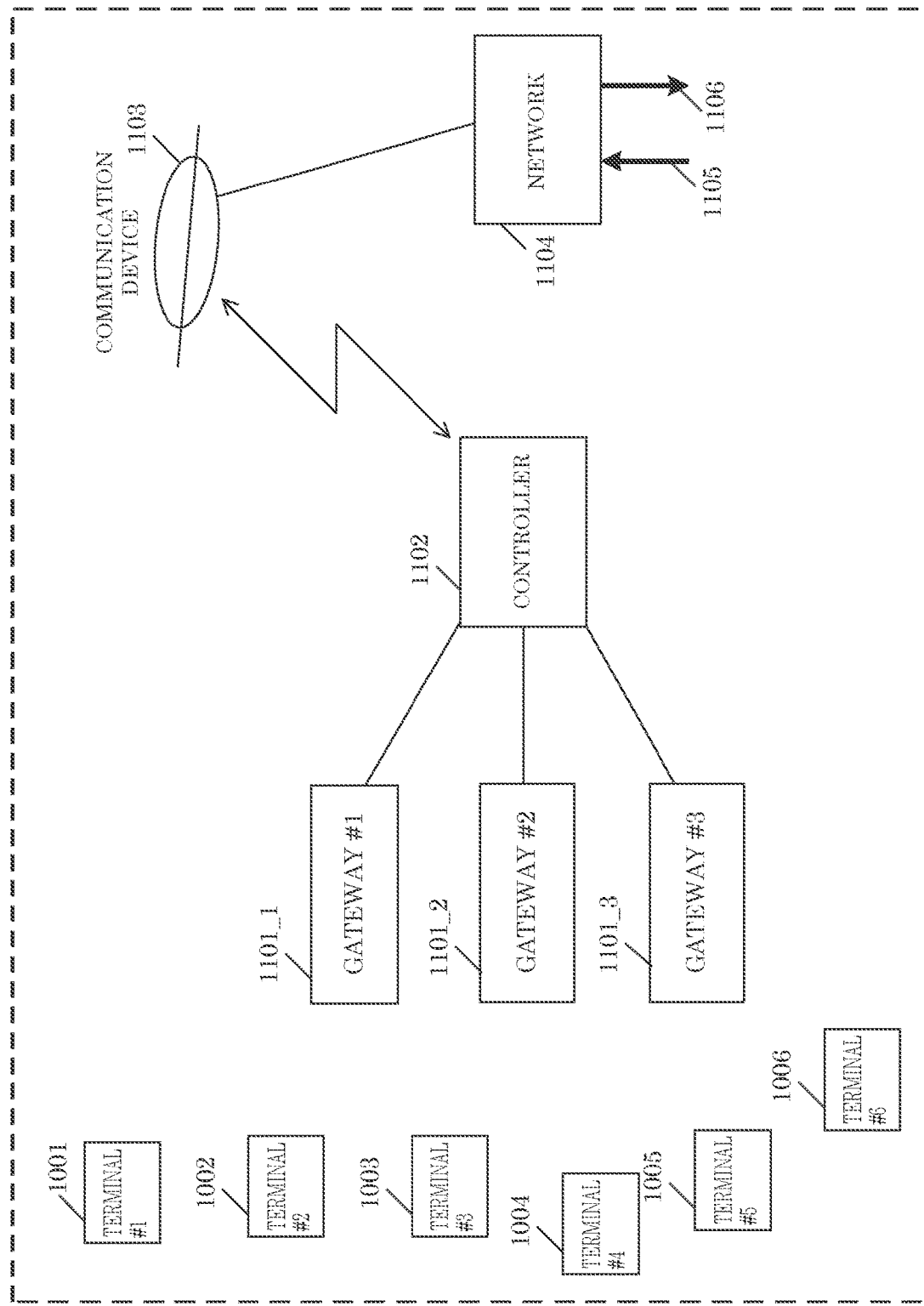
FIG. 26 illustrates one example of a configuration of a communication system.

FIG. 26 illustrates one example of a configuration of a communication system according to the present embodiment. Note that in FIG. 26, elements that operate the same as in FIG. 1, FIG. 10, and FIG. 11 share like reference signs.

Terminal #1 labeled 1001 communicates with a gateway using the first communication scheme. As operations have already been described in detail in Embodiment 2, repeated description will be omitted.

Similarly, terminal #2 labeled 1002 communicates with a gateway using the first communication scheme.

Terminal #3 labeled 1003 communicates with a gateway using the first communication scheme.

Terminal #4 labeled 1004 communicates with a gateway using the first communication scheme.

Terminal #5 labeled 1005 communicates with a gateway using the first communication scheme.

Terminal #6 labeled 1006 communicates with a gateway using the first communication scheme.

Gateway #1 labeled 1101_1 communicates with controller 1102, gateway #2 labeled 1101_2 communicates with controller 1102, and gateway #3 labeled 1101_3 communicates with controller 1102. As operations have already been described in detail in Embodiment 2, repeated description will be omitted.

Controller 1102 communicates with communication device 1103. As operations have already been described in detail in Embodiment 2, repeated description will be omitted.

For example, communication device 1103 is communicating with a server via network 1104.

FIG. 2 illustrates one example of a configuration of any one of terminal #1 labeled 1001, terminal #2 labeled 1002, terminal #3 labeled 1003, terminal #4 labeled 1004, terminal #5 labeled 1005, and terminal #6 labeled 1006 illustrated in FIG. 19. As operations have already been described in detail in Embodiment 1 and Embodiment 2, repeated description will be omitted. Note that when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the first communication scheme, these terminals do not include parts related to first transceiver device 205. Moreover, when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the second communication scheme, these terminals do not include parts related to second transceiver device 215. Similarly, when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the third communication scheme, these terminals do not include parts related to third transceiver device 225.

Figure 27:
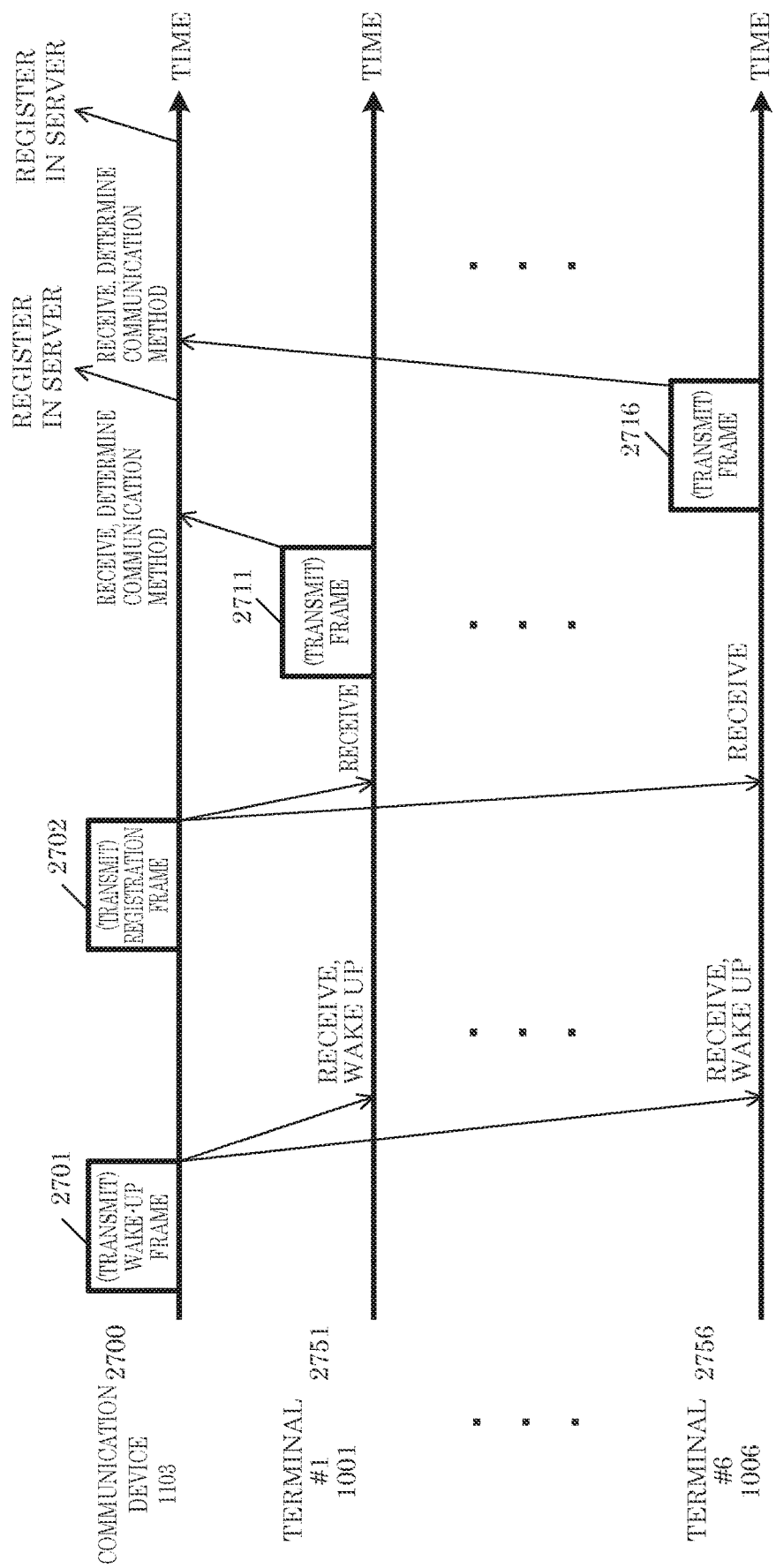
FIG. 27 illustrates one example of the flow of communication.

FIG. 27 illustrates one example of the flow of communication, relative to the time axis, between communication device 1103, terminal #1 labeled 1001, terminal #2 labeled 1002, terminal #3 labeled 1003, terminal #4 labeled 1004, terminal #5 labeled 1005, and terminal #6 labeled 1006 illustrated in FIG. 26. Time is represented on the horizontal axis in FIG. 27.

2700 in FIG. 27 indicates an example of communication by communication device 1103, relative to the time axis.

2751 is an example of communication by first transceiver device 205 included in terminal #1 labeled 1001, relative to the time axis.

2752 is an example of communication by first transceiver device 205 included in terminal #2 labeled 1002, relative to the time axis.

2753 is an example of communication by first transceiver device 205 included in terminal #3 labeled 1003, relative to the time axis.

2754 is an example of communication by first transceiver device 205 included in terminal #4 labeled 1004, relative to the time axis.

2755 is an example of communication by first transceiver device 205 included in terminal #5 labeled 1005, relative to the time axis.

2756 is an example of communication by first transceiver device 205 included in terminal #6 labeled 1006, relative to the time axis.

Note that in FIG. 27, illustration of the communication indicated by 2752, 2753, 2754, and 2755 is omitted.

As illustrated in FIG. 27, first, communication device 103 transmits wake-up frame 2701. Here, in this example, wake-up frame 2701 includes information indicating to wake up terminal #1 labeled 1001, wake up terminal #2 labeled 1002, wake up terminal #3 labeled 1003, wake up terminal #4 labeled 1004, wake up terminal #5 labeled 1005, and wake up terminal #6 labeled 1006. Communication device 1103 transmits wake-up frame 2701 to terminal #1 labeled 1001, terminal #2 labeled 1002, terminal #3 labeled 1003, terminal #4 labeled 1004, terminal #5 labeled 1005, and terminal #6 labeled 1006 via controller 1102 and gateway #1 labeled 1101_1 or gateway #2 labeled 1101_2 or gateway #3 labeled 1101_3. Moreover, as described in Embodiment 1 and Embodiment 2, wake-up frame 2701 may be multicast (and may be unicast).

First transceiver device 205 included in terminal #1 labeled 1001 then receives wake-up frame 2701. First transceiver device 205 included in terminal #1 labeled 1001 then performs processing such as demodulation on wake-up frame 2701, thereby obtaining the information indicating to wake up terminal #1 labeled 1001. Accordingly, in FIG. 27, terminal #1 labeled 1001 wakes up.

First transceiver device 205 included in terminal #2 labeled 1002 receives wake-up frame 2701. First transceiver device 205 included in terminal #2 labeled 1002 then performs processing such as demodulation on wake-up frame 2701, thereby obtaining the information indicating to wake up terminal #2 labeled 1002. Accordingly, in FIG. 27, terminal #2 labeled 1002 wakes up.

First transceiver device 205 included in terminal #3 labeled 1003 receives wake-up frame 2701. First transceiver device 205 included in terminal #3 labeled 1003 then performs processing such as demodulation on wake-up frame 2701, thereby obtaining the information indicating to wake up terminal #3 labeled 1003. Accordingly, in FIG. 27, terminal #3 labeled 1003 wakes up.

First transceiver device 205 included in terminal #4 labeled 1004 receives wake-up frame 2701. First transceiver device 205 included in terminal #4 labeled 1004 then performs processing such as demodulation on wake-up frame 2701, thereby obtaining the information indicating to wake up terminal #4 labeled 1004. Accordingly, in FIG. 27, terminal #4 labeled 1004 wakes up.

First transceiver device 205 included in terminal #5 labeled 1005 receives wake-up frame 2701. First transceiver device 205 included in terminal #5 labeled 1005 then performs processing such as demodulation on wake-up frame 2701, thereby obtaining the information indicating to wake up terminal #5 labeled 1005. Accordingly, in FIG. 27, terminal #5 labeled 1005 wakes up.

First transceiver device 205 included in terminal #6 labeled 1006 receives wake-up frame 2701. First transceiver device 205 included in terminal #6 labeled 1006 then performs processing such as demodulation on wake-up frame 2701, thereby obtaining the information indicating to wake up terminal #6 labeled 1006. Accordingly, in FIG. 27, terminal #6 labeled 1006 wakes up.

Although terminal #1 labeled 1001, terminal #2 labeled 1002, terminal #3 labeled 1003, terminal #4 labeled 1004, terminal #5 labeled 1005, and terminal #6 labeled 1006 are each exemplified as including first transceiver device 205 in FIG. 27, among terminal #1 labeled 1001, terminal #2 labeled 1002, terminal #3 labeled 1003, terminal #4 labeled 1004, terminal #5 labeled 1005, and terminal #6 labeled 1006, there may be a terminal that does not include first transceiver device 205. In such cases, such a terminal does not wake up.

Next, as illustrated in FIG. 27, communication device 1103 transmits registration frame 2702. Communication device 1103 transmits registration frame 2702 to terminal #1 labeled 1001, terminal #2 labeled 1002, terminal #3 labeled 1003, terminal #4 labeled 1004, terminal #5 labeled 1005, and terminal #6 labeled 1006 via controller 1102 and gateway #1 labeled 1101_1 or gateway #2 labeled 1101_2 or gateway #3 labeled 1101_3. Moreover, as described in Embodiment 1 and Embodiment 2, registration frame 2702 may be multicast (and may be unicast). Next, registration frame 2702 will be described in greater detail.

Communication device 1103 illustrated in FIG. 26 is connected to a server via network 1104. The server or a device that communicates with the server transmits a modulated signal including software data for executing an operation of device operation function 210 or (a modulated signal including) updated software data for executing an operation of device operation function 210 to communication device 1103. Communication device 1103 transmits a modulated signal including this software data to a terminal via controller 1102 and gateway #1 labeled 1101_1 or gateway #2 labeled 1101_2 or gateway #3 labeled 1101_3 (although software data is used as an example here, the information that is transmitted may be some other information).

Here, when communication device 1103 and the server know which terminals are capable of communicating with communication device 1103, this is advantageous as information such as software can be provided with certainty. When controller 1102 also knows which terminals are capable of communicating with communication device 1103, this is advantageous as information such as software can be provided with certainty.

Registration frame 2702 is a frame for knowing the status of a terminal. Accordingly, registration frame 2702 includes information instructing a terminal to transmit terminal-specific information. The terminal-specific information is, for example, information that indicates the type, model number, serial number, or ID of the terminal.

Accordingly, as illustrated in FIG. 27, terminal #1 labeled 1001 receives registration frame 2701 and transmits frame 2711. Note that frame 2711 includes the terminal-specific information (for example, information that indicates the type, model number, serial number, or ID of the terminal) for terminal #1 labeled 1001, and a modulated signal including this information is transmitted by terminal #1 labeled 1001 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2711 and obtains information related to terminal #1 labeled 1001, and then communication device 1103 obtains this information via controller 1102.

Similarly, as illustrated in FIG. 27, terminal #2 labeled 1002 receives registration frame 2702 and transmits frame 2712. Note that frame 2712 includes the terminal-specific information (for example, information that indicates the type, model number, serial number, or ID of the terminal) for terminal #2 labeled 1002, and a modulated signal including this information is transmitted by terminal #2 labeled 1002 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2712 and obtains information related to terminal #2 labeled 1002, and then communication device 1103 obtains this information via controller 1102.

As illustrated in FIG. 27, terminal #3 labeled 1003 receives registration frame 2702 and transmits frame 2713. Note that frame 2713 includes the terminal-specific information (for example, information that indicates the type, model number, serial number, or ID of the terminal) for terminal #3 labeled 1003, and a modulated signal including this information is transmitted by terminal #3 labeled 1003 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2713 and obtains information related to terminal #3 labeled 1003, and then communication device 1103 obtains this information via controller 1102.

As illustrated in FIG. 27, terminal #4 labeled 1004 receives registration frame 2702 and transmits frame 2714. Note that frame 2714 includes the terminal-specific information (for example, information that indicates the type, model number, serial number, or ID of the terminal) for terminal #4 labeled 1004, and a modulated signal including this information is transmitted by terminal #4 labeled 1004 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2714 and obtains information related to terminal #4 labeled 1004, and then communication device 1103 obtains this information via controller 1102.

As illustrated in FIG. 27, terminal #5 labeled 1005 receives registration frame 2702 and transmits frame 2715. Note that frame 2715 includes the terminal-specific information (for example, information that indicates the type, model number, serial number, or ID of the terminal) for terminal #5 labeled 1005, and a modulated signal including this information is transmitted by terminal #5 labeled 1005 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2715 and obtains information related to terminal #5 labeled 1005, and then communication device 1103 obtains this information via controller 1102.

As illustrated in FIG. 27, terminal #6 labeled 1006 receives registration frame 2702 and transmits frame 2716. Note that frame 2716 includes the terminal-specific information (for example, information that indicates the type, model number, serial number, or ID of the terminal) for terminal #6 labeled 1006, and a modulated signal including this information is transmitted by terminal #6 labeled 1006 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2716 and obtains information related to terminal #6 labeled 1006, and then communication device 1103 obtains this information via controller 1102.

Although communication device 1103 is exemplified as transmitting wake-up frame 2701 in FIG. 27, communication device 1103 need not transmit wake-up frame 2701. In such cases, when there are a plurality of terminals, terminals that are awake receive registration frame 2702 via controller 1102 and a gateway, and transmit a frame that serves as a response.

Next, communication between communication device 1103 and the server will be described.

As illustrated in FIG. 26, communication device 1103 receives a frame transmitted by each terminal via a gateway and controller 1102. Communication device 1103 performs processing such as demodulation on the frames, and obtains terminal-specific information for each terminal (for example, information that indicates the type, model number, serial number, or ID of the terminal).

Hereinafter, an example of operations performed after communication device 1103 receives, via a gateway and controller 1102, frame 2711 transmitted by terminal #1 labeled 1001, demodulates frame 2711, and obtains the terminal-specific information for terminal #1 labeled 1001 (for example, information that indicates the type, model number, serial number, or ID of the terminal) will be described.

FIG. 21 illustrates one example of a configuration of communication device 1103. FIG. 22 illustrates one example of a configuration of a server, which is one communication partner of communication device 1103.

Transceiver device #A labeled 2105 receives an input of reception signal 2102 received by antenna 2101, performs processing such as demodulation and error correction decoding, and obtains reception data 2106. Note that reception signal 2102 corresponds to the modulated signal transmitted by controller 1102 illustrated in FIG. 26.

Generator 2108 of data based on terminal-specific information receives an input of reception data 2106, extracts terminal-specific information included in reception data 2106, and outputs terminal-specific information 2109 (for example, information that indicates the type, model number, serial number, or ID of the terminal). For example, when reception data 2106 is obtained by receiving, via a gateway and controller 1102, a modulated signal transmitted by terminal #1 labeled 1001, terminal-specific information 2109 is the terminal-specific information for terminal #1 labeled 1001.

Transceiver device #B labeled 2111 receives inputs of data 2110 and terminal-specific information 2109, for example, generates a modulated signal based on this data, and outputs the result as transmission signal 2112. Note that the communication partner of transceiver device #B labeled 2111 is the server. In the example illustrated in FIG. 26, transceiver device #B labeled 2111 communicates with the server via network 1104.

Accordingly, reception device 2202 included in the server and illustrated in FIG. 22 receives an input of reception signal 2201 corresponding to modulated signal 2112, performs processing such as demodulation and error correction decoding on reception signal 2201, and outputs reception data 2203.

Storage 2204 receives an input of reception data 2203, and extracts and stores the terminal-specific information included in reception data 2203.

For example, when communication device 1103 is communicating with terminal #1 labeled 1001 via controller 1102 and a gateway, reception data 2203 includes the terminal-specific information for terminal #1 labeled 1001, and thus storage 2204 stores the terminal-specific information for terminal #1 labeled 1001.

Similarly, when communication device 1103 is communicating with terminal #2 labeled 1002 via controller 1102 and a gateway, reception data 2203 includes the terminal-specific information for terminal #2 labeled 1002, and thus storage 2204 stores the terminal-specific information for terminal #2 labeled 1002.

When communication device 1103 is communicating with terminal #6 labeled 1006 via controller 1102 and a gateway, reception data 2203 includes the terminal-specific information for terminal #6 labeled 1006, and thus storage 2204 stores the terminal-specific information for terminal #6 labeled 1006.

Accordingly, once the server completes the reception of frame 2711 transmitted by terminal #1 labeled 1001, the reception of frame 2712 transmitted by terminal #2 labeled 1002, the reception of frame 2713 transmitted by terminal #3 labeled 1003, the reception of frame 2714 transmitted by terminal #4 labeled 1004, the reception of frame 2715 transmitted by terminal #5 labeled 1005, and the reception of frame 2716 transmitted by terminal #6 labeled 1006, the terminal-specific information for terminal #1 labeled 1001, the terminal-specific information for terminal #2 labeled 1002, the terminal-specific information for terminal #3 labeled 1003, the terminal-specific information for terminal #4 labeled 1004, the terminal-specific information for terminal #5 labeled 1005, and the terminal-specific information for terminal #6 labeled 1006 are stored in storage 2204.

Transmission device 2207 receives an input of data 2206. In this example, data 2206 includes software data for executing an operation of device operation function 210 or updated software data for executing an operation of device operation function 210. In this example, this software data includes information indicating devices that are eligible for this software.

Storage 2204 receives an input of software data for executing an operation of device operation function 210 or updated software data for executing an operation of device operation function 210, which is included in data 2206, extracts the information indicating devices that are eligible for the software, which is included in this software data, and compares this information indicating devices that are eligible for the software with the terminal-specific information for terminal #1 labeled 1001, the terminal-specific information for terminal #2 labeled 1002, the terminal-specific information for terminal #3 labeled 1003, the terminal-specific information for terminal #4 labeled 1004, the terminal-specific information for terminal #5 labeled 1005, and the terminal-specific information for terminal #6 labeled 1006.

In this example, the information indicating devices that are eligible for the software indicates each of terminal #1 labeled 1001, terminal #2 labeled 1002, terminal #3 labeled 1003, terminal #4 labeled 1004, terminal #5 labeled 1005, and terminal #6 labeled 1006 as being eligible devices. Thus, storage 2204 outputs control signal 2205 indicating "eligible".

Transmission device 2207 receives inputs of control signal 2205 and data 2206, and when control signal 2205 indicates "eligible", performs processing such as error correction encoding on data included in the software data for executing an operation of device operation function 210 or updated software data for executing an operation of device operation function 210, which is included in data 2206, and outputs transmission signal 2208. Note that transmission signal 2208 may include information indicating the destination address of terminal in the transmission of the modulated signal by communication device 1103.

Communication device 1103 then receives transmission signal 2208 via network 1104, performs processing such as demodulation and error correction decoding to obtain the software data for executing an operation of device operation function 210 or the updated software data for executing an operation of device operation function 210, generates a modulated signal including this data, and transmits the generated modulated signal to controller 1102, whereby the modulated signal reaches the destination terminal via a gateway.

On the other hand, when information indicating devices that are eligible for the software indicates that none of terminal #1 labeled 1001, terminal #2 labeled 1002, terminal #3 labeled 1003, terminal #4 labeled 1004, terminal #5 labeled 1005, and terminal #6 labeled 1006 are eligible, storage 2204 outputs control signal 2205 indicating "not eligible".

Transmission device 2207 then receives inputs of control signal 2205 and data 2206, and when control signal 2205 indicates "not eligible", transmission device 2207 does not output transmission signal 2208.

An example of the above operations will be given with reference to FIG. 28. For example, a case in which communication device 1103 transmits, to terminal #1 labeled 1001 via controller 1102 and a gateway, software data for executing an operation of device operation function 210 or updated software data for executing an operation of device operation function 210 will be described.

Figure 28:
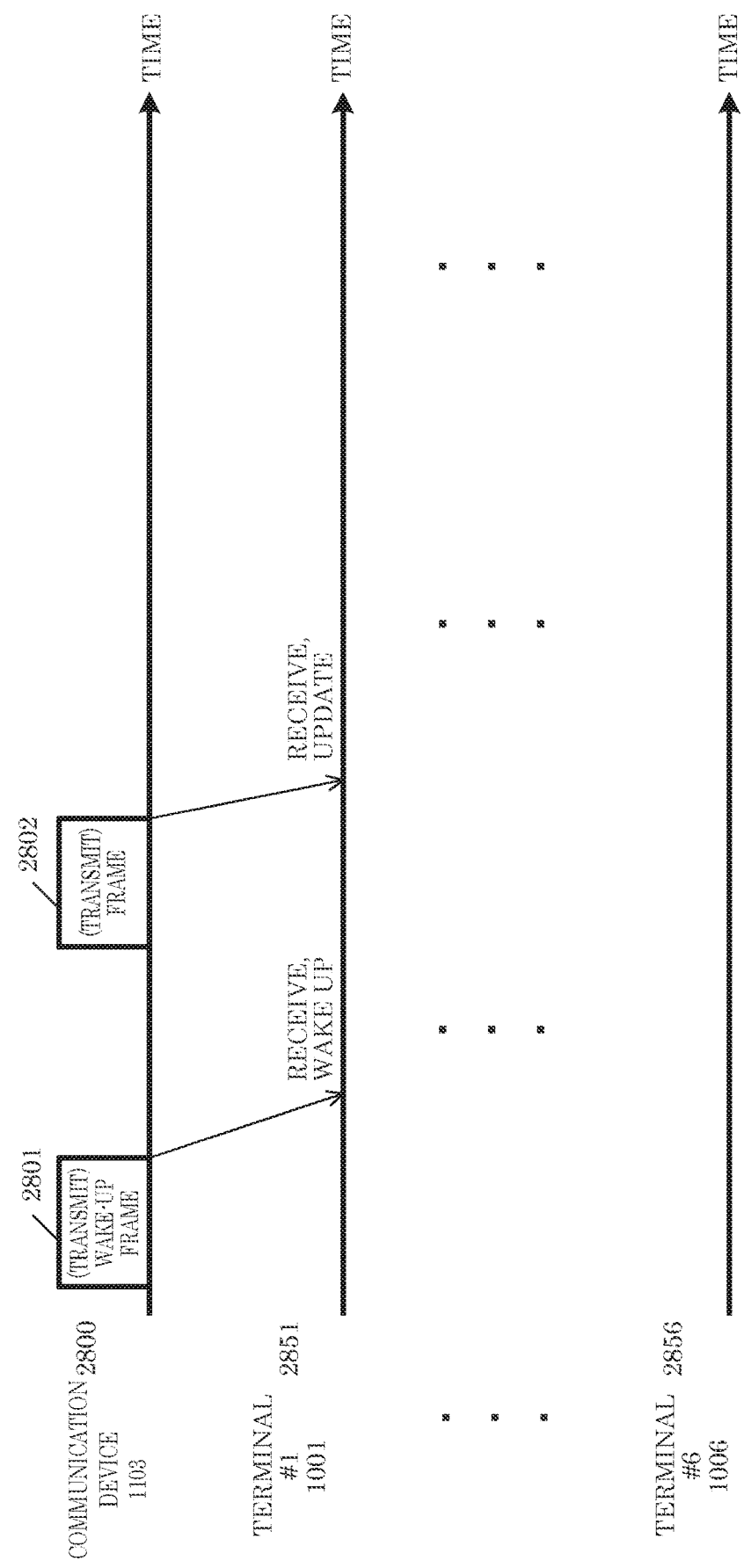
FIG. 28 illustrates one example of operations.

In FIG. 28, 2800 is an example of communication by communication device 1103, relative to the time axis.

2851 is an example of communication by first transceiver device 205 included in terminal #1 labeled 1001, relative to the time axis.

2852 is an example of communication by first transceiver device 205 included in terminal #2 labeled 1002, relative to the time axis.

2853 is an example of communication by first transceiver device 205 included in terminal #3 labeled 1003, relative to the time axis.

2854 is an example of communication by first transceiver device 205 included in terminal #4 labeled 1004, relative to the time axis.

2855 is an example of communication by first transceiver device 205 included in terminal #5 labeled 1005, relative to the time axis.

2856 is an example of communication by first transceiver device 205 included in terminal #6 labeled 1006, relative to the time axis.

A modulated signal including software data for executing an operation of device operation function 210 or updated software data for executing an operation of device operation function 210 reaches communication device 1103 from the server, which is the communication partner of communication device 1103, via network 1104. Here, terminal #1 labeled 1001 is eligible for this software. Here, in order to transmit the software data for executing an operation of device operation function 210 or updated software data for executing an operation of device operation function 210 to terminal #1 labeled 1001, communication device 1103 transmits wake-up frame 2301 to terminal #1 labeled 1001 via controller 1102 and a gateway.

Terminal #1 labeled 1001 receives wake-up frame 2801 via controller 1102 and a gateway, and wakes up.

Communication device 1103 then transmits frame 2802. Frame 2802 includes software data for executing an operation of device operation function 210 or updated software data for executing an operation of device operation function 210. Here, terminal #1 labeled 1001 is eligible for this software.

Terminal #1 labeled 1001 then receives frame 2802 via controller 1102 and a gateway. Terminal #1 labeled 1001 then updates its software using the software data for executing an operation of device operation function 210 or updated software data for executing an operation of device operation function 210 that is included in frame 2802. Note that an example of operations performed up to the obtaining of this software has already been described.

Although communication device 1103 is exemplified as transmitting wake-up frame 2801 in FIG. 28, communication device 1103 need not transmit wake-up frame 2801.

In the present embodiment, instead of software data for executing an operation of device operation function 210 or updated software data for executing an operation of device operation function 210, data indicating an access destination to download software data for executing an operation of device operation function 210 or updated software data for executing an operation of device operation function 210 (for example, an address or uniform resource locator (URL) of a web page or server) may be used in the implementation of the present embodiment.

In such cases, terminal #1 labeled 1001 obtains information indicating an access destination to download software data for executing an operation of device operation function 210 or updated software data for executing an operation of device operation function 210, accesses the access destination, obtains the software data for executing an operation of device operation function 210 or the updated software data for executing an operation of device operation function 210, and updates its software. Note that terminal #1 labeled 1001 may access base station #A labeled 100_1 and/or base station #B labeled 100_2 in FIG. 29 in order to obtain information indicating an access destination to download software data for executing an operation of device operation function 210 or updated software data for executing an operation of device operation function 210, access the access destination, and obtain the software data for executing an operation of device operation function 210 or the updated software data for executing an operation of device operation function 210 (in such cases, terminal #1 labeled 1001 obtains the software from base station #A labeled 100_1 and/or base station #B labeled 100_2 in FIG. 28). Note that FIG. 29 will be described later.

As described above, terminal-specific information for the terminal that is a communication partner of communication device 1103 via the controller and a gateway, is provided to communication device 1103 and the server that is a communication partner of communication device 1103, and as a result of the server and communication device 1103 controlling the provision of software based on this information, the advantageous effect that wireless resources can be efficiently utilized can be achieved since terminal software can be updated precisely and the transmission of software information can be favorably controlled.

Although the devices in the present embodiment are named "communication device", "terminal", and "server", the names of these devices are not limited to these examples.

Embodiment 6

In the present embodiment, a variation of Embodiment 5 will be described.

Figure 29:
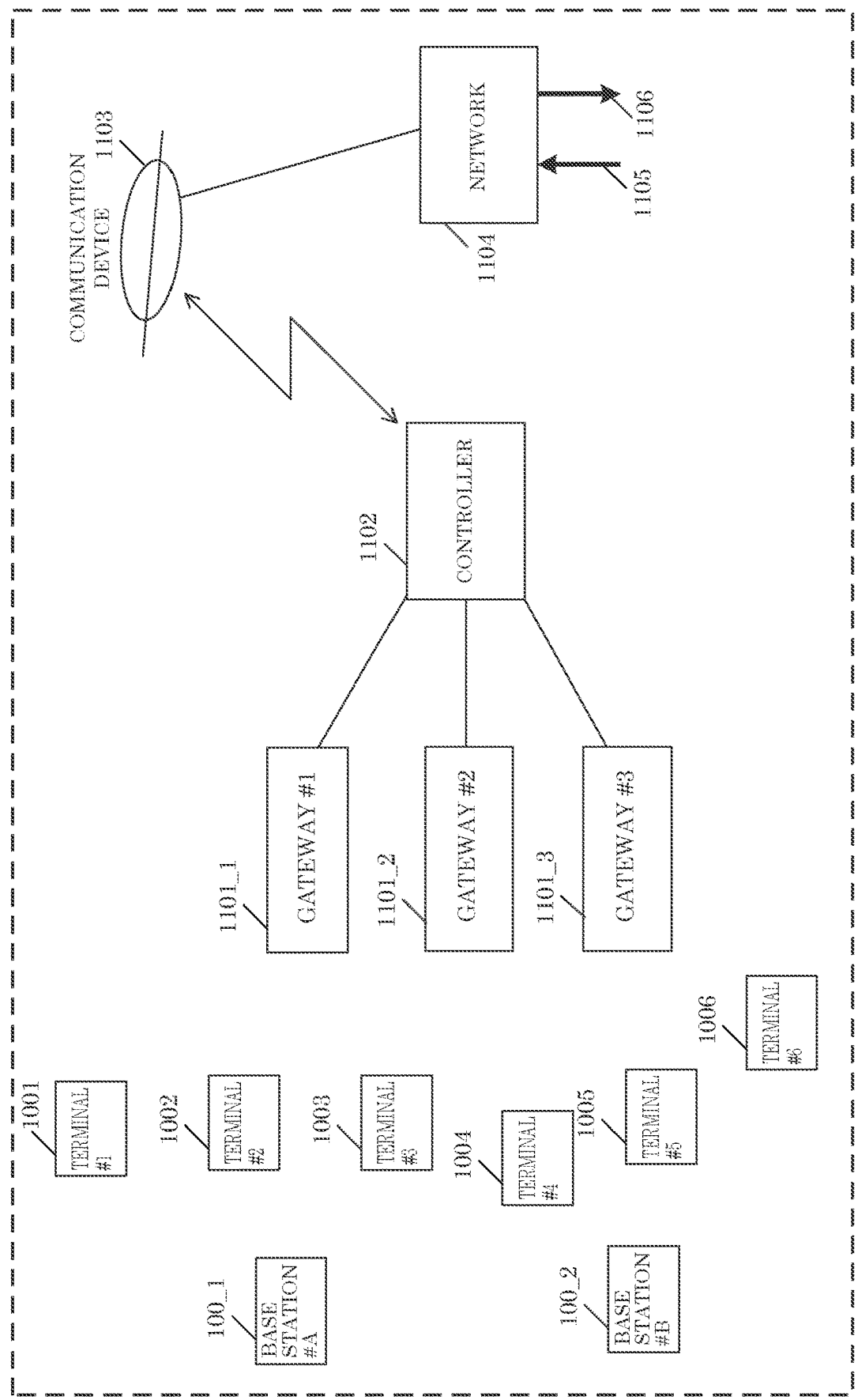
FIG. 29 illustrates one example of a configuration of a communication system.

FIG. 29 illustrates one example of a configuration of a communication system according to the present embodiment. Note that in FIG. 29, elements that operate the same as in FIG. 1, FIG. 10, and FIG. 11 share like reference signs.

Terminal #1 labeled 1001 communicates with a gateway using the first communication scheme. As operations have already been described in detail in Embodiment 2, repeated description will be omitted.

Similarly, terminal #2 labeled 1002 communicates with a gateway using the first communication scheme.

Terminal #3 labeled 1003 communicates with a gateway using the first communication scheme.

Terminal #4 labeled 1004 communicates with a gateway using the first communication scheme.

Terminal #5 labeled 1005 communicates with a gateway using the first communication scheme.

Terminal #6 labeled 1006 communicates with a gateway using the first communication scheme.

Gateway #1 labeled 1101_1 communicates with controller 1102, gateway #2 labeled 1101_2 communicates with controller 1102, and gateway #3 labeled 1101_3 communicates with controller 1102. As operations have already been described in detail in Embodiment 2, repeated description will be omitted.

Controller 1102 communicates with communication device 1103. As operations have already been described in detail in Embodiment 2, repeated description will be omitted.

For example, communication device 1103 is communicating with a server via network 1104.

Terminal #1 labeled 1001 communicates with base station #A labeled 100_1 using the second communication scheme. This has already been described in Embodiment 1 and Embodiment 2.

Similarly, terminal #2 labeled 1002 communicates with base station #A labeled 100_1 using the second communication scheme.

Terminal #3 labeled 1003 communicates with base station #A labeled 100_1 using the second communication scheme.

Terminal #4 labeled 1004 communicates with base station #A labeled 100_1 using the second communication scheme.

Terminal #5 labeled 1005 communicates with base station #A labeled 100_1 using the second communication scheme.

Terminal #6 labeled 1006 communicates with base station #A labeled 100_1 using the second communication scheme.

Terminal #1 labeled 1001 communicates with base station #B labeled 100_2 using the third communication scheme. This has already been described in Embodiment 1 and Embodiment 2.

Similarly, terminal #2 labeled 1002 communicates with base station #B labeled 100_2 using the third communication scheme.

Terminal #3 labeled 1003 communicates with base station #B labeled 100_2 using the third communication scheme.

Terminal #4 labeled 1004 communicates with base station #B labeled 100_2 using the third communication scheme.

Terminal #5 labeled 1005 communicates with base station #B labeled 100_2 using the third communication scheme.

Terminal #6 labeled 1006 communicates with base station #B labeled 100_2 using the third communication scheme.

FIG. 2 illustrates one example of a configuration of any one of terminal #1 labeled 1001, terminal #2 labeled 1002, terminal #3 labeled 1003, terminal #4 labeled 1004, terminal #5 labeled 1005, and terminal #6 labeled 1006 illustrated in FIG. 29. As operations have already been described in detail in Embodiment 1 and Embodiment 2, repeated description will be omitted. Note that when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the first communication scheme, these terminals do not include parts related to first transceiver device 205. Moreover, when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the second communication scheme, these terminals do not include parts related to second transceiver device 215. Similarly, when terminal #1 labeled 1001, terminal #2 labeled 1002, terminal #3 labeled 1003, terminal #4 labeled 1004, terminal #5 labeled 1005, and terminal #6 labeled 1006 do not support transmission and reception via the third communication scheme, these terminals do not include parts related to third transceiver device 225.

FIG. 27 illustrates one example of the flow of communication, relative to the time axis, between communication device 1103, terminal #1 labeled 1001, terminal #2 labeled 1002, terminal #3 labeled 1003, terminal #4 labeled 1004, terminal #5 labeled 1005, and terminal #6 labeled 1006 illustrated in FIG. 29. Time is represented on the horizontal axis in FIG. 27.

2700 in FIG. 27 indicates an example of communication by communication device 1103, relative to the time axis.

2751 is an example of communication by first transceiver device 205 included in terminal #1 labeled 1001, relative to the time axis.

2752 is an example of communication by first transceiver device 205 included in terminal #2 labeled 1002, relative to the time axis.

2753 is an example of communication by first transceiver device 205 included in terminal #3 labeled 1003, relative to the time axis.

2754 is an example of communication by first transceiver device 205 included in terminal #4 labeled 1004, relative to the time axis.

2755 is an example of communication by first transceiver device 205 included in terminal #5 labeled 1005, relative to the time axis.

2756 is an example of communication by first transceiver device 205 included in terminal #6 labeled 1006, relative to the time axis.

Note that in FIG. 27, illustration of the communication indicated by 2752, 2753, 2754, and 2755 is omitted.

As illustrated in FIG. 27, first, communication device 1103 transmits wake-up frame 2701. Here, in this example, wake-up frame 2701 includes information indicating to wake up terminal #1 labeled 1001, wake up terminal #2 labeled 1002, wake up terminal #3 labeled 1003, wake up terminal #4 labeled 1004, wake up terminal #5 labeled 1005, and wake up terminal #6 labeled 1006. Communication device 1103 transmits wake-up frame 2701 to terminal #1 labeled 1001, terminal #2 labeled 1002, terminal #3 labeled 1003, terminal #4 labeled 1004, terminal #5 labeled 1005, and terminal #6 labeled 1006 via controller 1102 and gateway #1 labeled 1101_1 or gateway #2 labeled 1101_2 or gateway #3 labeled 1101_3. Moreover, as described in Embodiment 1 and Embodiment 2, wake-up frame 2701 may be multicast (and may be unicast).

First transceiver device 205 included in terminal #1 labeled 1001 then receives wake-up frame 2701. First transceiver device 205 included in terminal #1 labeled 1001 then performs processing such as demodulation on wake-up frame 2701, thereby obtaining the information indicating to wake up terminal #1 labeled 1001. Accordingly, in FIG. 27, terminal #1 labeled 1001 wakes up.

First transceiver device 205 included in terminal #2 labeled 1002 then receives wake-up frame 2701. First transceiver device 205 included in terminal #2 labeled 1002 then performs processing such as demodulation on wake-up frame 2701, thereby obtaining the information indicating to wake up terminal #2 labeled 1002. Accordingly, in FIG. 27, terminal #2 labeled 1002 wakes up.

First transceiver device 205 included in terminal #3 labeled 1003 receives wake-up frame 2701. First transceiver device 205 included in terminal #3 labeled 1003 then performs processing such as demodulation on wake-up frame 2701, thereby obtaining the information indicating to wake up terminal #3 labeled 1003. Accordingly, in FIG. 27, terminal #3 labeled 1003 wakes up.

First transceiver device 205 included in terminal #4 labeled 1004 receives wake-up frame 2701. First transceiver device 205 included in terminal #4 labeled 1004 then performs processing such as demodulation on wake-up frame 2701, thereby obtaining the information indicating to wake up terminal #4 labeled 1004. Accordingly, in FIG. 27, terminal #4 labeled 1004 wakes up.

First transceiver device 205 included in terminal #5 labeled 1005 receives wake-up frame 2701. First transceiver device 205 included in terminal #5 labeled 1005 then performs processing such as demodulation on wake-up frame 2701, thereby obtaining the information indicating to wake up terminal #5 labeled 1005. Accordingly, in FIG. 27, terminal #5 labeled 1005 wakes up.

First transceiver device 205 included in terminal #6 labeled 1006 receives wake-up frame 2701. First transceiver device 205 included in terminal #6 labeled 1006 then performs processing such as demodulation on wake-up frame 2701, thereby obtaining the information indicating to wake up terminal #6 labeled 1006. Accordingly, in FIG. 27, terminal #6 labeled 1006 wakes up.

Although terminal #1 labeled 1001, terminal #2 labeled 1002, terminal #3 labeled 1003, terminal #4 labeled 1004, terminal #5 labeled 1005, and terminal #6 labeled 1006 are each exemplified as including first transceiver device 205 in FIG. 27, among terminal #1 labeled 1001, terminal #2 labeled 1002, terminal #3 labeled 1003, terminal #4 labeled 1004, terminal #5 labeled 1005, and terminal #6 labeled 1006, there may be a terminal that does not include first transceiver device 205. In such cases, such a terminal does not wake up.

Next, as illustrated in FIG. 27, communication device 1103 transmits registration frame 2702. Communication device 1103 transmits registration frame 2702 to terminal #1 labeled 1001, terminal #2 labeled 1002, terminal #3 labeled 1003, terminal #4 labeled 1004, terminal #5 labeled 1005, and terminal #6 labeled 1006 via controller 1102 and gateway #1 labeled 1101_1 or gateway #2 labeled 1101_2 or gateway #3 labeled 1101_3. Moreover, as described in Embodiment 1 and Embodiment 2, registration frame 2702 may be multicast (and may be unicast). Next, registration frame 2702 will be described in greater detail.

Communication device 1103 illustrated in FIG. 29 is connected to a server via network 1104. The server or a device that communicates with the server transmits a modulated signal including software data for executing an operation of device operation function 210 or (a modulated signal including) updated software data for executing an operation of device operation function 210 to communication device 1103. The modulated signal including the software data is then transmitted to base station #A labeled 100_1 or base station #B labeled 100_2 by communication device 1103 (note that software is merely one example; what is included in the modulated signal may be information other than software).

Here, when communication device 1103 and the server know which terminals are capable of communicating with communication device 1103, this is advantageous as information such as software can be provided with certainty. When controller 1102 also knows which terminals are capable of communicating with communication device 1103, this is advantageous as information such as software can be provided with certainty.

Registration frame 2702 is a frame for knowing the status of a terminal. Accordingly, registration frame 2702 includes information instructing a terminal to transmit terminal-specific information. The terminal-specific information is, for example, information that indicates the type, model number, serial number, or ID of the terminal.

Accordingly, as illustrated in FIG. 27, terminal #1 labeled 1001 receives registration frame 2701 and transmits frame 2711. Note that frame 2711 includes the terminal-specific information (for example, information that indicates the type, model number, serial number, or ID of the terminal) for terminal #1 labeled 1001, and a modulated signal including this information is transmitted by terminal #1 labeled 1001 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2711 and obtains information related to terminal #1 labeled 1001, and then communication device 1103 obtains this information via controller 1102.

Similarly, as illustrated in FIG. 27, terminal #2 labeled 1002 receives registration frame 2702 and transmits frame 2712. Note that frame 2712 includes the terminal-specific information (for example, information that indicates the type, model number, serial number, or ID of the terminal) for terminal #2 labeled 1002, and a modulated signal including this information is transmitted by terminal #2 labeled 1002 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2712 and obtains information related to terminal #2 labeled 1002, and then communication device 1103 obtains this information via controller 1102.

As illustrated in FIG. 27, terminal #3 labeled 1003 receives registration frame 2702 and transmits frame 2713. Note that frame 2713 includes the terminal-specific information (for example, information that indicates the type, model number, serial number, or ID of the terminal) for terminal #3 labeled 1003, and a modulated signal including this information is transmitted by terminal #3 labeled 1003 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2713 and obtains information related to terminal #3 labeled 1003, and then communication device 1103 obtains this information via controller 1102.

As illustrated in FIG. 27, terminal #4 labeled 1004 receives registration frame 2702 and transmits frame 2714. Note that frame 2714 includes the terminal-specific information (for example, information that indicates the type, model number, serial number, or ID of the terminal) for terminal #4 labeled 1004, and a modulated signal including this information is transmitted by terminal #4 labeled 1004 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2714 and obtains information related to terminal #4 labeled 1004, and then communication device 1103 obtains this information via controller 1102.

As illustrated in FIG. 27, terminal #5 labeled 1005 receives registration frame 2702 and transmits frame 2715. Note that frame 2715 includes the terminal-specific information (for example, information that indicates the type, model number, serial number, or ID of the terminal) for terminal #5 labeled 1005, and a modulated signal including this information is transmitted by terminal #5 labeled 1005 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2715 and obtains information related to terminal #5 labeled 1005, and then communication device 1103 obtains this information via controller 1102.

As illustrated in FIG. 27, terminal #6 labeled 1006 receives registration frame 2702 and transmits frame 2716. Note that frame 2716 includes the terminal-specific information (for example, information that indicates the type, model number, serial number, or ID of the terminal) for terminal #6 labeled 1006, and a modulated signal including this information is transmitted by terminal #6 labeled 1006 (in one example, this modulated signal is a modulated signal conforming to the first communication scheme). Then, as illustrated in FIG. 26, any one of gateway #1 labeled 1101_1, gateway #2 labeled 1101_2, and gateway #3 labeled 1101_3 receives frame 2716 and obtains information related to terminal #6 labeled 1006, and then communication device 1103 obtains this information via controller 1102.

Although communication device 1103 is exemplified as transmitting wake-up frame 2701 in FIG. 27, communication device 1103 need not transmit wake-up frame 2701. In such cases, when there are a plurality of terminals, terminals that are awake receive registration frame 2702 via controller 1102 and a gateway, and transmit a frame that serves as a response.

Next, communication between communication device 1103 and the server will be described.

As illustrated in FIG. 29, communication device 1103 receives a frame transmitted by each terminal via a gateway and controller 1102. Communication device 1103 performs processing such as demodulation on the frames, and obtains terminal-specific information for each terminal (for example, information that indicates the type, model number, serial number, or ID of the terminal).

Hereinafter, an example of operations performed after communication device 1103 receives, via a gateway and controller 1102, frame 2711 transmitted by terminal #1 labeled 1001, demodulates frame 2711, and obtains the terminal-specific information for terminal #1 labeled 1001 (for example, information that indicates the type, model number, serial number, or ID of the terminal) will be described.

FIG. 21 illustrates one example of a configuration of communication device 1103. FIG. 22 illustrates one example of a configuration of a server, which is one communication partner of communication device 1103.

Transceiver device #A labeled 2105 receives an input of reception signal 2102 received by antenna 2101, performs processing such as demodulation and error correction decoding, and obtains reception data 2106. Note that reception signal 2102 corresponds to the modulated signal transmitted by controller 1102 illustrated in FIG. 28.

Generator 2108 of data based on terminal-specific information receives an input of reception data 2106, extracts terminal-specific information included in reception data 2106, and outputs terminal-specific information 2109 (for example, information that indicates the type, model number, serial number, or ID of the terminal). For example, when reception data 2106 is obtained by receiving, via a gateway and controller 1102, a modulated signal transmitted by terminal #1 labeled 1001, terminal-specific information 2109 is the terminal-specific information for terminal #1 labeled 1001.

Transceiver device #B labeled 2111 receives inputs of data 2110 and terminal-specific information 2109, for example, generates a modulated signal based on this data, and outputs the result as transmission signal 2112. Note that the communication partner of transceiver device #B labeled 2111 is the server. In the example illustrated in FIG. 28, transceiver device #B labeled 2111 communicates with the server via network 1104.

Accordingly, reception device 2202 included in the server and illustrated in FIG. 22 receives an input of reception signal 2201 corresponding to modulated signal 2112, performs processing such as demodulation and error correction decoding on reception signal 2201, and outputs reception data 2203.

Storage 2204 receives an input of reception data 2203, and extracts and stores the terminal-specific information included in reception data 2203.

For example, when communication device 1103 is communicating with terminal #1 labeled 1001 via controller 1102 and a gateway, reception data 2203 includes the terminal-specific information for terminal #1 labeled 1001, and thus storage 2204 stores the terminal-specific information for terminal #1 labeled 1001.

Similarly, when communication device 1103 is communicating with terminal #2 labeled 1002 via controller 1102 and a gateway, reception data 2203 includes the terminal-specific information for terminal #2 labeled 1002, and thus storage 2204 stores the terminal-specific information for terminal #2 labeled 1002.

When communication device 1103 is communicating with terminal #6 labeled 1006 via controller 1102 and a gateway, reception data 2203 includes the terminal-specific information for terminal #6 labeled 1006, and thus storage 2204 stores the terminal-specific information for terminal #6 labeled 1006.

Accordingly, once the server completes the reception of frame 2711 transmitted by terminal #1 labeled 1001, the reception of frame 2712 transmitted by terminal #2 labeled 1002, the reception of frame 2713 transmitted by terminal #3 labeled 1003, the reception of frame 2714 transmitted by terminal #4 labeled 1004, the reception of frame 2715 transmitted by terminal #5 labeled 1005, and the reception of frame 2716 transmitted by terminal #6 labeled 1006, the terminal-specific information for terminal #1 labeled 1001, the terminal-specific information for terminal #2 labeled 1002, the terminal-specific information for terminal #3 labeled 1003, the terminal-specific information for terminal #4 labeled 1004, the terminal-specific information for terminal #5 labeled 1005, and the terminal-specific information for terminal #6 labeled 1006 are stored in storage 2204.

Transmission device 2207 receives an input of data 2206. In this example, data 2206 includes software data for executing an operation of device operation function 210 or updated software data for executing an operation of device operation function 210. In this example, this software data includes information indicating devices that are eligible for this software.

Storage 2204 receives an input of software data for executing an operation of device operation function 210 or updated software data for executing an operation of device operation function 210, which is included in data 2206, extracts the information indicating devices that are eligible for the software, which is included in this software data, and compares this information indicating devices that are eligible for the software with the terminal-specific information for terminal #1 labeled 1001, the terminal-specific information for terminal #2 labeled 1002, the terminal-specific information for terminal #3 labeled 1003, the terminal-specific information for terminal #4 labeled 1004, the terminal-specific information for terminal #5 labeled 1005, and the terminal-specific information for terminal #6 labeled 1006.

In this example, the information indicating devices that are eligible for the software indicates each of terminal #1 labeled 1001, terminal #2 labeled 1002, terminal #3 labeled 1003, terminal #4 labeled 1004, terminal #5 labeled 1005, and terminal #6 labeled 1006 as being eligible devices. Thus, storage 2204 outputs control signal 2205 indicating "eligible".

When the information indicating devices that are eligible for the software indicates each of terminal #1 labeled 1001, terminal #2 labeled 1002, terminal #3 labeled 1003, terminal #4 labeled 1004, terminal #5 labeled 1005, and terminal #6 labeled 1006 as being eligible devices, storage 2204 outputs control signal 2205 including information indicating communication schemes that eligible terminals support.

Transmission device 2207 receives inputs of control signal 2205 and data 2206, and when control signal 2205 indicates "eligible", performs processing such as error correction encoding on data included in the software data for executing an operation of device operation function 210 or updated software data for executing an operation of device operation function 210, which is included in data 2206, and outputs transmission signal 2208. Note that the destination of transmission signal 2208 is a communication device that is capable of communication via a communication scheme supported by terminals eligible for the software as indicated in the information indicating the communication schemes that the eligible terminals support. In the present embodiment, the destination communication device is base station #A labeled 100_1 or base station #B labeled 100_2 illustrated in FIG. 29.

Base station #A labeled 100_1 or base station #B labeled 100_2 illustrated in FIG. 29 receives transmission signal 2208, performs processing such as demodulation and error correction decoding to obtain software data for executing an operation of device operation function 210 or updated software data for executing an operation of device operation function 210, generates a modulated signal including this data, and transmits the generated modulated signal to a destination terminal.

On the other hand, when information indicating devices that are eligible for the software indicates that none of terminal #1 labeled 1001, terminal #2 labeled 1002, terminal #3 labeled 1003, terminal #4 labeled 1004, terminal #5 labeled 1005, and terminal #6 labeled 1006 are eligible, storage 2204 outputs control signal 2205 indicating "not eligible".

Transmission device 2207 then receives inputs of control signal 2205 and data 2206, and when control signal 2205 indicates "not eligible", transmission device 2207 does not output transmission signal 2208.

An example of the above operations will be given with reference to FIG. 30. For example, a case in which base station #A labeled 100_1 illustrated in FIG. 29 transmits, to terminal #1 labeled 1001, software data for executing an operation of device operation function 210 or updated software data for executing an operation of device operation function 210 will be described.

Figure 30:
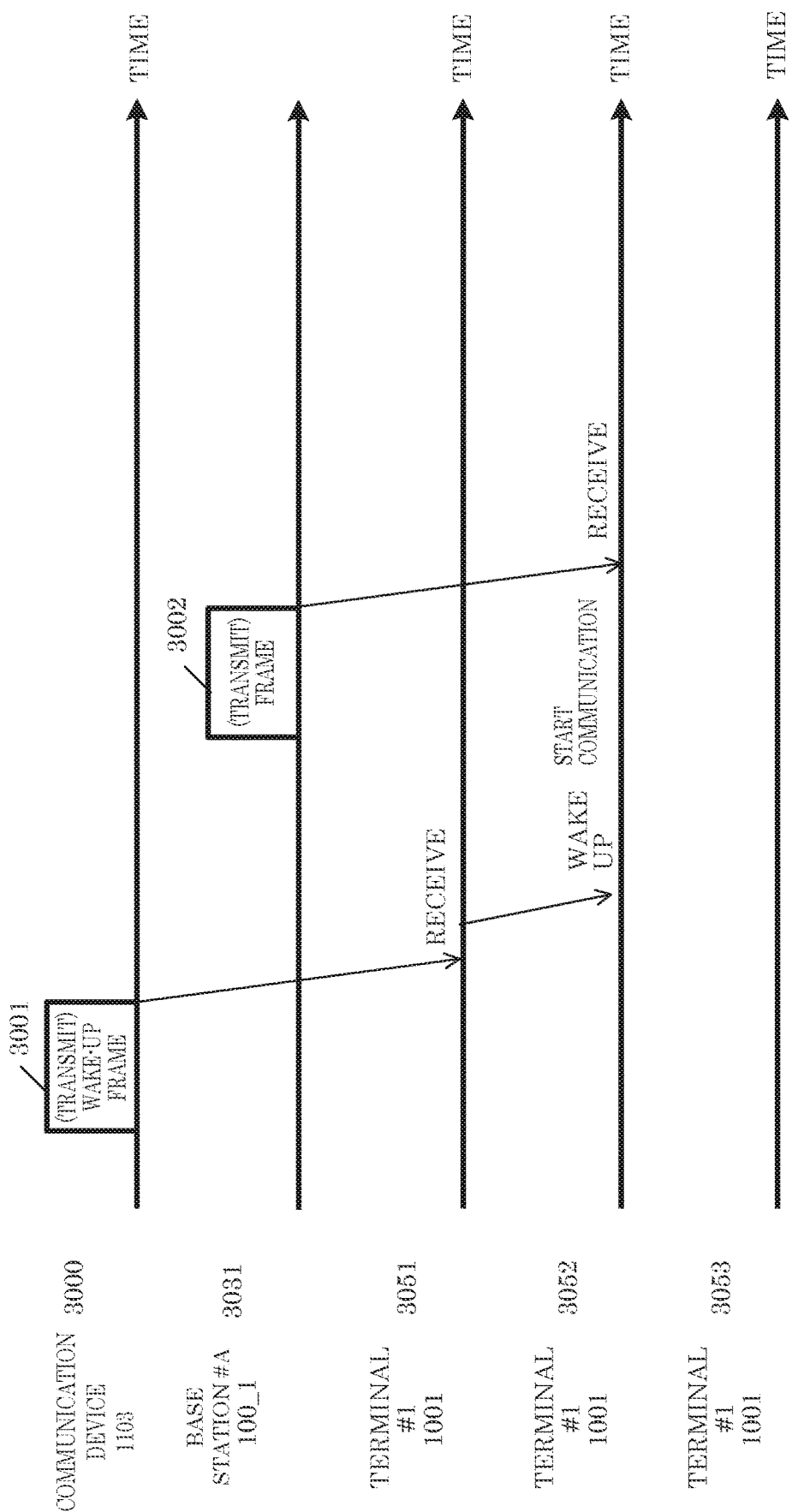
FIG. 30 illustrates one example of operations.

In FIG. 30, 3000 is an example of communication by communication device 1103, relative to the time axis.

3031 is an example of communication by base station #A labeled 100_1, relative to the time axis.

3051 indicates an example of communication by first transceiver device 205 included in terminal #1 labeled 1001, relative to the time axis.

3052 indicates an example of communication by second transceiver device 215 included in terminal #1 labeled 1001, relative to the time axis.

3053 indicates an example of communication by third transceiver device 225 included in terminal #1 labeled 1001, relative to the time axis.

Communication device 1103 transmits wake-up frame 3001 to terminal #1 labeled 1001.

In this example, the server transmits, to base station #A labeled 100_1, a modulated signal including software data for executing an operation of device operation function 210 or updated software data for executing an operation of device operation function 210. Here, terminal #1 labeled 1001 is eligible for this software. Accordingly, base station #A labeled 100_1 obtains the software data for executing an operation of device operation function 210 or updated software data for executing an operation of device operation function 210.

Terminal #1 labeled 1001 (first transceiver device 205 included in terminal #1 labeled 1001) receives wake-up frame 3001 via controller 1102 and a gateway, and wakes up.

Accordingly, base station #A labeled 100_1 transmits frame 3002 including the software data for executing an operation of device operation function 210 or the updated software data for executing an operation of device operation function 210.

Terminal #1 labeled 1001 (second transceiver device 215 included in terminal #1 labeled 1001) then receives frame 3002. Terminal #1 labeled 1001 (second transceiver device 215 included in terminal #1 labeled 1001) then updates its software using the software data for executing an operation of device operation function 210 or updated software data for executing an operation of device operation function 210 that is included in frame 3002. Note that an example of operations performed up to the obtaining of this software has already been described.

Although communication device 1103 is exemplified as transmitting wake-up frame 3001 in FIG. 30, communication device 1103 need not transmit wake-up frame 3001.

In the present embodiment, instead of software data for executing an operation of device operation function 210 or updated software data for executing an operation of device operation function 210, data indicating an access destination to download software data for executing an operation of device operation function 210 or updated software data for executing an operation of device operation function 210 (for example, an address or uniform resource locator (URL) of a web page or server) may be used in the implementation of the present embodiment.

In such cases, terminal #1 labeled 1001 obtains information indicating an access destination to download software data for executing an operation of device operation function 210 or updated software data for executing an operation of device operation function 210, accesses the access destination, obtains the software data for executing an operation of device operation function 210 or the updated software data for executing an operation of device operation function 210, and updates its software. Note that terminal #1 labeled 1001 may access base station #A labeled 100_1 and/or base station #B labeled 100_2 in FIG. 28 in order to obtain information indicating an access destination to download software data for executing an operation of device operation function 210 or updated software data for executing an operation of device operation function 210, access the access destination, and obtain the software data for executing an operation of device operation function 210 or the updated software data for executing an operation of device operation function 210 (in such cases, terminal #1 labeled 1001 obtains the software from base station #A labeled 100_1 and/or base station #B labeled 100_2 in FIG. 28).

As described above, terminal-specific information for the terminal that is a communication partner of communication device 1103 via the controller and a gateway, is provided to communication device 1103 and the server that is a communication partner of communication device 1103, and as a result of the server and communication device 1103 controlling the provision of software based on this information, the advantageous effect that wireless resources can be efficiently utilized can be achieved since terminal software can be updated precisely and the transmission of software information can be favorably controlled.

Although the devices in the present embodiment are named "communication device", "terminal", and "server", the names of these devices are not limited to these examples.

Supplemental Information

As a matter of course, the present disclosure may be carried out by combining the exemplary embodiments with other information such as the information described in the respective supplemental information sections.

The configuration of the terminal is exemplified in FIG. 2 and FIG. 3, but the configuration of the terminal is not limited to these examples. Moreover, the configurations of the antennas of the transceiver devices illustrated in FIG. 2 and FIG. 3 are not limited to the examples illustrated in FIG. 2 and FIG. 3. Each transceiver device may have a configuration including a plurality of transmit antennas and a plurality of receive antennas.

Moreover, the base stations, terminals, and transmission device illustrated in FIG. 1 and FIG. 10 may use a transmission method in which a plurality of modulated signals are transmitted at the same time and same frequency using a plurality of antennas.

In the present specification, the device that includes the communication device and the transceiver device described herein is conceivably a communication/broadcast device, such as a broadcast station, a base station, an access point, a terminal, or a mobile phone, or a communication device such as a television, a radio, a terminal, or a personal computer. Moreover, each of the transceiver device and the communication device described in the present disclosure is conceivably a device that includes a communication function and can be connected via some sort of interface to a device for executing an application, such as a television, a radio, a personal computer, or a mobile phone. Moreover, in the present embodiment, symbols other than data symbols, such as pilot symbols (preamble, unique word, post-amble, reference symbol, etc.) or symbols for control information, may be arranged in any way in a frame. Here, the terms "pilot symbol" and "control information" are used, but the naming of such symbols is not important; the functions that they perform are.

In the present specification, an example is given in which information indicating to wake up communication performed via a specific communication scheme or information indicating to not wake up communication performed via a specific communication scheme is transmitted in information 801 indicating the communication scheme to be woken up that is illustrated in FIG. 8 and FIG. 9 and described in Embodiment 1. Here, "information indicating to not wake up communication performed via a specific communication scheme" may mean that the information related to "waking up" is not valid (i.e., is invalid), and, alternatively, may mean "sleep" or "maintain current state". Additionally, "information indicating to not wake up communication performed via a specific communication scheme" may be information indicating something other than "wake up".

Moreover, information 801 indicating the communication scheme to be woken up that is illustrated in FIG. 8 and FIG. 9 and described in Embodiment 1 may correspond to the first field, and information 902 on terminals subject to the information related to waking up the device operation function that is illustrated in FIG. 9 may correspond to the second field.

Although an example is given in which "communication via a 25 MHz band modulated signal" or "communication via a 50 MHz band modulated signal" is specified in information 801 indicating the communication scheme to be woken up that is illustrated in FIG. 8 and FIG. 9 and described in Embodiment 1, the method of specifying the band is not limited to this example. For example, the method may specify performing the wake-up in 25 MHz units. For example, the method may specific "implement communication using a first channel 25 MHz band" or "implement communication using a second channel 25 MHz band" or "implement communication using a first channel 25 MHz band and communication using a second channel 25 MHz band".

With respect to FIG. 2, the device operation function is described as a function for an operation related to a device such as a home appliance, but more specifically, this includes a function that the device provides to a user. For example, when the device is a television, this includes, for example, a function for receiving radio waves related to a television broadcast and displaying an image or video related to the television broadcast, as well as a function for receiving an input to change the television broadcast channel and changing the television broadcast related to the displayed image or video.

The device operation function in FIG. 2 is not limited to the above examples, and may include a function that downloads software (or a program) for an operation related to the device from a server. The downloaded software is subsequently executed by the device at a suitable point in time in place of the currently running software. Moreover, the device is not limited to a home appliance or vehicle. The device may be a smartphone or a smart speaker.

Waking up device operation function 210 may mean, in addition to waking up all functions included in device operation function 210, waking up one or more of the functions included in device operation function 210. For example, when the device is a television, waking up device operation function 201 may mean waking up only the "function for receiving radio waves related to a television broadcast and displaying an image or video related to the television broadcast" described above. As another example, waking up device operation function 201 may mean waking up only the "function that downloads software for an operation related to the device from a server".

When, like described above, the device (for example, a terminal) includes a plurality of device operation functions (also referred to simply as functions), and the terminal includes a plurality of transceiver devices (see FIG. 2), each transceiving function may be associated with a function to be woken up. Here, the associated transceiving functions may include a transceiving function that receives control signal 209 and a transceiving function that the terminal wakes up using control signal 209.

(1) Example in which a Transceiving Function that Receives Control Signal 209 is Associated with a Function For example, when control signal 209 is received by the first transceiver device, only the function for receiving radio waves related to a television broadcast and displaying an image or video related to the television broadcast may be woken up. Moreover, when control signal 209 is received by the second transceiver device, only the function that downloads software for an operation related to the device from a server may be woken up.

(2) Example in which the Transceiving Function that the Terminal Wakes Up Using Control Signal 209 is Associated with a Device Operation Function For example, when the first transceiver device is the device that is woken up by control signal 209 received by any transceiver device, only the function for receiving radio waves related to a television broadcast and displaying an image or video related to the television broadcast may be woken up. Moreover, when the second transceiver device is the device that is woken up by control signal 209 received by any transceiver device, only the function that downloads software for an operation related to the device (terminal) from a server may be woken up.

Note that the association between the transceiving function that the terminal wakes up and the device operation function consequently woken up is not limited to the above examples.

Figure 35:
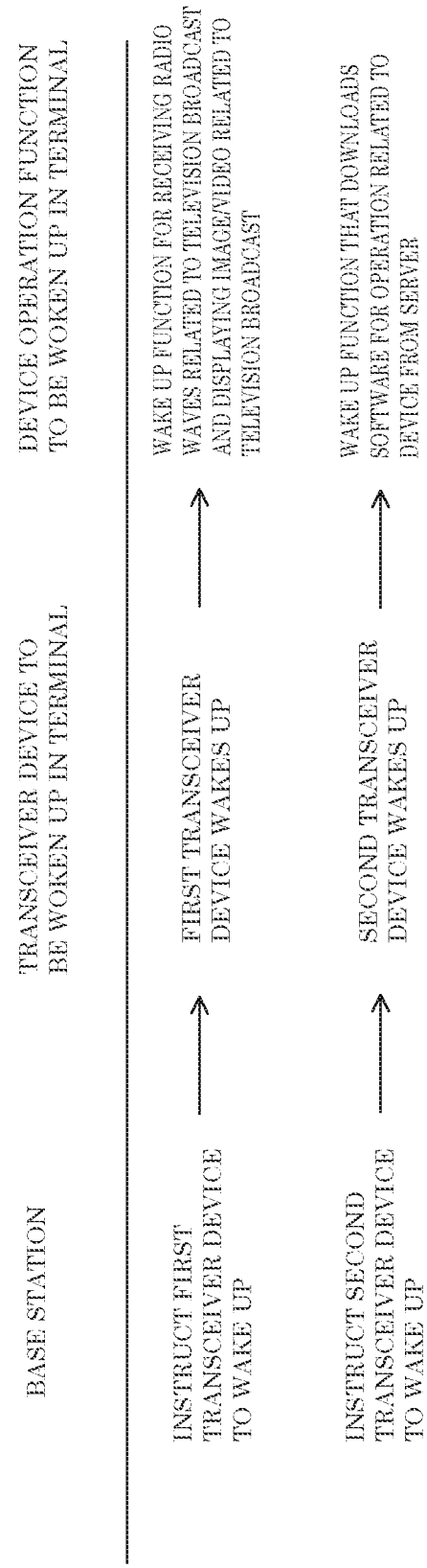
FIG. 35 illustrates an example of operations performed by a base station and a terminal.

Yet another example related to the above will be given with reference to the figures. FIG. 35 illustrates an example of operations performed by a base station (and communication device 103), and a terminal illustrated in FIG. 1.

As illustrated in FIG. 35, the base station transmits an instruction to the terminal instructing first transceiver device 205 to wake up.

First transceiver device 205 included in the terminal then wakes up.

Since the waking up of first transceiver device 205 is associated with, among device operation functions 210 included in the terminal, the function for receiving radio waves related to a television broadcast and displaying an image or video related to the television broadcast, in accordance with the waking up of first transceiver device 205 included in the terminal, among device operation functions 210 included in the terminal, the function for receiving radio waves related to a television broadcast and displaying an image or video related to the television broadcast wakes up.

As illustrated in FIG. 35, the base station transmits an instruction to the terminal instructing second transceiver device 215 to wake up.

Second transceiver device 215 included in the terminal then wakes up.

Since the waking up of second transceiver device 215 is associated with, among device operation functions 210 included in the terminal, the waking up of the function that downloads software for an operation related to the device (terminal) from a server, in accordance with the waking up of second transceiver device 215 included in the terminal, among device operation functions 210 included in the terminal, the function that downloads software for an operation related to the device from a server wakes up.

By, as described above, associating a transceiver device to be woken up with a device operation that is executed in accordance with the waking up of a transceiver device or with a device operation function to be woken up, by transmitting a signal to the terminal that instructs the transceiver device to wake up or transmitting a signal to the terminal that instructs the transceiver device to wake up that specifies the transceiver device to be woken up, the device operations of the terminal can be controlled. Consequently, it is possible to reduce the number of signals transmitted for controlling device operations, which simplifies the control of device operations.

Figure 36:
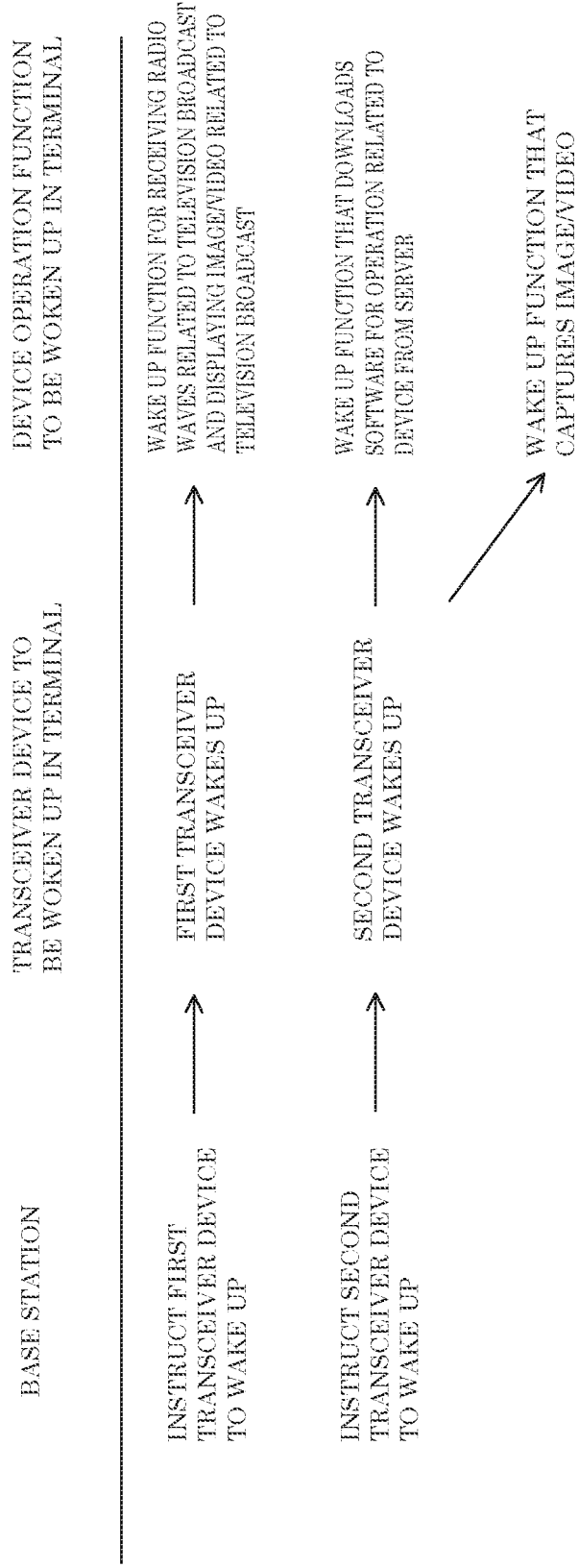
FIG. 36 illustrates an example of operations performed by a base station and a terminal.

FIG. 36 illustrates an example of operations performed by a base station and a terminal that differs from the example illustrated in FIG. 35.

As illustrated in FIG. 36, the base station transmits an instruction to the terminal instructing first transceiver device 205 to wake up.

First transceiver device 205 included in the terminal then wakes up.

Since the waking up of first transceiver device 205 is associated with, among device operation functions 210 included in the terminal, the waking up of the function for receiving radio waves related to a television broadcast and displaying an image or video related to the television broadcast, in accordance with the waking up of first transceiver device 205 included in the terminal, among device operation functions 210 included in the terminal, the function for receiving radio waves related to a television broadcast and displaying an image or video related to the television broadcast wakes up.

Moreover, as illustrated in FIG. 36, the base station transmits an instruction to the terminal instructing second transceiver device 215 to wake up.

Second transceiver device 215 included in the terminal then wakes up.

Then, unlike in FIG. 35, in FIG. 36, the waking up of second transceiver device 215 is associated with, from among device operation functions 210 included in the terminal, the waking up of the function that downloads software for an operation related to the device (terminal) from a server and the waking up of a function that captures an image and/or a video.

Accordingly, the base station transmits a frame including information indicating to wake up the function that downloads software for an operation related to the device (terminal) from a server and/or wake up the function that captures an image and/or a video.

With this, in accordance with the waking up of second transceiver device 215 included in the terminal and the demodulating of the frame, the function that downloads software for an operation related to the device (terminal) from a server and/or the function that captures an image and/or a video wake up.

In this way, in a terminal, a plurality of device operation functions to be woken up can be assigned to a transceiver device to be woken up.

As a result of performing the above-described association, it is possible to achieve the advantageous effect that the device operation function that consequently wakes up can be accurately controlled as a result of the terminal selecting the transceiving function to be woken up.

For example, assume the access point transmits a frame to wake up any one of the device operation functions illustrated in, for example, FIG. 2, that are included in the terminal. In such cases, there is a need for the access point and the terminal to share the information indicating the association related to the transceiving function that the device wakes up and the device operation function that consequently wakes up. Accordingly, communication may be performed in order for the access point and the terminal to share, in advance, the information indicating the association related to the transceiving function that the device wakes up and the device operation function that consequently wakes up.

Moreover, as an example of another method, the terminal may upload the information indicating the association related to the transceiving function that the device wakes up and the device operation function that consequently wakes up to a (cloud) server, and the access point may access the (cloud) server, obtain the information indicating the association related to the transceiving function that the device wakes up and the device operation function that consequently wakes up from the (cloud) server, and transmit a frame for performing the wake-up.

When a (cloud) server is used to share information, this is advantageous because the terminal can easily update the association by uploading the information indicating the association related to the transceiving function that the device wakes up and the device operation function that consequently wakes up to the server.

Note that when the terminal includes a plurality of device operation functions, like in the example given above, one of the device operation functions may be a function that stops some device operation function in accordance with the waking up of the transceiver device. For example, when the terminal includes functionality as a television and the terminal software requires an update, this device operation function may stop the function for receiving radio waves related to a television broadcast and displaying an image or video related to the television broadcast. Then, after the function stops, the function obtains the new software for the device via the function of downloading, from a server, software for an operation related to the device, and thereafter, using the new software, wakes up the function for receiving radio waves related to a television broadcast and displaying an image or video related to the television broadcast. Note that when updating the software, such information may be presented to the user in advance, and permission to update the software may be obtained from the user via an input by the user.

Moreover, as an example of another method, consider a case in which the terminal is experiencing a hardware-related problem. Here, the terminal may receive a frame related to function stoppage that was transmitted by the base station, and the terminal may stop its own operations. In such cases, so long as the hardware-related problem is not resolved, the terminal may prevent itself from operating.

Although the above describes the stopping of the function for receiving radio waves related to a television broadcast and displaying an image or video related to the television broadcast, the device operation function that is stopped by the terminal is not limited to this example.

Note that the registration frame illustrated in FIG. 20 is a frame for registering, in, for example, a server, a terminal to be subsequently woken up by communication device 103. In other words, when communication device 103 receives a frame transmitted as a response by terminal #1, etc., to the transmitted registration frame, communication device 103 stores the terminal-specific information indicated in the frame. As an example of another method, when communication device 103 receives a frame transmitted as a response by terminal #1, etc., to the transmitted registration frame, communication device 103 obtains the terminal-specific information indicated in the frame, and the server that communication device 103 is connected to stores the terminal-specific information indicated in the frame. Stated differently, in FIG. 20, communication device 103 registers terminal #1 etc., as a terminal that needs to be woken up. Thereafter, when terminal #1 etc., needs to be woken up, a wake-up frame is transmitted to each terminal desired to be woken up, such as terminal #1 etc., using the stored terminal-specific information.

Note that communication device 103 may delete the registration after elapse of a fixed period of time from the time of registration. Before this fixed period of time elapses, an image that prompts the user to re-register the terminal, that is to say, warns the user, may be displayed. If the user subsequently re-registers the terminal, the registration is maintained, and if the user does not re-register the terminal, the registration is deleted. With this configuration, communication device 103 can accurately know which terminals are to be woken up, which makes it possible to prevent unnecessary transmission of wake-up frames. This achieves the advantageous effect that frequency usage efficiency can be improved.

Next, the above will be described in greater detail with reference to the drawings. In this example, communication device 103 transmits wake-up frame 2001 and registration frame 2002, and communication device 103 receives responses from the terminals and registers information about the terminals in a server, like in FIG. 20. Note that since details regarding these operations have already been described, repeated description thereof will be omitted.

Figure 37:
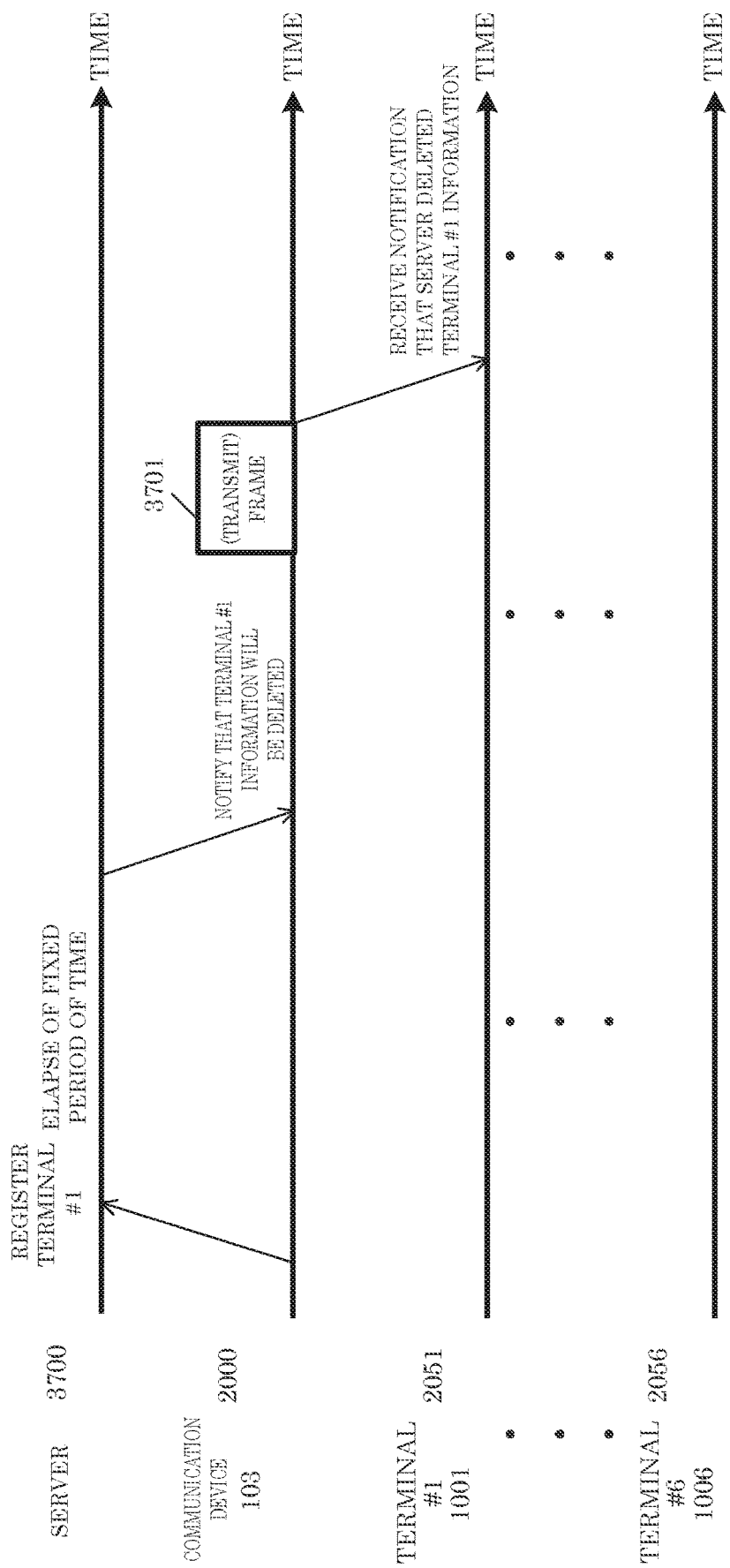
FIG. 37 illustrates one example of communication between a server, a communication device, and terminals.

FIG. 37 illustrates an example of operations performed by devices after the operations illustrated in FIG. 20. Note that in FIG. 37, time is represented on the horizontal axis, and elements that operate the same as in FIG. 20 share like reference signs.

3700 indicates operations performed by the server, relative to the time axis.

As illustrated in FIG. 20, communication device 103 receives a response from terminal #1 labeled 1001, transmits information about terminal #1 labeled 1001 to the server, and the server registers the information about terminal #1 labeled 1001.

Thereafter, for example, assume a fixed period of time elapses without communication device 103 communicating with terminal #1 labeled 1001 (note that the period does not need to be a fixed period). As a result, for example, the server determines that terminal #1 labeled 1001 is not present as a device, and determines to delete the information about terminal #1 labeled 1001. Accordingly, the server notifies communication device 103 of the deletion of the information about terminal #1.

In accordance with this, communication device 103 transmits frame 3701 for transmitting the notification that the registration information for terminal #1 labeled 1001 has been deleted. Note that communication device 103 may transmit a wake-up frame to terminal #1 labeled 1001 before transmitting frame 3701. When terminal #1 labeled 1001 receives the wake-up frame, terminal #1 labeled 1001 wakes up. Since this wake-up feature has been described in detail in other embodiments, repeated description thereof will be omitted.

If terminal #1 labeled 1001 is present, terminal #1 labeled 1001 receives frame 3701, whereby terminal #1 labeled 1001 knows that the server has deleted the registration information for terminal #1 labeled 1001. Note that it is possible that terminal #1 labeled 1001 is not present.

Note that in the example illustrated in FIG. 37, terminal information is exemplified as being registered in the server, but communication device 103 may be configured to include a function that stores the terminal information to be registered, and after elapse of a fixed period of time, determines terminals to be removed from the registry. In other words, the function that implements the server operations may be included in communication device 103.

Figure 38:
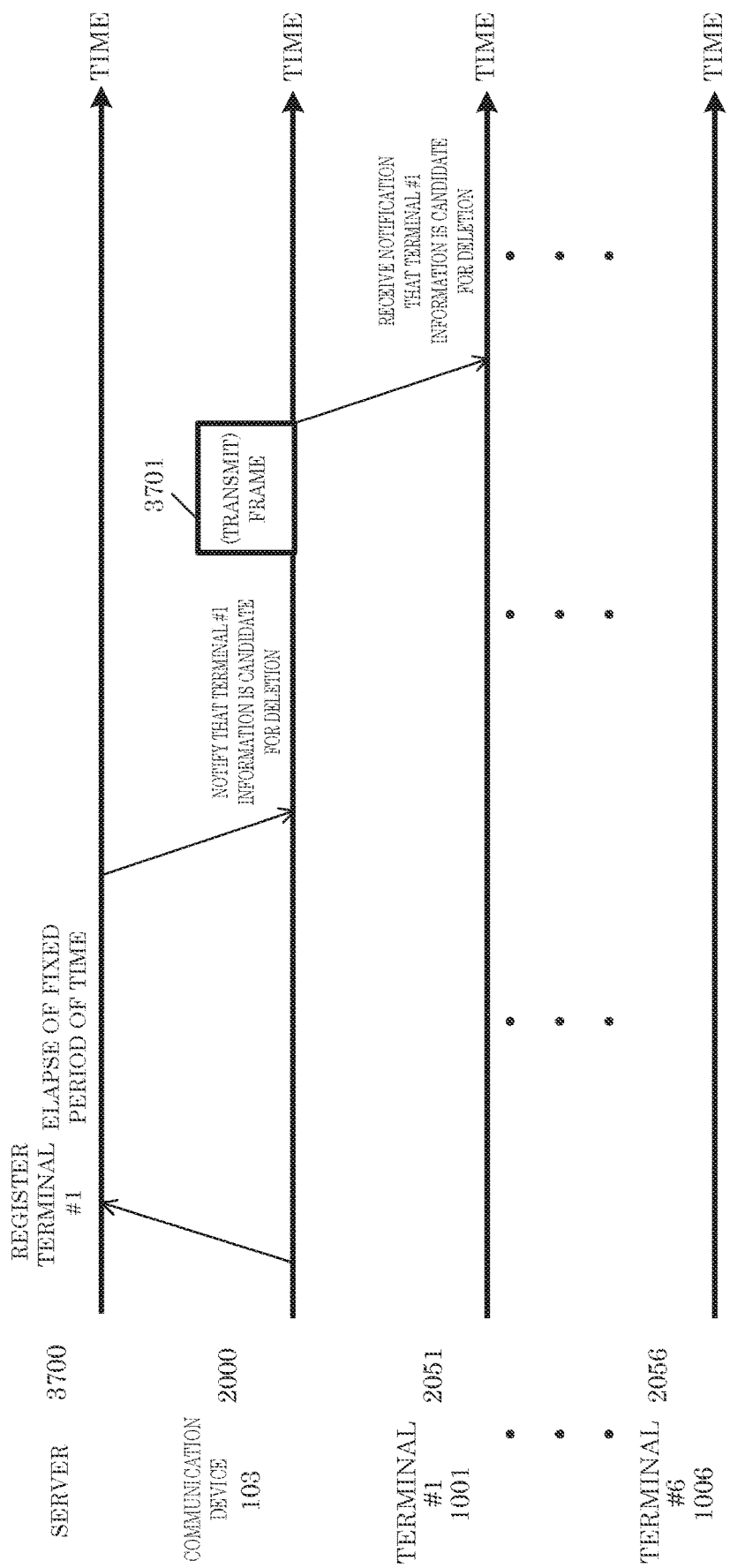
FIG. 38 illustrates one example of communication between a server, a communication device, and terminals.

FIG. 38 illustrates an example, which differs from the example illustrated in FIG. 37, of operations performed by devices after the operations illustrated in FIG. 20. Note that in FIG. 38, time is represented on the horizontal axis, and elements that operate the same as in FIG. 20 and FIG. 37 share like reference signs.

As illustrated in FIG. 20, communication device 103 receives a response from terminal #1 labeled 1001, transmits information about terminal #1 labeled 1001 to the server, and the server registers the information about terminal #1 labeled 1001.

Thereafter, for example, assume a fixed period of time elapses without communication device 103 communicating with terminal #1 labeled 1001 (note that the period does not need to be a fixed period). As a result, for example, the server determines that terminal #1 labeled 1001 is not present as a device, and determines that the information about terminal #1 labeled 1001 is a candidate for deletion. Accordingly, the server notifies communication device 103 that the information about terminal #1 labeled 1001 is a candidate for deletion.

In accordance with this, communication device 103 transmits frame 3701 for transmitting the notification that the registration information for terminal #1 labeled 1001 is a candidate for deletion. Note that communication device 103 may transmit a wake-up frame to terminal #1 labeled 1001 before transmitting frame 3701. When terminal #1 labeled 1001 receives the wake-up frame, terminal #1 labeled 1001 wakes up. Since this wake-up feature has been described in detail in other embodiments, repeated description thereof will be omitted.

If terminal #1 labeled 1001 is present, terminal #1 labeled 1001 receives frame 3701, whereby terminal #1 labeled 1001 knows that the server has deemed the registration information for terminal #1 labeled 1001 to be a candidate for deletion.

However, when terminal #1 labeled 1001 cancels the deletion of the information about terminal #1 labeled 1001 by server, terminal #1 labeled 1001 may transmit a frame indicating such to communication device 103.

Moreover, when a frame indicating such is not transmitted from terminal #1 labeled 1001, communication device 103 may request the server to delete the information about terminal #1 labeled 1001.

Alternatively, when a frame indicating such is not transmitted from terminal #1 labeled 1001, the server may delete the information about terminal #1 labeled 1001 after elapse of a given period of time.

Note that it is possible that terminal #1 labeled 1001 is not present.

Note that in the example illustrated in FIG. 38, terminal information is exemplified as being registered in the server, but communication device 103 may be configured to include a function that stores the terminal information to be registered, and deletes terminal information based on the procedures described above. In other words, the function that implements the server operations may be included in communication device 103.

Note that the period up until a terminal is determined to be a candidate for information deletion may be determined in advance based on terminal type. For example, when the terminal is a smartphone or tablet, the period up until the determination that the information is a candidate for deletion may be set as a first period, and if the terminal is a home appliance, the period up until the determination that the information is a candidate for deletion may be set as a second period. In such cases, information indicating terminal type may be included in, for example, the registration frame, and, alternatively, may be notified to the server via a frame other than the registration frame, before or after reception of the registration frame. Moreover, as another example, information indicating the length of the period up until the terminal determines that the information is a candidate for deletion or information for determining the length of the period up until the terminal determines that the information is a candidate for deletion may be included in and transmitted with the registration frame. In such cases, the server sets the period up until the terminal determines that the information is a candidate for deletion based on the information obtained from the registration frame. With this configuration, it is possible to set the period up until the terminal determines that the information is a candidate for deletion on a per terminal-type basis or on a per terminal basis, which makes it possible to flexibly control the management of terminals in the server in accordance with the application of the terminal or the environment that the terminal is used in.

Supplemental Information 2

Next, as a variation of the embodiments described in the present specification, a case in which the embodiments are implemented using cellular communication, such as evolved universal terrestrial radio access (E-UTRA), long term evolution (LTE), LTE advanced, new radio (NR), new radio access, or non-terrestrial networks, will be given.

Assume a base station and a terminal are communicating, the base station transmits the wake-up frame described in the present specification to the terminal, and the terminal wakes up upon receiving the wake-up frame.

In this example, instances in which the terminal is in a state before the reception of the wake-up frame (for example, instances in which the terminal is asleep) may be a state in which the terminal does not demodulate the physical downlink control channel (PDCCH) or a state in which the terminal does not search PDCCH present in the frame. Note that instances in which the terminal is in a state before the reception of the wake-up frame may be referred to a sleep state, deep sleep state, light sleep state, or micro sleep state.

The terminal then receives the wake-up frame and wakes up. A state in which the terminal is awake may mean a state in which the terminal has demodulated PDCCH and obtained the data included in PDCCH.

Supplemental Information 3

In Embodiment 1, communication device 103 is exemplified as transmitting wake-up frame 401 illustrated in FIG. 4.

Wake-up frame 401 is exemplified as having the configuration illustrated in FIG. 7, and is exemplified as being able to specify to not wake up communication performed via a specific communication scheme. Wake-up frame 401 is also exemplified as being able to specify to put communication performed via a specific communication scheme to sleep.

These points are also described in other embodiments.

In other words, communication device 103 may transmit information instructing to sleep (for example, a go-to-sleep instruction) via a control information symbol such as a wake-up frame or wake-up related data symbol.

Supplemental Information 4

In the present specification, an example is given in which, for example, the base station and/or communication device instructs wake-up in two stages, namely the waking up of the transceiver device in a terminal having the configuration illustrated in, for example, FIG. 2 and the waking up of the device operation function in the terminal, and the transceiver device in the terminal wakes up and the device operation function in the terminal wakes up. In this way, the base station and/or communication device may transmit a modulated signal including wake-up related information to wake up the functions in the terminal in multiple stages (i.e., employ multi-stage wake up).

Note that examples of the base station and/or communication device waking up functions in the terminal in multiple stages are not limited to this example. Hereinafter, a different example will be given.

Figure 39:
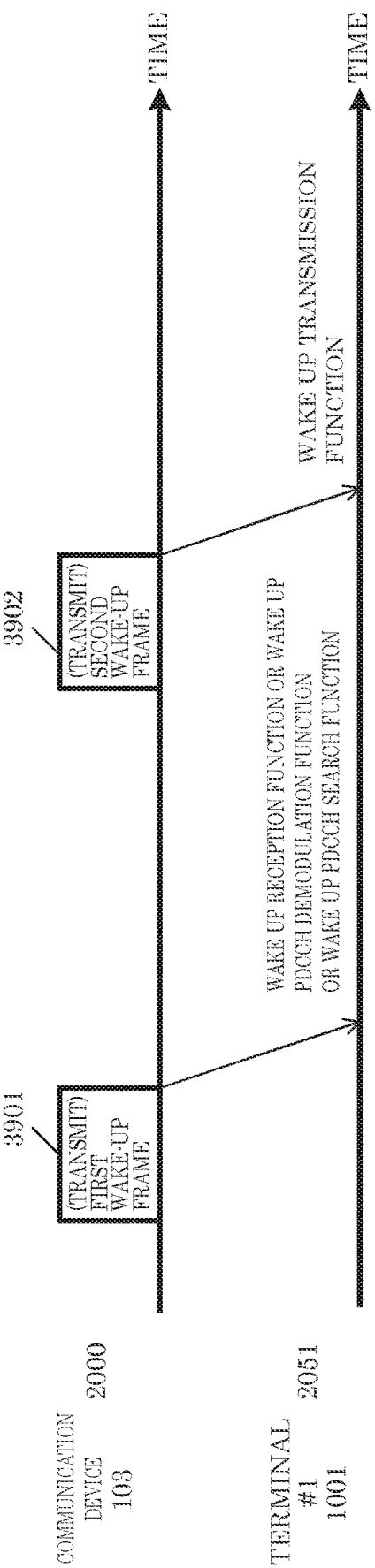
FIG. 39 illustrates one example of communication between a communication device and a terminal.

FIG. 39 illustrates an example of operations performed upon communication device 103 transmitting the wake-up frame to a terminal in, for example, FIG. 1. In FIG. 39, time is represented on the horizontal axis. Operations performed relative to the time axis by the communication device 103 are indicated by 2000, and operations performed relative to the time axis by terminal #1 labeled 1001 are indicated by 2051.

As illustrated in FIG. 39, communication device 103 transmits first wake-up frame 3901. In this example, first wake-up frame 3901 includes information instructing the reception function to wake up. Terminal #1 labeled 1001 receives first wake-up frame 3901, and, for example, in accordance with the instruction in first wake-up frame 3901, the reception function wakes up.

Communication device 103 then transmits second wake-up frame 3902. In this example, second wake-up frame 3902 includes information instructing the transmission function to wake up. Terminal #1 labeled 1001 receives second wake-up frame 3902, and, for example, in accordance with the instruction in second wake-up frame 3902, the transmission function wakes up.

As another example, communication device 103 transmits first wake-up frame 3901, as illustrated in FIG. 39. In this example, first wake-up frame 3901 includes information instructing the PDCCH demodulation function to wake up. Terminal #1 labeled 1001 receives first wake-up frame 3901, and, for example, in accordance with the instruction in first wake-up frame 3901, the PDCCH demodulation function wakes up.

Communication device 103 then transmits second wake-up frame 3902. In this example, second wake-up frame 3902 includes information instructing the transmission function to wake up. Terminal #1 labeled 1001 receives second wake-up frame 3902, and, for example, in accordance with the instruction in second wake-up frame 3902, the transmission function wakes up.

As yet another example, communication device 103 transmits first wake-up frame 3901, as illustrated in FIG. 39. In this example, first wake-up frame 3901 includes information instructing the PDCCH search function to wake up. Terminal #1 labeled 1001 receives first wake-up frame 3901, and, for example, in accordance with the instruction in first wake-up frame 3901, the PDCCH search function wakes up.

Communication device 103 then transmits second wake-up frame 3902. In this example, second wake-up frame 3902 includes information instructing the transmission function to wake up. Terminal #1 labeled 1001 receives second wake-up frame 3902, and, for example, in accordance with the instruction in second wake-up frame 3902, the transmission function wakes up.

Note that in FIG. 39, communication device 103 may transmit a frame that includes both the information included in first wake-up frame 3901 and the information included in second wake-up frame 3902. Moreover, in FIG. 39, communication device 103 may transmit first wake-up frame 3901 as a data symbol. Similarly, in FIG. 39, communication device 103 may transmit second wake-up frame 3902 as a data symbol.

Figure 40:
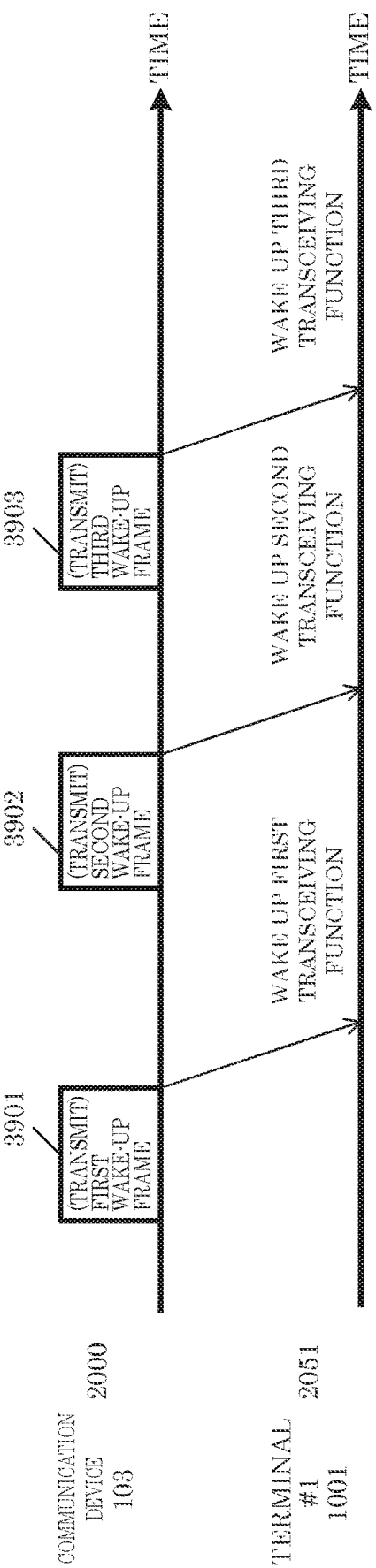
FIG. 40 illustrates one example of communication between a communication device and a terminal.

FIG. 40 illustrates an example of operations performed upon communication device 103 transmitting the wake-up frame to a terminal in, for example, FIG. 1. In FIG. 40, time is represented on the horizontal axis. Operations performed relative to the time axis by the communication device 103 are indicated by 2000, and operations performed relative to the time axis by terminal #1 labeled 1001 are indicated by 2051.

As illustrated in FIG. 40, communication device 103 transmits first wake-up frame 3901. In this example, first wake-up frame 3901 includes information instructing the first transceiving function to wake up. Terminal #1 labeled 1001 receives first wake-up frame 3901, and, for example, in accordance with the instruction in first wake-up frame 3901, the first transceiving function wakes up.

Communication device 103 then transmits second wake-up frame 3902. In this example, second wake-up frame 3902 includes information instructing the second transceiving function to wake up. Terminal #1 labeled 1001 receives second wake-up frame 3902, and, for example, in accordance with the instruction in second wake-up frame 3902, the second transceiving function wakes up.

Communication device 103 further transmits third wake-up frame 3903. In this example, third wake-up frame 3903 includes information instructing the third transceiving function to wake up. Terminal #1 labeled 1001 receives third wake-up frame 3903, and, for example, in accordance with the instruction in third wake-up frame 3903, the third transceiving function wakes up.

Note that in FIG. 40, communication device 103 may transmit a frame that includes the information included in first wake-up frame 3901, the information included in second wake-up frame 3902, and the information included in the third wake-up frame 3903. Moreover, in FIG. 40, communication device 103 may transmit first wake-up frame 3901 as a data symbol. Similarly, in FIG. 40, communication device 103 may transmit second wake-up frame 3902 as a data symbol. Moreover, in FIG. 40, communication device 103 may transmit third wake-up frame 3903 as a data symbol.

Figure 41:
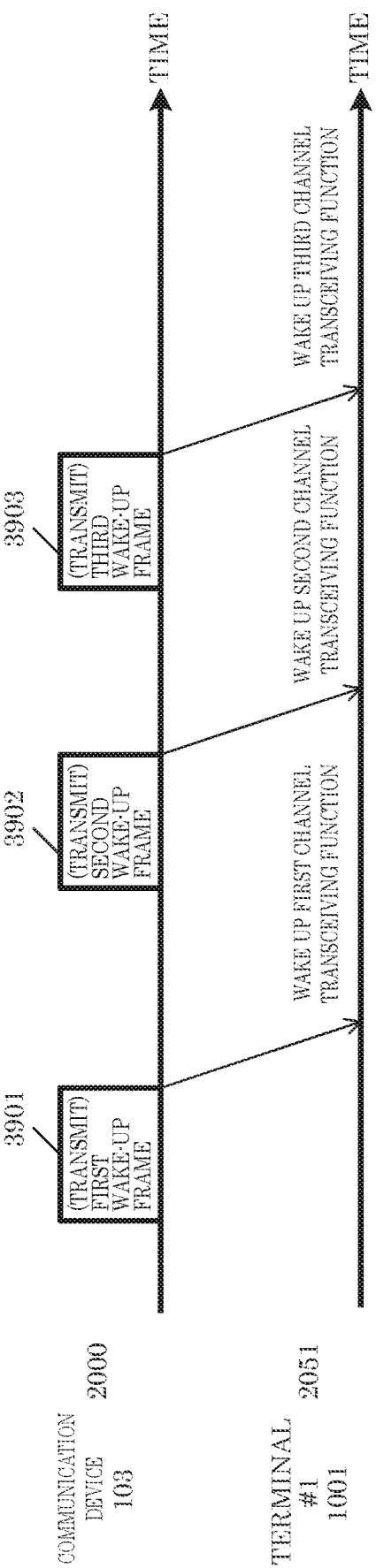
FIG. 41 illustrates one example of communication between a communication device and a terminal.

FIG. 41 illustrates an example of operations performed upon communication device 103 transmitting the wake-up frame to a terminal in, for example, FIG. 1. In FIG. 41, time is represented on the horizontal axis. Operations performed relative to the time axis by the communication device 103 are indicated by 2000, and operations performed relative to the time axis by terminal #1 labeled 1001 are indicated by 2051.

As illustrated in FIG. 41, communication device 103 transmits first wake-up frame 3901. In this example, first wake-up frame 3901 includes information instructing the first channel transceiving function to wake up. Terminal #1 labeled 1001 receives first wake-up frame 3901, and, for example, in accordance with the instruction in first wake-up frame 3901, the first channel transceiving function wakes up.

Communication device 103 then transmits second wake-up frame 3902. In this example, second wake-up frame 3902 includes information instructing the second channel transceiving function to wake up. Terminal #1 labeled 1001 receives second wake-up frame 3902, and, for example, in accordance with the instruction in second wake-up frame 3902, the second channel transceiving function wakes up.

Communication device 103 further transmits third wake-up frame 3903. In this example, third wake-up frame 3903 includes information instructing the third channel transceiving function to wake up. Terminal #1 labeled 1001 receives third wake-up frame 3903, and, for example, in accordance with the instruction in third wake-up frame 3903, the third channel transceiving function wakes up.

Note that in FIG. 41, communication device 103 may transmit a frame that includes the information included in first wake-up frame 3901, the information included in second wake-up frame 3902, and the information included in the third wake-up frame 3903. Moreover, in FIG. 41, communication device 103 may transmit first wake-up frame 3901 as a data symbol. Similarly, in FIG. 41, communication device 103 may transmit second wake-up frame 3902 as a data symbol. Moreover, in FIG. 40, communication device 103 may transmit third wake-up frame 3903 as a data symbol.

Figure 42:
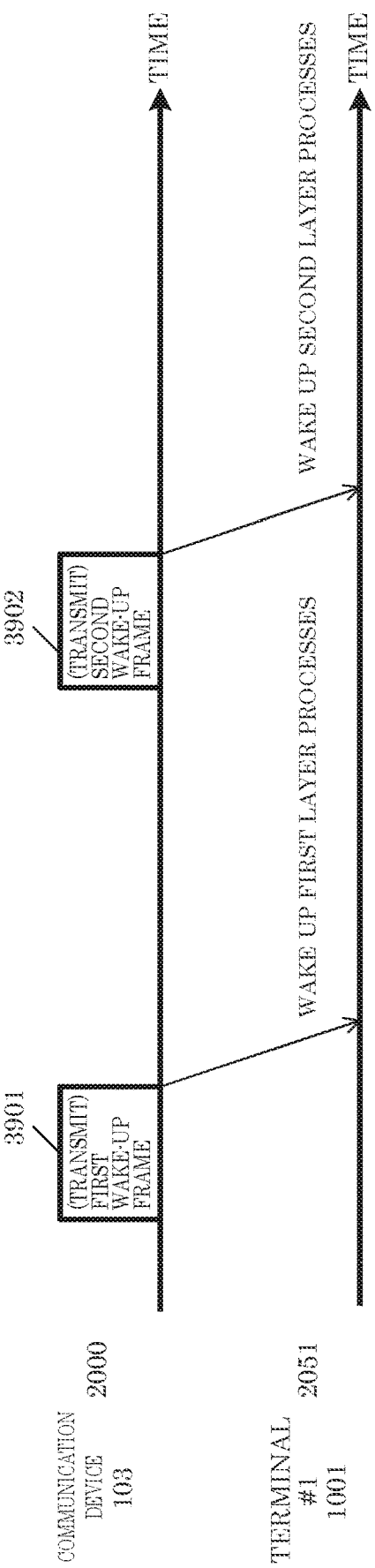
FIG. 42 illustrates one example of communication between a communication device and a terminal.

FIG. 42 illustrates an example of operations performed upon communication device 103 transmitting the wake-up frame to a terminal in, for example, FIG. 1. In FIG. 42, time is represented on the horizontal axis. Operations performed relative to the time axis by the communication device 103 are indicated by 2000, and operations performed relative to the time axis by terminal #1 labeled 1001 are indicated by 2051.

As illustrated in FIG. 42, communication device 103 transmits first wake-up frame 3901. In this example, first wake-up frame 3901 includes information instructing the first layer processes to wake up. Terminal #1 labeled 1001 receives first wake-up frame 3901, and, for example, in accordance with the instruction in first wake-up frame 3901, the first layer processes wake up.

Communication device 103 then transmits second wake-up frame 3902. In this example, second wake-up frame 3902 includes information instructing the second layer processes to wake up. Terminal #1 labeled 1001 receives second wake-up frame 3902, and, for example, in accordance with the instruction in second wake-up frame 3902, the second layer processes wake up.

Note that in cellular communication such as evolved universal terrestrial radio access (E-UTRA), long term evolution (LTE), LTE advanced, new radio (NR) new radio access and non-terrestrial networks, layers include, for example, physical layer (PHY layer), medium access control layer (MAC layer), radio link control layer (RLC layer), packet data convergence protocol layer (PDCP layer), radio resource control layer (RRC layer), and non-access stratum layer (NAS layer).

Note that in FIG. 42, communication device 103 may transmit a frame that includes both the information included in first wake-up frame 3901 and the information included in second wake-up frame 3902. Moreover, in FIG. 42, communication device 103 may transmit first wake-up frame 3901 as a data symbol. Similarly, in FIG. 42, communication device 103 may transmit second wake-up frame 3902 as a data symbol.

In FIG. 39, FIG. 40, FIG. 41, and FIG. 42, two- and three-stage wake-up is described, but four-stage or higher wake-up may be performed. Moreover, the wake-up procedures illustrated in FIG. 39 through FIG. 42 may be combined.

As described above, the terminal includes a plurality of functions and each function can enter a sleep state. Moreover, the communication device transmits a wake-up frame specifying a function to be woken up in the terminal, and the terminal wakes up the function desired to be woken up by the communication device, based on the wake-up frame. In this way, the wake-up procedures can be performed more finely, making it possible to achieve the advantageous effect that appropriate wake-up control and appropriate terminal power consumption control can be performed.

Supplemental Information 5

Here, a variation of the transmission method of the wake-up frame described in the present specification will be described.

First Example

For example, consider the state illustrated in FIG. 10. In this example, communication device 103 is capable of communicating with terminal #1 labeled 101, terminal #2 labeled 1002, and terminal #3 labeled 1003. In addition to these terminals, assume communication device 103 is also capable of communicating with terminal #4 labeled 1004.

Figure 43:
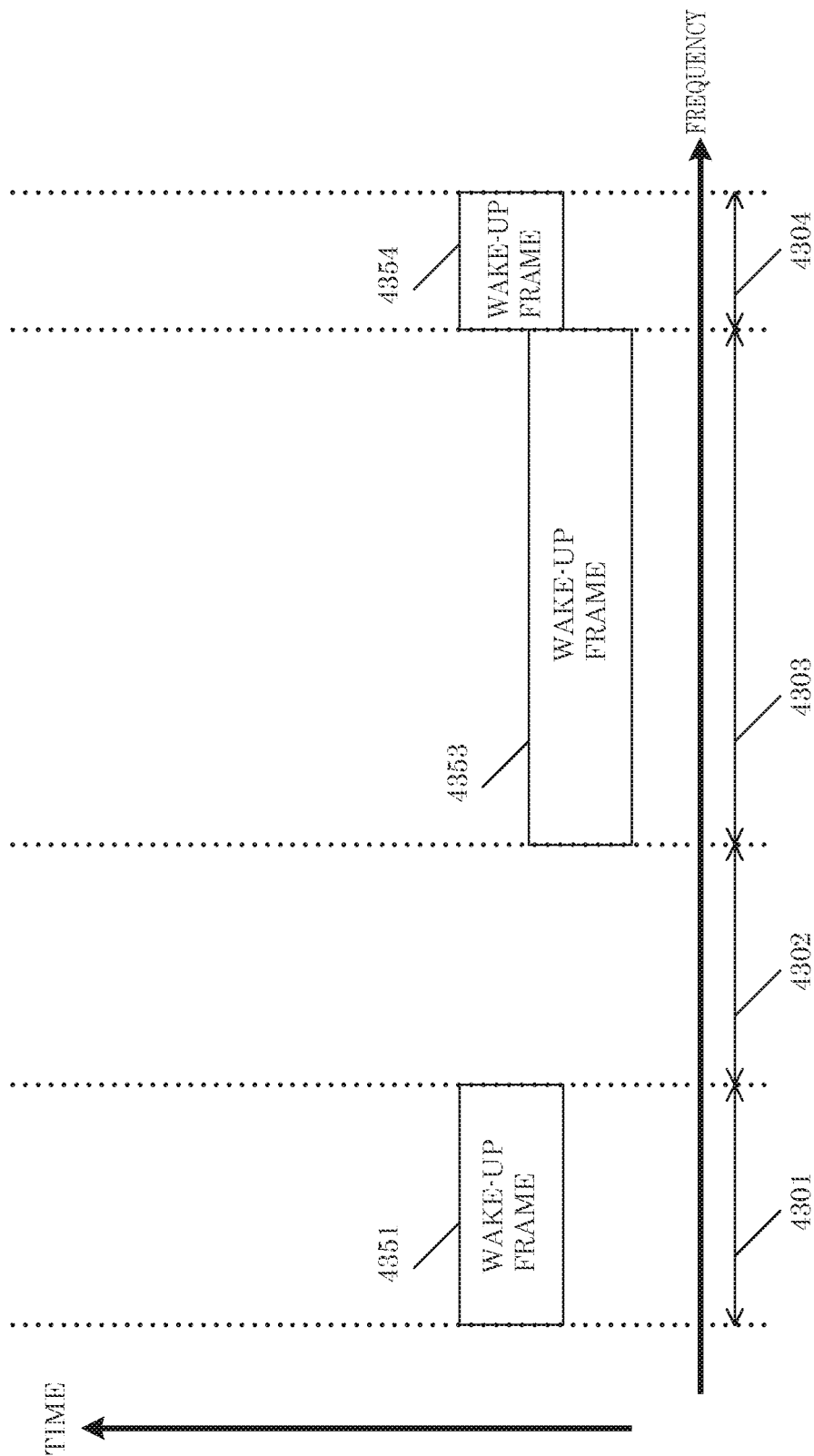
FIG. 43 illustrates one example of a configuration of frames in a modulated signal.

FIG. 43 illustrates one example of a frame configuration of a modulated signal transmitted by communication device 103. Frequency (carrier) is represented on the horizontal axis, and time is represented on the horizontal axis. In this example, communication device 103 transmits the modulated signal using a multi-carrier transmission scheme such as orthogonal frequency division multiplexing (OFDM). Moreover, communication device 103 uses multiple access such as orthogonal frequency division multiple access (OFDMA).

Communication device 103 transmits a modulated signal addressed to terminal #1 labeled 101 using first channel 4301 of a first frequency range. Communication device 103 transmits a modulated signal addressed to terminal #2 labeled 1002 using second channel 4302 of a second frequency range. Communication device 103 transmits a modulated signal addressed to terminal #3 labeled 1003 using third channel 4303 of a third frequency range. Communication device 103 transmits a modulated signal addressed to terminal #4 labeled 1004 using fourth channel 4304 of a fourth frequency range.

In FIG. 43, wake-up frame 4351 is transmitted using first channel 4301. Here, wake-up frame 4351 is a wake-up frame for waking up terminal #1 labeled 101. Note that symbols transmitted by communication device 103 after wake-up frame 4351 are not illustrated in FIG. 43. Accordingly, after wake-up frame 4351, communication device 103 may transmit a symbol to terminal #1 labeled 101.

In FIG. 43, no wake-up frame is transmitted using second channel 4302. In such cases, it is conceivable that terminal #2 labeled 1002 is already awake or terminal #2 labeled 1002 is not to be woken up.

In FIG. 43, wake-up frame 4353 is transmitted using third channel 4303. Here, wake-up frame 4353 is a wake-up frame for waking up terminal #3 labeled 1003. Note that symbols transmitted by communication device 103 after wake-up frame 4353 are not illustrated in FIG. 43. Accordingly, after wake-up frame 4353, communication device 103 may transmit a symbol to terminal #3 labeled 1003.

In FIG. 43, wake-up frame 4354 is transmitted using fourth channel 4304. Here, wake-up frame 4354 is a wake-up frame for waking up terminal #4 labeled 1004. Note that symbols transmitted by communication device 103 after wake-up frame 4353 are not illustrated in FIG. 43. Accordingly, after wake-up frame 4354, communication device 103 may transmit a symbol to terminal #4 labeled 1004.

The wake-up frames in FIG. 43 may include any of the following information described in the present specification: information indicating to wake up a communication function in the terminal, information indicating to wake up a device function in the terminal, information for putting a communication function in the terminal to sleep, and information for putting a device function in the terminal to sleep.

Second Example

For example, consider the state illustrated in FIG. 10. In this example, communication device 103 is capable of communicating with terminal #1 labeled 101, terminal #2 labeled 1002, and terminal #3 labeled 1003.

Figure 44:
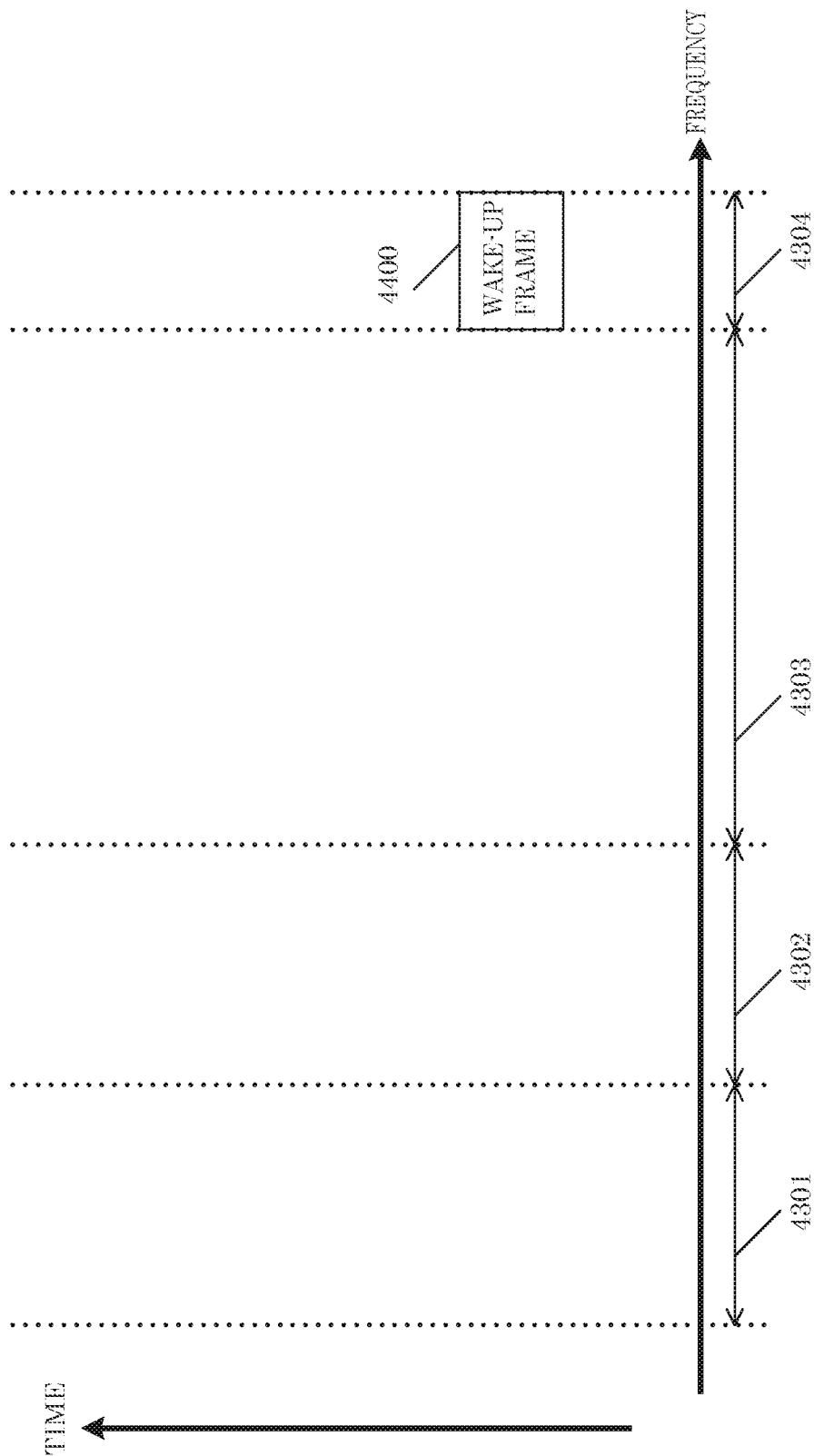
FIG. 44 illustrates one example of a configuration of frames in a modulated signal.

FIG. 44 illustrates one example of a frame configuration of a modulated signal transmitted by communication device 103. Frequency (carrier) is represented on the horizontal axis, and time is represented on the horizontal axis. In this example, communication device 103 transmits the modulated signal using a multi-carrier transmission scheme such as OFDM. Moreover, communication device 103 uses multiple access such as OFDMA.

Communication device 103 transmits a modulated signal addressed to terminal #1 labeled 101 using first channel 4301 of a first frequency range. Communication device 103 transmits a modulated signal addressed to terminal #2 labeled 1002 using second channel 4302 of a second frequency range. Communication device 103 transmits a modulated signal addressed to terminal #3 labeled 1003 using third channel 4303 of a third frequency range. Communication device 103 transmits a control information symbol including a wake-up frame for waking up a terminal, using fourth channel 4304 of a fourth frequency range. In other words, fourth channel 4304 is a control channel or a channel for transmitting a wake-up frame (a wake-up frame transmission channel).

In FIG. 44, for example, terminal #1 labeled 101, terminal #2 labeled 1002, and terminal #3 labeled 1003 are asleep. For example, terminals that are asleep are performing reception on fourth channel 4304.

Communication device 103 then transmits wake-up frame 4400 using fourth channel 4304. For example, wake-up frame 4400 includes information instructing terminal #1 labeled 101 and terminal #3 labeled 1003 to wake up.

Terminal #1 labeled 101 receives wake-up frame 4400, and based on the information included in wake-up frame 4400, terminal #1 labeled 101 wakes up. Similarly, terminal #3 labeled 1003 receives wake-up frame 4400, and based on the information included in wake-up frame 4400, terminal #3 labeled 1003 wakes up.

Then, after wake-up frame 4400, communication device 103 may then transmit symbols addressed to terminal #1 labeled 101 using, for example, first channel 4301. Similarly, after wake-up frame 4400, communication device 103 may then transmit symbols addressed to terminal #3 labeled 1003 using, for example, third channel 4303.

Note that terminal #3 labeled 1003 is not awake. Accordingly, communication device 103 does not transmit symbols addressed to terminal #3 labeled 1003.

The wake-up frames in FIG. 44 may include any of the following information described in the present specification: information indicating to wake up a communication function in the terminal, information indicating to wake up a device function in the terminal, information for putting a communication function in the terminal to sleep, and information for putting a device function in the terminal to sleep.

Next, an example of subsequent operations will be given. As described above, terminal #1 labeled 101 and terminal #3 labeled 1003 are awake, and communication device 103 uses first channel 4301 to transmit symbols addressed to terminal #1 labeled 101 and uses third channel 4303 to transmit symbols addressed to terminal #3 labeled 1003.

Figure 45:
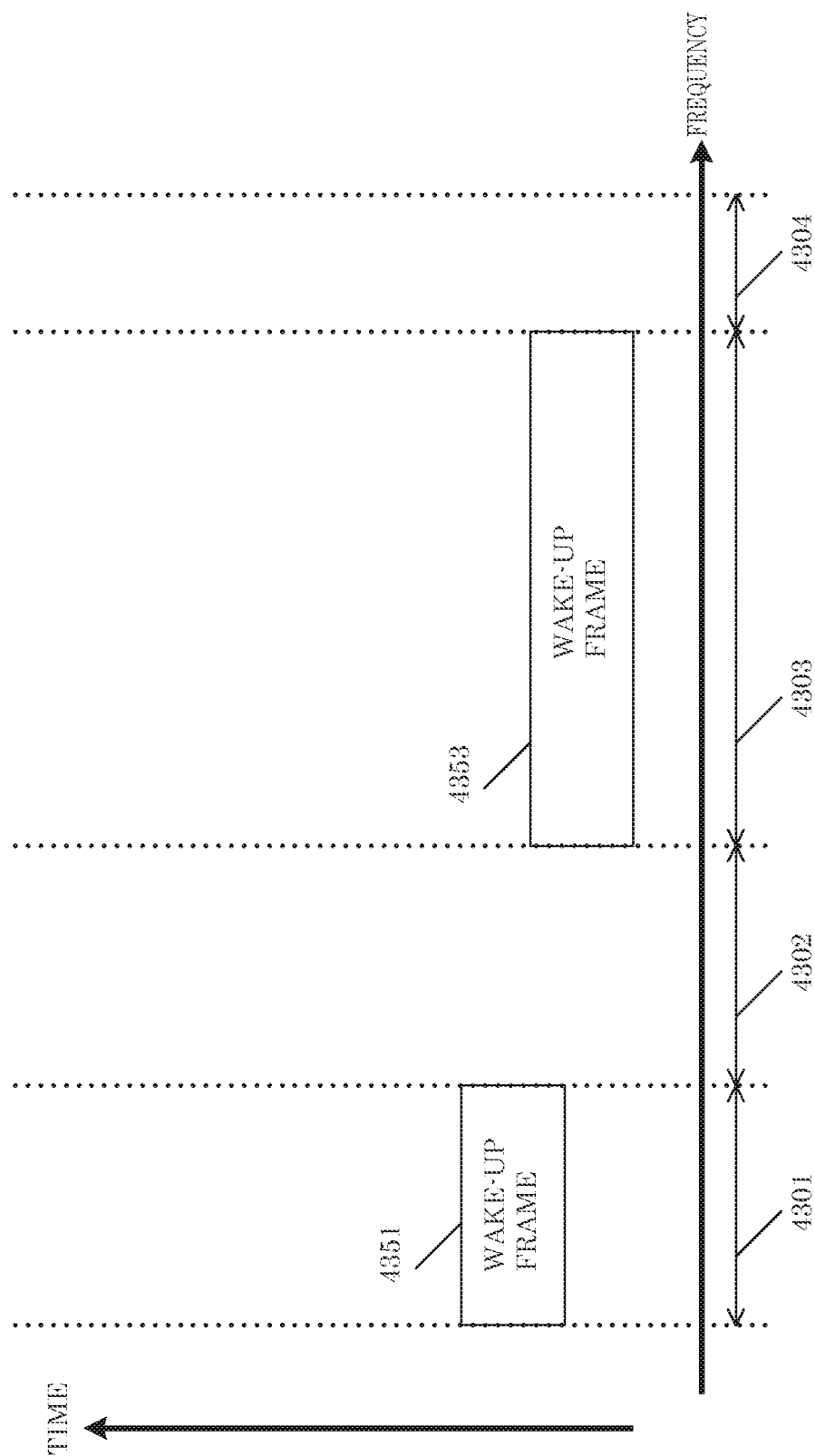
FIG. 45 illustrates one example of a configuration of frames in a modulated signal.

As illustrated in FIG. 45, communication device 103 transmits wake-up frame 4351 to terminal #1 labeled 101 using first channel 4301. Here, wake-up frame 4351 includes information indicating to put terminal #1 labeled 101 to sleep.

As illustrated in FIG. 45, communication device 103 transmits wake-up frame 4353 to terminal #3 labeled 1003 using third channel 4303. Here, wake-up frame 4353 includes information indicating to put terminal #3 labeled 1003 to sleep.

In other words, the wake-up frame transmission method illustrated in FIG. 44 may be used in conjunction with the wake-up frame transmission method illustrated in FIG. 45. In the above examples, terminals that are asleep demodulate fourth channel 4304, and terminals that are awake demodulate channels used for communicating with communication device 103. With this configuration, the terminals can restrict the channels used for demodulation, which makes it possible to achieve the advantageous effect that power consumption can be reduced.

Supplemental Information 6

The operations described as being performed by a base station and a communication device in the present specification may be performed by an access point, a master access point, a slave access point, a repeater, a broadcast station, a terminal, a smartphone, a mobile phone, a gateway, a controller, a server, a computer, a television, a home appliance, a tablet, a smart speaker, a smart display, a vehicle, an airplane, a ship, a bicycle, or a camera, for example.

The operations described as being performed by a terminal in the present specification may be performed by a base station, an access point, a master access point, a slave access point, a repeater, a smartphone, a mobile phone, a gateway, a controller, a server, a computer, a television, a home appliance, a tablet, a smart speaker, a smart display, a vehicle, an airplane, a ship, a bicycle, or a camera, for example.

In the wake-up frame transmitted by communication device and described in the present specification, for example, a terminal may be instructed to wake up, subsequently instructed to sleep, and subsequently instructed to wake up once again. Moreover, a terminal may be instructed to go back to sleep again. In other words, the wake-up frame may include information instructing to wake up once again and information instruct to go back to sleep again.

Moreover, the wake-up frame is exemplified as having, for example, the configuration illustrated in FIG. 9, and including information 901 on terminals subject to the information indicating the communication scheme to be woken up, but information 901 on terminals subject to the information indicating the communication scheme to be woken up may be information on terminals subject to the information indicating the communication scheme to be, for example, woken up, put to sleep, woken up again, and put back to sleep again. Moreover, information 801 indicating the communication scheme to be woken up may be information indicating the communication scheme to be woken up, put to sleep, woken up again, and put back to sleep again. Information 802 related to the communication scheme to be woken up may be information related to the communication scheme to be woken up, put to sleep, woken up again, and put back to sleep again.

The information on terminals subject to the information indicating the communication scheme to be, for example, woken up, put to sleep, woken up again, and put back to sleep again may specify, in addition to multicast and unicast, one or more terminals, for example, groupcast.

For example, when the information on terminals subject to the information indicating the communication scheme to be, for example, woken up, put to sleep, woken up again, and put back to sleep again specifies groupcast, for example, the terminals may be specified in the following manner.

Terminals that support version X of communication scheme A.
Terminals capable of receiving notification information.
Terminals capable of receiving emergency information.
Terminals present in region B.
Terminals equipped in vehicles.
Terminals equipped in standard vehicles.
Terminals equipped in vehicles that support autonomous driving.
Terminals equipped in heavy-duty vehicles.
Terminals equipped in vehicles driving on a highway.

Note that these are merely examples; the method of specifying vehicles via groupcast is not limited to these examples. For example, terminals may be specified by a combination of a plurality of conditions.

The above described processes performed by a terminal to determine whether conditions for being subject to the communication scheme to be, for example, woken up, put to sleep, woken up again, and put back to sleep again are satisfied or not. The terminal may store information needed to determine whether the conditions are satisfied in a storage included in the transceiver device that receives the wake-up frame, or in a storage accessible by the transceiver device. Upon receiving a wake-up frame, the terminal compares conditions specified in the wake-up frame with information stored in the storage, and when the terminal determines that the conditions are satisfied, the transceiver device or the device operation function is woken up, put to sleep, woken up again, or put back to sleep again.

Note that when a device different from the transceiver device that received the wake-up frame is required to be woken up, such as a device included in the transceiver device or terminal that is subject to being woken up in order to obtain information needed to determine whether the specified conditions are satisfied or not, the processes for determining whether the conditions are satisfied are performed after the device is woken up and the information needed for the determination is obtained, and when the conditions are determined to be satisfied, the processing such as the waking up, putting to sleep, waking up again, or putting back to sleep that is specified in the wake-up frame is implemented. In such cases, information specifying the conditions may be stored in, for example, the second wake-up frame or the third wake-up frame illustrated in FIG. 39, FIG. 40, and FIG. 41 that are received after the device wakes up.

Note that the information specifying the conditions may be stored in a wake-up frame received before the device is woken up. In such cases, when a terminal determines that information needs to be obtained from another device in order to be able to determine whether the conditions specified in the received wake-up frame are satisfied or not, the terminal wakes up the device, obtains the information necessary for determining whether the conditions are satisfied or not, and makes the determination. Furthermore, when the result of the determination is that the conditions are not satisfied or when the result of the termination is that the conditions are met but the wake-up operation specified in the wake-up frame is not related to the other device, the terminal may put the other device that is awake asleep or put it back to sleep again.

Moreover, for example, when the terminal does not satisfy the conditions specified in the second wake-up frame or third wake-up frame, the terminal may automatically put to sleep the transceiver device or some function of the transceiver device that the terminal woke up based on a wake-up frame received before the first wake-up frame, for example. Note that instead of putting to sleep the transceiver device or some function of the transceiver device that was woken up based on a received wake-up frame, the terminal may store, in the second wake-up frame or the third wake-up frame, information indicating whether to sleep (or cancel) a device or function woken up by a wake-up frame received in advance when the conditions specified in the frame are not met, and thus control whether to put the device woken up by the wake-up frame received in advance asleep.

Note that when a plurality of wake-up frames are received in advance, for each wake-up frame, a frame identifier that identifies the wake-up frame may be stored in the wake-up frame and transmitted, and the wake-up frame that instructs a device to sleep (or cancel) or a function to wake up can be specified. Moreover, when one wake-up frame indicates a plurality of wake-up instructions, for each wake-up instruction, a wake-up instruction identifier that identifies the wake-up instruction may be stored with the wake-up instruction and transmitted, and a wake-up instruction corresponding to a device or function to be put to sleep (or canceled) can be specified in a subsequently transmitted wake-up frame.

With the above configuration, a device such as a transceiver device or a device operation function included in the terminal, or a layer function can be instructed to wake up over multiple stages, which makes wake-up instruction that is flexible depending on the purpose of the wake-up possible. This also makes it easier to specify a sleep (or wake-up cancel) instruction to a device such as a transceiver device or a device operation function included in a woken-up terminal, or a layer function, which facilitates flexible device control.

Note that the first mode is a mode in which the communication device included in the device is in standby for reception of a frame including at least the first field, and more specifically, is a mode dedicated to placing the communication device in standby for reception of a frame including at least the first field. The second mode is a mode in which the communication device performs normal frame transmission and reception. The first mode corresponds to the sleep state, and the second mode corresponds to a non-sleep, normal state.

Embodiment 7

In the present embodiment, a variation of the configuration of an processes performed by the transmission device and the reception device according to the above embodiments will be described.

Figure 31:
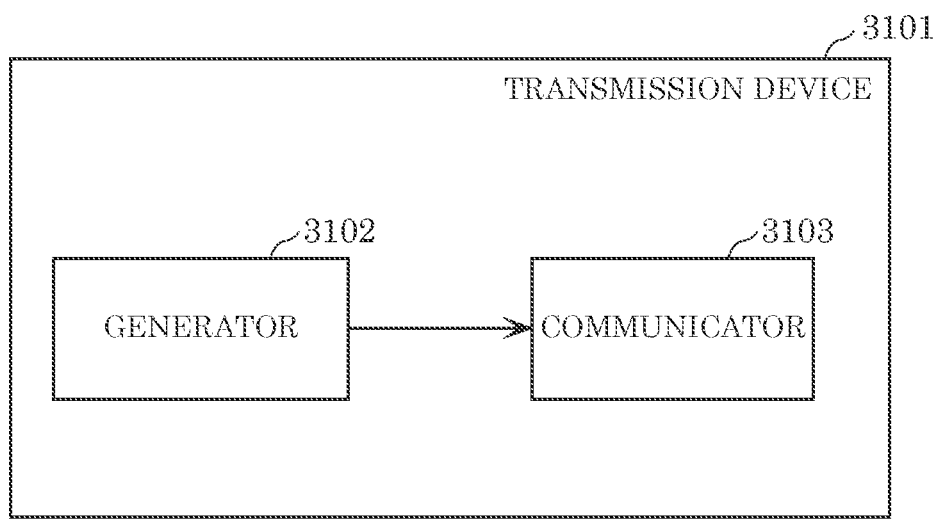
FIG. 31 illustrates one example of a configuration of a transmission device.

FIG. 31 illustrates one example of a configuration of transmission device 3101.

As illustrated in FIG. 31, transmission device 3101 includes generator 3102 that generates a frame in a predetermined frame format and communicator 3103 that transmits the frame generated by generator 3102. The predetermined frame format includes a first field indicating whether information related to a wake-up process performed by a device that received a frame in the predetermined frame format is valid or not. When the first field indicates that the information is valid, the predetermined frame format further includes a second field indicating identification information identifying the device.

With this configuration, transmission device 3101 can provide a new function, namely that the execution of a wake-up process by a device that received the frame can be appropriately controlled.

Figure 32:
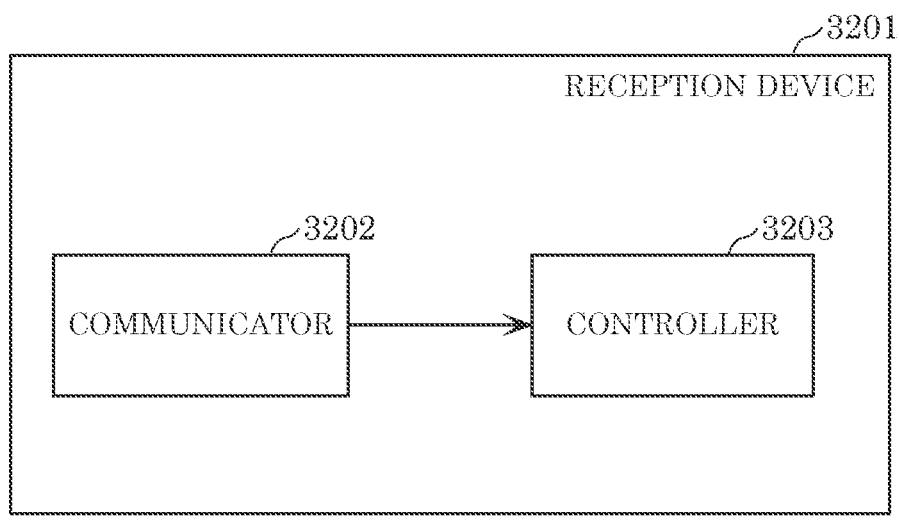
FIG. 32 illustrates one example of a configuration of a reception device.

FIG. 32 illustrates one example of a configuration of reception device 3201.

As illustrated in FIG. 32, reception device 3201 includes: communicator 3202 that operates in one of a first mode and a second mode; and controller 3203 that controls which of the first mode and the second mode communicator 3202 operates in based on a reception frame received by communicator 3202. The reception frame is in a predetermined frame format. The predetermined frame format includes a first field indicating whether information related to a wake-up process performed by a device that received a frame in the predetermined frame format is valid or not, and when the first field indicates that the information is valid, further includes a second field indicating identification information identifying the device. The first mode is a mode in which communicator 3202 is in standby for reception of a frame including at least the first field. The second mode is a mode in which communicator 3202 performs normal data frame transmission and reception. The wake-up process transitions communicator 3202 from the first mode to the second mode. Controller 3203 executes the wake-up process when, in the reception frame received while communicator 3202 is operating in the first mode, the first field indicates that the information is valid and the second field indicates the identification information of reception device 3201.

With this configuration, reception device 3201 can provide a new function, namely that the execution of a wake-up process based on the received frame can be appropriately controlled.

Figure 33:
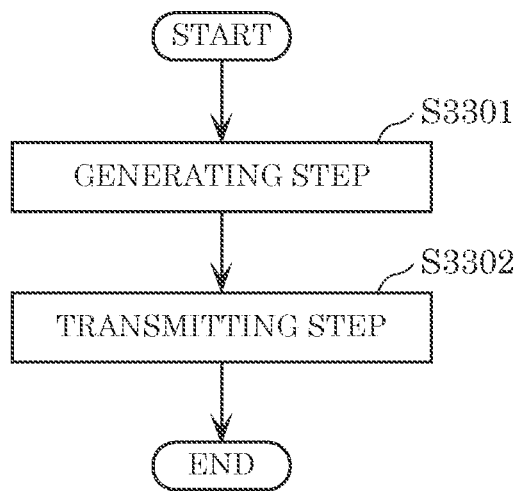
FIG. 33 illustrates one example of processes performed by a transmission device.

FIG. 33 illustrates one example of a transmission method including processes performed by transmission device 3101.

As illustrated in FIG. 33, the transmission method includes generating step S3301 of generating a frame in a predetermined frame format and transmitting step S3302 of transmitting the frame generated in generating step S3301. The predetermined frame format includes a first field indicating whether information related to a wake-up process performed by a device that received a frame in the predetermined frame format is valid or not. When the first field indicates that the information is valid, the predetermined frame format further includes a second field indicating identification information identifying the device.

With this configuration, transmission device 3101 can provide a new function, namely that the execution of a wake-up process by a device that received the frame can be appropriately controlled.

Figure 34:
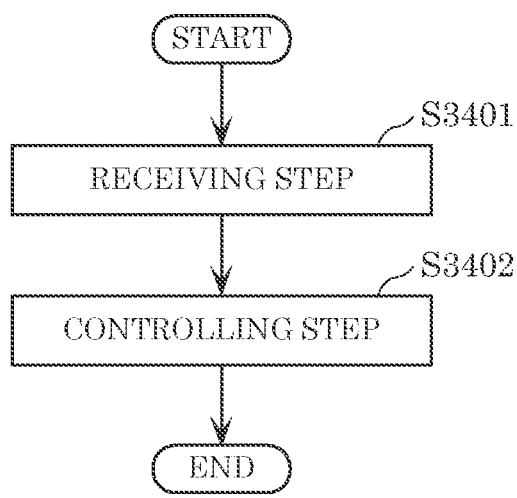
FIG. 34 illustrates one example of processes performed by a reception device.

FIG. 34 illustrates one example of a reception method including processes performed by reception device 3201.

As illustrated in FIG. 34, the reception method includes receiving step S3401 of receiving a frame by communicator 3202, and controlling step S3402 of controlling which of the first mode and the second mode communicator 3202 operates in based on a reception frame, the reception frame being in a predetermined frame format and being the frame received by communicator 3202. The predetermined frame format includes a first field indicating whether information related to a wake-up process performed by a device that received a frame in the predetermined frame format is valid or not, and when the first field indicates that the information is valid, further includes a second field indicating identification information identifying the device. The first mode is a mode in which communicator 3202 is in standby for reception of a frame including at least the first field. The second mode is a mode in which communicator 3202 performs normal data frame transmission and reception. The wake-up process transitions communicator 3202 from the first mode to the second mode. Controlling step S3402 executes the wake-up process when, in the reception frame received while communicator 3202 is operating in the first mode, the first field indicates that the information is valid and the second field indicates the identification information of reception device 3201.

With this configuration, reception device 3201 can provide a new function, namely that the execution of a wake-up process based on the received frame can be appropriately controlled.

All or some of the above embodiments may be written like in the following appendix, but are not limited to the following.

(1) A communication device including a plurality of communicators, the communication device including: a first communicator that communicates with a first communication device; a second communicator that switches between a plurality of states including a first sleep state and a first operational state, and communicates using a second communication scheme in the first operational state; a third communicator that switches between a plurality of states including a second sleep state and a second operational state, and communicates using a third communication scheme in the second operational state; an operator that switches between a plurality of states including a third sleep state and a third operational state, and performs a process specified in the third operational state; and a controller that controls the second communicator, the third communicator, and the operator. When the first communicator is in the first sleep state, the second communicator is in the second sleep state, and the operator is in the third sleep state, upon the first communicator receiving a signal from the first communication device instructing to switch operations, the signal including information specifying the second communicator or the third communicator and information specifying a process to be operated by the operator, the controller switches a state of the second communicator or the third communicator and switches a state of the operator based on the signal, and executes the process specified by the operator, using data received in the second communicator or the third communicator whose operational state was changed.

(2) A communication method implemented by a device including a plurality of communicators, the device including: a first communicator that communicates with a first communication device; a second communicator that switches between a plurality of states including a first sleep state and a first operational state, and communicates using a second communication scheme in the first operational state; a third communicator that switches between a plurality of states including a second sleep state and a second operational state, and communicates using a third communication scheme in the second operational state; and an operator that switches between a plurality of states including a third sleep state and a third operational state, and performs a process specified in the third operational state, the communication method including, when the first communicator is in the first sleep state, the second communicator is in the second sleep state, and the operator is in the third sleep state, upon the first communicator receiving a signal from the first communication device instructing to switch operations, the signal including information specifying the second communicator or the third communicator and information specifying a process to be operated by the operator: switching a state of the second communicator or the third communicator and switches a state of the operator based on the signal, and executing the process specified by the operator, using data received in the second communicator or the third communicator whose operational state was changed.

With this, it is possible to facilitate or contribute to the realization of one or more of the following desires regarding the device having the first communication device and the system having the first communication device: further power consumption reduction; provision of new functions that utilize the first communication scheme, and provision of new functions that utilize a combination of a plurality of communication schemes.

Note that the present disclosure is not limited to each exemplary embodiment, and can be carried out with various modifications. For example, in each embodiment, the communication method is described as being carried out as a communication device. However, the present disclosure is not limited to this case; the communication method can carried out as software.

Note that a program for executing the above-described communication method may be stored in ROM in advance to cause a CPU to operate the program.

Moreover, the program for executing the communication method may be stored in a computer-readable storage medium, the program stored in the recording medium may be recorded in RAM in a computer, and the computer may be caused to operate according to this program.

Each configuration of each of the above-described embodiments, etc., may be realized as an LSI circuit, which is typically an integrated circuit having an input terminal and an output terminal. These integrated circuits may be formed as separate chips, or may be formed as one chip so as to include the entire configuration or part of the configuration of each embodiment. Here, the circuit integration is exemplified as LSI, but depending on the degree of integration, the integration may be referred to as IC, system LSI, super LSI, or ultra LSI. Moreover, the circuit integration technique is not limited to LSI, and may be realized by a dedicated circuit or a general purpose processor. After manufacturing of the LSI circuit, a programmable FPGA or a reconfigurable processor in which the LSI circuit cell connections and settings are reconfigurable may be used. Furthermore, when development of a semiconductor technology or another derived technology provides a circuit integration technology which replaces LSI, as a matter of course, functional blocks may be integrated by using this technology. Adaption of biotechnology, for example, is a possibility.

Note that at least one of the field programmable gate array (FPGA) and central processing unit (CPU) may be configured to download, over a wired or wireless connection, some or all of the software required to implement the communication method described in the present disclosure. Furthermore, at least one of the FPGA and CPU may be configured to download, over a wired or wireless connection, some or all of the software required to perform updates. The downloaded software may be stored in a storage, and based on the stored software, at least one of the FPGA and CPU may be operated to implement the digital signal processing described in the present disclosure.

Here, a device including at least one of the FPGA and CPU may connect to a communications modem over a wired or wireless connection, and the device and communications modem may implement the communication method described in the present disclosure.

For example, a communication device such as the base station, AP, or terminal described in the present specification may include at least one of the FPGA and the CPU, and include an interface for obtaining, from an external source, software for operating at least one of the FPGA and the CPU. The communication device may further include a storage for storing software obtained from the external source, and implement the signal processing described in the present disclosure by operating the FPGA and/or CPU based on the stored software.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable in, for example, communication devices capable of entering a sleep mode.

What is claimed is:

1. A transmission device comprising:
   a processor that generates a frame in a predetermined frame format; and
   a transmitter that transmits the frame generated by the processor to a reception device, wherein
   a receiver included in the reception device operates in one of a first mode and a second mode, and
   the predetermined frame format:
   includes a first field indicating whether information related to a wake-up process executed by the reception device that received the frame in the predetermined frame format is valid or not; and
       when the first field indicates that the information is valid, further includes a second field indicating identification information identifying the reception device and a third field related to waking up a predetermined function while the reception device is operating in the second mode, the predetermined function being executed by the reception device as a function process that is based on the frame received by the receiver included in the reception device while operating in the second mode, the first mode is a mode in which the receiver included in the reception device is in standby for reception of the reception frame including at least the first field,
   the second mode is a mode in which the receiver included in the reception device performs normal data frame transmission and reception,
   the wake-up process transitions the receiver included in the reception device from the first mode to the second mode, and
   after the wake-up process transitions the receiver included in the reception device from the first mode to the second mode, the reception device executes the function process related to the predetermined function based on the frame received by receiver included in the reception device while operating in the second mode.

2. A reception device comprising:
   a receiver that operates in one of a first mode and a second mode; and
   a processor that controls which of the first mode and the second mode the receiver operates in based on a reception frame received by the receiver from a transmission device, the reception frame being in a predetermined frame format, wherein
   the processor is configured to execute a function process related to a predetermined function wherein
   the predetermined frame format includes a first field indicating whether information related to a wake-up process executed by the reception device is valid or not,
   the first mode is a mode in which the receiver is in standby for reception of the reception frame including at least the first field,
   the second mode is a mode in which the receiver performs normal data frame transmission and reception,
   the wake-up process transitions the receiver from the first mode to the second mode,
   the processor executes the wake-up process when, in the reception frame received while the receiver is operating in the first mode, the first field indicates that the information is valid and a second field indicates identification information identifying the reception device,
   when the first field indicates that the information is valid, the predetermined frame format further includes the second field indicating identification information identifying the reception device and a third field related to waking up the predetermined function while the receiver is operating in the second mode, and
   after the processor executes the wake-up process that transitions the receiver from the first mode to the second mode, the processor executes the function process based on the reception frame received by the receiver while the receiver is operating in the second mode.

3. The reception device according to claim 2, wherein the first mode is a mode dedicated to placing the receiver in standby for reception of the reception frame including at least the first field.

4. A transmission method executed by a transmission device, the transmission method comprising:
   generating a frame in a predetermined frame format; and
   transmitting the frame generated in the generating to a reception device, wherein
   a receiver included in the reception device operates in one of a first mode and a second mode, and
   the predetermined frame format:
   includes a first field indicating whether information related to a wake-up process executed by the reception device that received the frame in the predetermined frame format is valid or not; and when the first field indicates that the information is valid, further includes a second field indicating identification information identifying the reception device and a third field related to waking up a predetermined function while the reception device is operating in the second mode, the predetermined function being executed by the reception device as a function process that is based on the frame received by receiver included in the reception device while operating in the second mode, the first mode is a mode in which the receiver included in the reception device is in standby for reception of the reception frame including at least the first field, the second mode is a mode in which the receiver included in the reception device performs normal data frame transmission and reception, the wake-up process transitions the receiver included in the reception device from the first mode to the second mode, and after the wake-up process transitions the receiver included in the reception device from the first mode to the second mode, the reception device executes the function process related to the predetermined function based on the frame received by the receiver included in the reception device while operating in the second mode.

5. A reception method executed by a reception device including a receiver that operates in one of a first mode and a second mode, the reception method comprising:

receiving a reception frame in a predetermined frame format by the receiver; and controlling which of the first mode and the second mode the receiver operates in based on the reception frame, wherein the predetermined frame format includes a first field indicating whether information related to a wake-up process executed by the reception device is valid or not, the first mode is a mode in which the receiver is in standby for reception of the reception frame including at least the first field, the second mode is a mode in which the receiver performs normal data frame transmission and reception, the wake-up process transitions the receiver from the first mode to the second mode, the controlling includes executing the wake-up process when, in the reception frame received while the receiver is operating in the first mode, the first field indicates that the information is valid and a second field indicates identification information identifying the reception device, when the first field indicates that the information is valid, the predetermined frame format further includes the second field indicating identification information identifying the reception device and a third field related to waking up a predetermined function while the receiver is operating in the second mode, and after the controlling executes the wake-up process that transitions the communicator from the first mode to the second mode, the controlling further includes executing the function process based on the reception frame received by the receiver while the receiver is operating in the second mode.

* * * * *